United States Patent
Kimura et al.

(10) Patent No.: US 7,411,883 B2
(45) Date of Patent: Aug. 12, 2008

(54) OPTICAL PICKUP DEVICE, OPTICAL INFORMATION RECORDING AND REPRODUCING APPARATUS, EXPANDER LENS, COUPLING LENS AND CHROMATIC ABERRATION CORRECTING OPTICAL ELEMENT

(75) Inventors: Tohru Kimura, Hachioji (JP); Nobuyoshi Mori, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 519 days.

(21) Appl. No.: 10/826,524

(22) Filed: Apr. 19, 2004

(65) Prior Publication Data
US 2004/0213131 A1    Oct. 28, 2004

(30) Foreign Application Priority Data
Apr. 22, 2003    (JP)    ............... 2003-117206
May 22, 2003    (JP)    ............... 2003-144755
Nov. 14, 2003    (JP)    ............... 2003-385553
Mar. 12, 2004    (JP)    ............... 2004-071010

(51) Int. Cl.
G11B 7/135    (2006.01)

(52) U.S. Cl. ............... 369/112.03; 369/112.07
(58) Field of Classification Search ............... None
See application file for complete search history.

(56) References Cited

U.S. PATENT DOCUMENTS

| | | | |
|---|---|---|---|
| 6,272,096 B2 | 8/2001 | Yoo et al. | |
| 6,304,540 B1 | 10/2001 | Yoo et al. | |
| 6,449,095 B1 | 9/2002 | Ohtaki et al. | |
| 2002/0118427 A1 | 8/2002 | Hendriks et al. | |
| 2002/0172132 A1* | 11/2002 | Takeuchi et al. | 369/112.08 |
| 2003/0053223 A1 | 3/2003 | Takeuchi et al. | |
| 2003/0067686 A1 | 4/2003 | Shiono et al. | |
| 2003/0185134 A1* | 10/2003 | Kimura et al. | 369/112.08 |
| 2003/0202451 A1 | 10/2003 | Kimura et al. | |
| 2004/0190423 A1 | 9/2004 | Yagi et al. | |

FOREIGN PATENT DOCUMENTS

| | | |
|---|---|---|
| EP | 1 022 731 A2 | 7/2000 |
| EP | 1 117 096 A2 | 7/2001 |
| EP | 1 223 576 A2 | 7/2002 |
| EP | 1 271 496 A2 | 1/2003 |

(Continued)

*Primary Examiner*—Joseph Feild
*Assistant Examiner*—Nathan Danielsen
(74) *Attorney, Agent, or Firm*—Finnegan, Henderson, Farabow, Garrett & Dunner, L.L.P.

(57) ABSTRACT

An optical pickup apparatus includes first and second light sources; an objective lens; a spherical aberration correcting optical unit; and a chromatic aberration correcting optical element which includes a diffractive surface on at least one optical surface of the chromatic aberration correcting optical element such that a diffractive structure which is constructed by a plurality of ring-shaped zones separated by fine steps is formed on the diffractive surface, wherein the depth of steps along an optical axis is designed so that n2, which is a diffraction order of a diffracted ray having a largest diffraction efficiency among diffracted rays caused when the second light flux enters into the diffractive structure, is a lower order than n1, which is a diffraction order of a diffracted ray having a largest diffraction efficiency among diffracted light rays caused when the second first light flux enters into the diffractive structure.

30 Claims, 29 Drawing Sheets

| | FOREIGN PATENT DOCUMENTS | | | | |
|---|---|---|---|---|---|
| EP | 1 304 689 A2 | 4/2003 | KR | 2003030926 A * | 4/2003 |
| JP | 2001-060336 | 3/2001 | WO | WO 02/25646 A1 | 3/2002 |
| JP | 2003-279850 | 2/2003 | WO | WO 02/31823 A1 | 4/2002 |
| | | | WO | WO 03/025921 A1 | 3/2003 |

* cited by examiner

OPTICAL PICKUP DEVICE, OPTICAL INFORMATION RECORDING AND REPRODUCING APPARATUS, EXPANDER LENS, COUPLING LENS AND CHROMATIC ABERRATION CORRECTING OPTICAL ELEMENT

TECHNICAL FIELD

The present invention relates to an optical pickup device, an optical information recording and reproducing apparatus, an expander lens, a coupling lens and a chromatic aberration correcting optical element.

TECHNICAL BACKGROUND

In recent years, it is possible for DVD (digital versatile disc) spreading promptly as an optical recording medium for image information to record information of 4.7 GB per one surface by using a red semiconductor laser with wavelength of 650 nm and an objective lens with numerical aperture (NA) of 0.6. However, there is a strong demand for higher density and greater capacity, for conducting recording/reproducing of higher density information at higher transfer rate. To attain higher density and greater capacity of the optical disc, it is possible to reduce a diameter of a spot obtained through light-converging by an objective lens, as is known widely, and for that purpose, it is necessary to make a wavelength of a light source to be shorter, and to make a numerical aperture of an objective lens to be higher.

With respect to a shorter wavelength of a laser light source, there have been put to practical use a violet semiconductor laser with wavelength 405 nm and a violet SHG laser, and a combination of the violet laser light source and an objective lens with NA 0.6 makes it possible to record information of about 15 GB per one surface (hereinafter, an optical disc employing a violet laser light source is called a "high density optical disc" as a general term, in the present specification).

With respect to higher NA of an objective lens, there has been proposed a standard of an optical disc for conducting recording/reproducing of information by converging a light flux emitted from a violet laser with an objective lens with NA of 0.85, and an optical disc of this standard makes it possible to record information of about 23 GB per one surface, for an optical disc whose diameter is 12 cm.

For the proper recording/reproducing of information for a high density optical disc, it is necessary to prevent deterioration of light-converging function caused by instantaneous wavelength changes of a laser light source that is called mode hopping, by providing a means to correct longitudinal chromatic aberration. The reason for the foregoing is that a focus error is generated to be large by even a slight change of wavelength, because wavelength dispersion of lens material in the violet area becomes extremely great. As an optical item for correcting longitudinal chromatic aberration which is suitable for cost reduction, weight reduction and downsizing, there is available a diffracting lens wherein a diffractive structure is formed on the surface of a refracting lens.

Only ability to conduct proper recording/reproducing of information for high density optical disc is not a sufficient value of an optical disc player product. When considering the present actual where DVD and CD (compact disc) on which various pieces of information are recorded are sold, only ability to conduct recording/reproducing of information for high density optical disc is not sufficient, and another ability to conduct proper recording/reproducing of information equally for DVD and CD owned by a user, for example, enhances a commercial value of an optical disc player for a high density optical disc. From the background of this kind, it is desired that an optical pickup device housed in an optical disc player for high density optical disc has power to conduct proper recording/reproducing of information while maintaining interchangeability for any of high density optical disc, DVD and CD.

As a method to conduct proper recording/reproducing of information while maintaining interchangeability for any of high density optical disc, DVD and CD, there is considered a method to switch optical parts for high density optical disc and optical parts for DVD and CD selectively, depending on recording density of the optical disc for recording/reproducing of information. However, this method is disadvantageous for downsizing, and the cost thereof is increased.

Therefore, for simplifying the structure of the optical pickup device and thereby for reducing the cost, it is preferable to standardize optical parts for high density optical disc and optical parts for DVD and CD to reduce the number of parts constituting the optical pickup device as far as possible, even in the optical pickup device having interchangeability.

Therefore, when arranging a diffracting lens for correcting longitudinal chromatic aberration in the violet area in the optical pickup device having interchangeability, arranging the diffracting lens in the optical path where a light flux emitted from a violet laser light source for high density optical disc and a light flux emitted from a laser light source for DVD and CD pass, rather than arranging the diffracting lens in the optical path where a light flux emitted from a violet laser light source for high density optical disc only passes, makes the structure of the optical pickup device to be simple, thus, it is possible to attain downsizing and cost reduction, because the number of parts can be reduced.

TOKKAI No. 2001-60336, for example, discloses an example of the optical pickup device which can conduct recording/reproducing of information properly for high density optical disc by correcting chromatic aberration in the violet area by arranging the diffracting lens in the optical path where a light flux emitted from a violet laser light source for high density optical disc and a light flux emitted from a laser light source for DVD and CD pass.

However, in the drawings and description in the aforesaid Patent Application, there is no disclosure about how to correct spherical aberration in the case of conducting recording/reproducing of information for high density optical disc. Spherical aberration generated in the optical pickup device grows greater in proportion to the fourth power of NA of an objective lens and to a reciprocal number of a wavelength. Therefore, for proper recording/reproducing of information for a high density optical disc, it is necessary to conduct correction of spherical aberration caused by errors of protective layer thickness of high density optical disc, focus jump between recording surfaces of a two-layer disc and by errors of a wavelength of a violet laser light source, by providing a means for correcting spherical aberration, in addition to the correction of the aforesaid longitudinal chromatic aberration. Namely, in the optical pickup device described in the aforementioned Patent Application, there is sometimes an occasion where recording/reproducing of information cannot be conducted properly for at least a high density optical disc among the high density optical disc, DVD and CD.

SUMMARY

An object of the invention is to provide an optical pickup device, an optical information recording and reproducing apparatus, an expander lens, a coupling lens and a chromatic aberration correcting optical element which can conduct recording/reproducing of information properly while maintaining interchangeability for a plurality of optical discs such as a high density optical disc, DVD and CD each requiring a different wavelength of laser light source, and are suitable for downsizing, weight reduction and cost reduction.

The object stated above can be attained by the following structures.

The invention is represented by an optical pickup device having therein a first light source that emits a first light flux having first wavelength λ1 that is not more than 450 nm; a second light source that emits a second light flux having second wavelength λ2 that is longer than a length which is 1.3 times the first wavelength λ1 and an object lens unit that converges the first light flux emitted from the first light source on an information recording surface of the first optical disc, and converges the second light flux emitted from the second light source on an information recording surface of the second optical disc having recording density which is different from that of the first optical disc. Further, the optical pickup device has, in the optical path common for the first light flux and the second light flux, a chromatic aberration correcting optical element that has a diffracting surface whereon a diffractive structure composed of plural ring-shaped zones divided by microscopic steps is formed, on at least one optical surface. Further, a depth of the step in the optical axis direction is designed so that diffraction order n2 of the diffracted light having the maximum diffraction efficiency among diffracted light generated when the second light flux enters may be lower than that n1 of the diffracted light having the maximum diffraction efficiency among diffracted light generated when the first light flux enters the diffractive structure.

As stated above, since the spherical aberration correcting optical unit is arranged in the common optical path where both of the first light flux with the first wavelength λ1 that is 450 nm or less and the second light flux with the second wavelength λ2 pass through, the aforementioned spherical aberration correction can be conducted not only for recording/reproducing of information for high density optical disc but also for recording/reproducing of information for an optical disc having lower recording density such as DVD and CD. Due to this, recording/reproducing characteristics for optical discs with lower recording density are improved, thus, reliability as an optical pickup device is improved.

Further, with respect to the diffracting surface formed on the chromatic aberration correcting optical element, a depth of the step of the ring-shaped zone thereof in the optical axis direction is designed so that a diffraction order of the diffracted light having the maximum diffraction efficiency among diffracted light generated when the second light flux enters may be lower than that of the diffracted light having the maximum diffraction efficiency among diffracted light generated when the first light flux enters. Due to this, even when a wavelength ratio of light sources is greater than 1.3, sufficient diffraction efficiency can be obtained in a wavelength area for each light source, and therefore, the chromatic aberration correcting optical element of this kind can be arranged in the optical path where both of the first light flux and the second light flux with the second wavelength λ2 pass through, which makes it possible to obtain an optical pickup device suitable for downsizing, weight reduction and cost reduction.

DETAILED DESCRIPTION OF THE INVENTION

Figure 1:
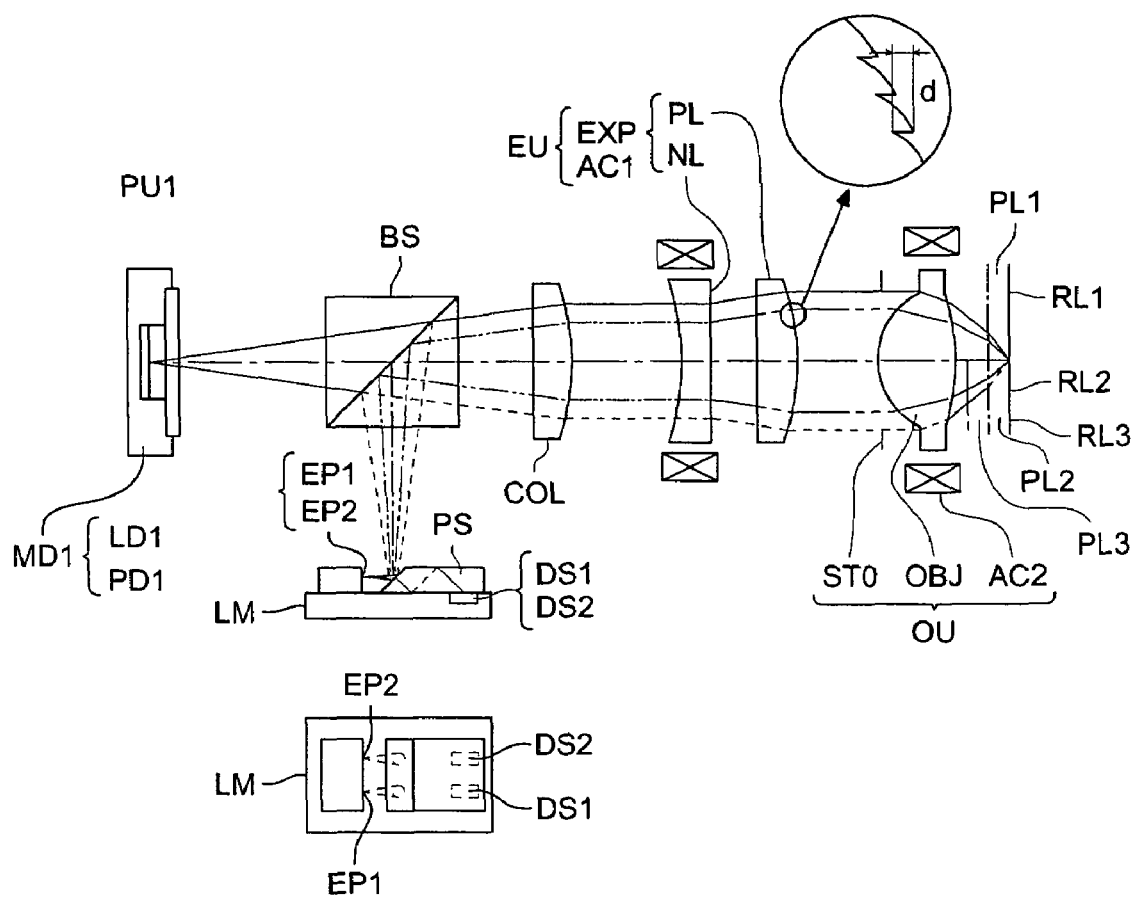
FIG. 1 is a plan view for primary portions showing the structure of an optical pickup device.

In the optical pickup device of the invention, it is preferable for the aforesaid spherical aberration correcting optical unit that an angle of inclination of a marginal ray of light of a light flux entering the objective lens unit is changed by changing and adjusting a distance between at least one lens group among lens groups constituting the spherical aberration correcting optical unit and the objective lens unit stated above.

Owing to the structure mentioned above, it is possible to change an angle of inclination (an angle formed by a marginal ray of light and an optical axis) of a marginal ray of light of a light flux entering the objective lens unit by changing and adjusting a distance between at least one lens group among lens groups constituting the spherical aberration correcting optical unit and the objective lens unit stated above. This means that spherical aberration changes of a spot on an information recording surface of an optical disc can be corrected, with a spherical aberration correcting optical unit, by changing magnification of the objective lens unit, corresponding to adjustment of magnification of the objective lens unit and corresponding to an amount of changes of spherical aberration of a spot on an information recording surface of a high density optical disc. Due to this, it is possible for the spot formed on an information recording surface of an optical disc to maintain the state where spherical aberration is constantly corrected, which makes it possible to obtain excellent recording/reproducing characteristics for a high density optical disc.

Incidentally, in the present specification, the high density optical disc is a general term for optical discs employing a violet laser light source as a light source for recording/reproducing of information, as stated above, DVD is a general term for optical discs in DVD series such as DVD-ROM, DVD-Video, DVD-Audio, DVD-RAM, DVD-R, DVD-RW, DVD+R, and DVD+RW, and CD is a general term for optical discs in CD series such as CD-ROM, CD-Audio, CD-Video, CD-R and CD-RW, to which, however, the invention is not limited.

The chromatic aberration correcting optical element used in the invention has, on at least one optical surface thereof, a diffracting surface on which a diffractive structure composed of plural ring-shaped zones divided by microscopic steps is formed. Owing to the diffractive structure, a function to correct at least longitudinal chromatic aberration is provided, and deterioration of light-converging power caused by an instantaneous wavelength change that is called mode hopping can be prevented.

The spherical aberration correcting optical unit used in the invention has a function to correct at least one type of spherical aberration. Further, a driving device such as an actuator that drives optical members also is assumed to be included in the spherical aberration correcting optical unit.

In the optical pickup device of the invention, though it is preferable that the chromatic aberration correcting optical element is arranged between the first and second light fluxes and the objective lens unit, the objective lens unit may also have the chromatic aberration correcting optical element.

In the optical pickup device of the invention, the structure wherein the spherical aberration correcting optical unit has the chromatic aberration correcting optical element also is one of the preferable structures.

In the optical pickup device of the invention, it is preferable that the optical pickup device further has a coupling lens that converts an angle of divergence of a light flux emitted from at least the first light source and leads it to the objective lens unit, and the spherical aberration correcting optical unit is an expander lens that is arranged in the optical path between the coupling lens and the objective lens unit, and is composed of a positive lens group and a negative lens group.

In the optical pickup device of the invention, the structure wherein the spherical aberration correcting optical unit is a coupling lens that converts an angle of divergence of each light flux emitted from each of two types of light sources and leads it to the objective lens unit is also a preferable structure.

By incorporating a spherical aberration correcting optical unit and a chromatic aberration correcting optical unit to be the same optical unit as stated above, it is possible to reduce the number of optical parts, and to further attain downsizing, weight reduction and cost reduction.

As an example of incorporating a spherical aberration correcting optical unit and a chromatic aberration correcting optical unit to be the same optical unit, there is an expander lens composed of the positive lens group and negative lens group wherein at least one lens group among constituent lens groups is made to be movable in the optical axis direction, and further, either optical surface is made to be a diffracting surface on which a depth of the ring-shaped zonal step is designed as stated above.

Incidentally, the expander lens mentioned here includes also a minimizing system for emitting after minimizing a diameter of a entering light flux in addition to an enlarging system for emitting after enlarging a diameter of a entering light flux.

As another example of incorporating a spherical aberration correcting optical unit and a chromatic aberration correcting optical unit to be the same optical unit, there is a coupling lens wherein at least one lens group among constituent lens groups is made to be movable in the optical axis direction, and further, either optical surface is made to be a diffracting surface on which a depth of the ring-shaped zonal step is designed as stated above. When the function as the spherical aberration correcting optical unit and as the chromatic aberration correcting optical element is given to the coupling lens that converts a divergent light flux emitted from the laser light source and leads it to the objective lens unit, the number of optical parts can be reduced greatly, which is extremely effective for downsizing, weight reduction and cost reduction.

Incidentally, the coupling lens mentioned here is assumed to include a collimator lens that converts a divergent light flux emitted from a laser light source into a parallel light flux substantially.

In the optical pickup device of the invention, it is preferable that the spherical aberration correcting optical unit has a structure wherein electrodes and liquid crystal molecule layers are laminated alternately, and refractive index distribution of the liquid crystal molecule layers can be changed by impressing prescribed voltage on the electrodes.

In the aforesaid structure, a liquid crystal element is utilized as a spherical aberration correcting optical unit. When voltage is impressed on electrodes arranged to interpose the liquid crystal molecule layer, refractive index distribution is generated in the liquid crystal molecule layer. As stated above, on the wavefront which has been transmitted through the liquid crystal molecule layer in which refractive index distribution is formed, there is added spherical aberration. In this case, the refractive index distribution in the liquid crystal molecule layer is regulated so that spherical aberration having a sign that is opposite to the sign of the spherical aberration of the spot on an information recording surface of the high density disc may be added to the transmitted wavefront. Owing to this, the spot formed on the information recording surface of the high density optical disc can maintain the state wherein spherical aberration is constantly corrected, which makes it possible to obtain excellent recording/reproducing characteristics for high density optical discs.

When the liquid crystal element is used as a spherical aberration correcting optical unit as stated above, mechanical movable parts become unnecessary, which is advantageous for downsizing, weight reduction and cost reduction.

The spherical aberration correction stated above may also be conducted not only for recording/reproducing of information for high density optical discs but also for recording/reproducing of information for optical discs with low recording density such as DVD and CD.

In the optical pickup device, it is preferable that the objective lens unit conduct tracking together with the spherical aberration correcting optical unit with each other.

In the aforementioned structure, when utilizing a liquid crystal element as a spherical aberration correcting optical unit, a wavefront of the light flux entering an objective lens unit through the spherical aberration correcting optical unit has spherical aberration. In such a case, if an optical axis of the objective lens unit is deviated from that of the spherical aberration correcting optical unit, a coma is generated, and excellent tracking characteristics are not obtained. It is therefore preferable to construct the structure so that the objective lens unit may conduct tracking together with the spherical aberration correcting optical unit with each other.

In the optical pickup device of the invention, it is preferable that the spherical aberration correcting optical unit corrects spherical aberration caused on the objective lens unit by a wavelength difference between the first wavelength $\lambda 1$ and the second wavelength $\lambda 2$.

The aforementioned structure makes it possible to provide an optical pickup device capable of conducting recording/reproducing of information properly while maintaining interchangeability for plural types of optical discs such as a high density optical disc, DVD and CD, if there is provided an arrangement that the spherical aberration correcting optical element corrects spherical aberration caused by a wavelength difference between the first wavelength $\lambda 1$ and the second wavelength $\lambda 2$ under an influence of wavelength dispersion of the objective lens unit in the optical pickup device of the invention.

In the optical pickup device of the invention, it is also preferable that the spherical aberration correcting optical unit corrects spherical aberration caused by variation of the first wavelength $\lambda 1$, when the first wavelength $\lambda 1$ is varied within a range of ±10 nm.

The aforementioned structure makes it possible to provide an optical pickup device capable of conducting recording/reproducing of information properly, if there is provided an arrangement that the spherical aberration correcting optical element corrects spherical aberration caused by an influence of wavelength dispersion of the objective lens unit, when the first wavelength $\lambda 1$ is varied by errors in manufacture of the first light source and by changes in ambient temperatures. The aforementioned structure is effective especially when a numerical aperture of the objective lens in the case of conducting recording/reproducing of information for a high density disc is large, because spherical aberration is easily generated by wavelength changes of the first light source.

In the optical pickup device of the invention, it is preferable that recording density of the first optical disc is greater than that of the second optical disc, the first optical disc has, on its information recording surface, a first protective layer, and the spherical aberration correcting optical unit corrects spherical aberration generated by thickness errors of the first protective layer.

In the aforementioned structure, if there is provided an arrangement that a spherical aberration correcting optical element corrects spherical aberration generated by an influence of thickness errors of the first optical disc having the highest recording density, an optical pickup device capable of conducting recording/reproducing of information properly for a high density optical disc can be provided. In particular, if a numerical aperture of the objective lens unit in the case of conducting recording/reproducing of information for a high density disc is large, spherical aberration is easily generated even when a thickness of the protective layer of the first optical disc is changed slightly from a standard thickness of a protective layer in design of the objective lens unit. Therefore, there is a possibility that a yield rate in mass production of optical discs is adversely affected, because it is necessary to control accurately a standard thickness of a protective layer of the optical disc. If there is employed an arrangement that the spherical aberration correcting optical unit corrects generation of spherical aberration caused by errors in protective layer thickness, as stated above, it is possible to improve a yield rate in mass production of optical discs, because tolerance for errors in a protective layer thickness can be eased.

In the optical pickup device of the invention, it is preferable that recording density of the first optical disc is greater than that of the second optical disc, the first optical disc has a multi-layer structure wherein optically transparent layers and information recording surfaces are laminated alternately in succession from the light source side, and the spherical aberration correcting optical unit corrects spherical aberration generated in the case of focus jump of the objective lens unit from the $i^{th}$ information recording surface to the $j^{th}$ information recording surface, when the first information recording surface, the second information recording surface, ... $n^{th}$ information recording surface are arranged in this order from the information recording surface closest to the light source in the multi-layer structure.

However, i is an optional integer satisfying $1 \leq i \leq n$, and j is an optional integer that satisfies $1 \leq i \leq n$ and is different from i.

The aforementioned structure is an optical pickup device capable of conducting recording/reproducing of information properly for a high density optical disc which is of a type having plural information recording layers. If a numerical aperture of the objective lens unit in the case of conducting recording/reproducing of information for a high density disc is large, spherical aberration is easily generated even when a thickness of the protective layer of the first optical disc is changed slightly from a standard thickness of a protective layer in design of the objective lens unit. Therefore, if the objective lens unit conducts focus jump from a certain information recording surface to another information recording surface, spherical aberration is changed greatly. If there is provided an arrangement to correct changes in spherical aberration caused in the focus jump as stated above with the spherical aberration correcting optical unit, it is possible to conduct recording/reproducing of information properly for a high density optical disc of a type having plural information recording surfaces.

In the optical pickup device of the invention, it is preferable that recording density of the first optical disc is greater than that of the second optical disc, the first optical disc has, on its information recording surface, a first protective layer whose thickness is t1, the second optical disc has, on its information recording surface, a second protective layer whose thickness is t2 (t1<t2), and the spherical aberration correcting optical unit corrects spherical aberration generated by a thickness difference between the first protective layer and the second protective layer.

In the aforementioned structure, if there is provided an arrangement that a spherical aberration correcting optical element corrects spherical aberration generated by a thickness difference of protective layers between high density optical discs and DVD or CD, it is possible to provide an optical pickup device capable of conducting recording/reproducing of information properly while maintaining interchangeability for plural types of optical discs such as a high density optical disc, DVD and CD.

In the optical pickup device of the invention, it is preferable that the objective lens unit has at least one plastic lens, and the spherical aberration correcting optical unit corrects spherical aberration caused by changes in refractive index following upon ambient temperature changes of a plastic lens included in the objective lens unit, and/or by refractive index distribution following upon temperature distribution in the plastic lens.

When a plastic lens is included in the objective lens unit, refractive index of the plastic lens is varied by changes of ambient temperature for the optical pickup device and by heat generation of an actuator, and thereby, spherical aberration is changed. Therefore, if a numerical aperture of the objective lens unit in the course of conducting recording/reproducing of information for a high density optical disc is great, a change of spherical aberration grows greater, thus, a temperature range for the objective lens unit to be used becomes extremely narrow, which causes a problem in practical use. Further, when a numerical aperture of the objective lens unit is great, spherical aberration changes in the case of occurrence, in the plastic lens, of refractive index distribution following upon temperature distribution in the optical axis direction and upon temperature distribution that is rotationally-symmetric about the optical axis, also cause a problem. Since the optical pickup device stated above is of the structure to correct changes of ambient temperature for the spherical aberration correcting optical unit and changes of spherical aberration of the objective lens unit following upon temperature distribution, even when changes of ambient temperature and heat generation of an actuator take place when conducting recording/reproducing of information for a high density optical disc, spherical aberration of the spot formed on the information recording surface through light-converging is in the state where it is constantly corrected properly.

In the optical pickup device of the invention, it is preferable that recording density of the first optical disc is greater than that of the second optical disc, the first optical disc has, on its information recording surface, a first protective layer, the first magnification differs from the second magnification, and the spherical aberration correcting optical unit changes a position of the object point of the objective lens unit according to a difference between the first magnification and the second magnification, when the first magnification represents a magnification of the objective lens unit in the case of conducting recording/reproducing of information for the first optical disc, and the second magnification represents a magnification of the objective lens unit in the case of conducting recording/reproducing of information for the second optical disc.

Further, when using an optical unit which is constructed so that an angle of inclination of a marginal ray of light of a light flux entering an objective lens unit may be changed by changing and adjusting a distance between a constituent lens and the objective lens unit as the spherical aberration correcting optical unit, it is possible to change a position of an object point of the objective lens unit. If this function is utilized, it is possible to change a position of an object point of the objective lens unit, corresponding to each magnification in the optical pickup device wherein magnification of the objective lens unit is different from others in the case of conducting recording/reproducing of information for a high density optical disc, DVD and CD, as stated above.

In the optical pickup device of the invention, it is preferable that the second wavelength $\lambda 2$ is in a range from 600 nm to 700 nm, and when n1 represents the diffraction order of the diffracted light having the maximum diffraction efficiency among diffracted light generated when the first light flux enters the chromatic aberration correcting optical unit, and n2 represents the diffraction order of the diffracted light having the maximum diffraction efficiency among diffracted light generated when the second light flux enters, a combination of the diffraction order n1 and the diffraction order n2 is either one of (n1, n2)=(2, 1), (3, 2), (4, 2), (5, 3), (6, 4), (7, 4), (8, 5), (10, 6).

If a depth of a step of a ring-shaped zone of the chromatic aberration correcting optical element is designed so that a combination of diffraction order n1 of the diffracted light having the maximum diffraction efficiency among diffracted light generated when the first light flux enters and diffraction order n2 of the diffracted light having the maximum diffraction efficiency among diffracted light generated when the second light flux enters may be either one of (n1, n2)=(2, 1), (3, 2), (4, 2), (5, 3), (6, 4), (7, 4), (8, 5), (10, 6), for the first wavelength $\lambda 1$ of not more than 450 nm and the second wavelength $\lambda 2$ within a range from 600 nm to 700 nm, sufficient diffraction efficiency is obtained in each wavelength area, and thereby, the chromatic aberration correcting optical element can be arranged in the optical path through which the first light flux and the second light flux having the second wavelength $\lambda 2$ pass, which makes it possible to obtain an optical pickup device suitable for downsizing, weight reduction and cost reduction. Further, even in the case of correcting chromatic aberration in the wavelength area of the first wavelength $\lambda 1$, chromatic aberration correction in the wavelength area of the second wavelength $\lambda 2$ does not become excessive, which makes it possible to provide an optical pickup device having excellent recording characteristics for both of a high density optical disc and DVD.

Optical parts such as an objective lens and a collimator lens each employing an aspheric surface are generally manufactured through injection molding. For transferring a minute structure such as a diffractive structure accurately onto an optical surface of the optical parts in injection molding, it is preferable that a plastic lens is used as the optical parts. A plastic lens which can be used in the violet area is one whose refractive index in the violet area is within a range of 1.5-1.6, in many cases.

When forming the diffractive structure stated above on the optical surface of the plastic lens, with the combination of diffraction orders n1 and n2, the specific method is one wherein depth d0 of the step in the optical axis direction closest to the optical axis among those in the diffractive structure satisfies either one of the following expressions (1)-(8).

$$1.2 \, \mu m < d0 < 1.7 \, \mu m \quad (1)$$

$$1.9 \, \mu m < d0 < 2.6 \, \mu m \quad (2)$$

$$2.6 \, \mu m < d0 < 3.2 \, \mu m \quad (3)$$

$$3.3 \, \mu m < d0 < 4.2 \, \mu m \quad (4)$$

$$4.4 \, \mu m < d0 < 5.0 \, \mu m \quad (5)$$

$$4.7\ \mu m < d0 < 5.7\ \mu m \quad (6)$$

$$5.6\ \mu m < d0 < 6.5\ \mu m \quad (7)$$

$$6.9\ \mu m < d0 < 8.1\ \mu m \quad (8)$$

The expressions (1)-(8) represent a depth range for steps corresponding to (n1, n2)=(2, 1), (3, 2), (4, 2), (5, 3), (6, 4), (7, 4), (8, 5), (10, 6).

In the optical pickup device of the invention, it is more preferable that refractive index N of constitution lens having the diffracting surface of the chromatic aberration correcting optical element for the first light flux having the first wavelength λ1 satisfies the relationship of 1.5<N<1.6, the first wavelength λ1 and the second wavelength λ2 satisfy the relationship of 1.8>λ2/λ1>1.3, and a combination of step amount d of the step closest to the optical axis among the aforesaid steps, the diffraction order n1 and the diffraction order n2 satisfies at least one of the following conditions (a)-(f).

(a) (n1, n2)=(4, 2) and 2.6 μm<d<3.2 μm
(b) (n1, n2)=(5, 3) and 3.3 μm<d<4.2 μm
(c) (n1, n2)=(6, 4) and 4.4 μm<d<5.0 μm
(d) (n1, n2)=(7, 4) and 4.7 μm<d<5.7 μm
(e) (n1, n2)=(8, 5) and 5.6 μm<d<6.5 μm
(f) (n1, n2)=(10, 6) and 6.9 μm<d<8.1 μm An explanation will be given as follows, with an example of the combination of (a).

In the case of using an optical disc such as a conventional DVD and an optical disc of high density DVD, for example, when a combination of low-diffraction-ordered diffracted rays of light such as a combination of the first order and the second order, or a combination of the second order and the third order is used as diffracted light having the maximum diffraction efficiency respectively, a width of ring-shaped zone in the direction perpendicular to an optical axis of the diffractive structure becomes too small, and further, the number of ring-shaped zones within the effective diameter becomes too large, which causes problems that transferability in the course of molding an optical element is worsened, an amount of light transmitted is lowered, processing of a die takes more time and cost is increased. Occurrence of these problems can be controlled by the aforementioned structure.

Under the diffractive structure wherein a sectional form in the optical axis direction optimized with certain diffraction order m and optimized wavelength λB is serrated, diffraction efficiency ηm (λ) under the condition of certain diffraction order n of the diffractive structure and of certain wavelength λ is expressed by the following expression including a little approximation;

$$\eta_m(\lambda) = (\text{Sin}\ \pi(\alpha m-n)/\pi(\alpha m-n))^2 \quad \text{(Numeral 1)}$$

wherein α is given by the following expression.

$$\alpha = \lambda_B(n_\lambda - 1)/(n_{\lambda B} - 1) \quad \text{(Numeral 2)}$$

In the expression above, $n_\lambda$ represents a refractive index of a diffractive optical element under the condition of wavelength λ, and $n_{\lambda B}$ represents a refractive index of a diffractive optical element under the condition of wavelength λB.

Figure 29:
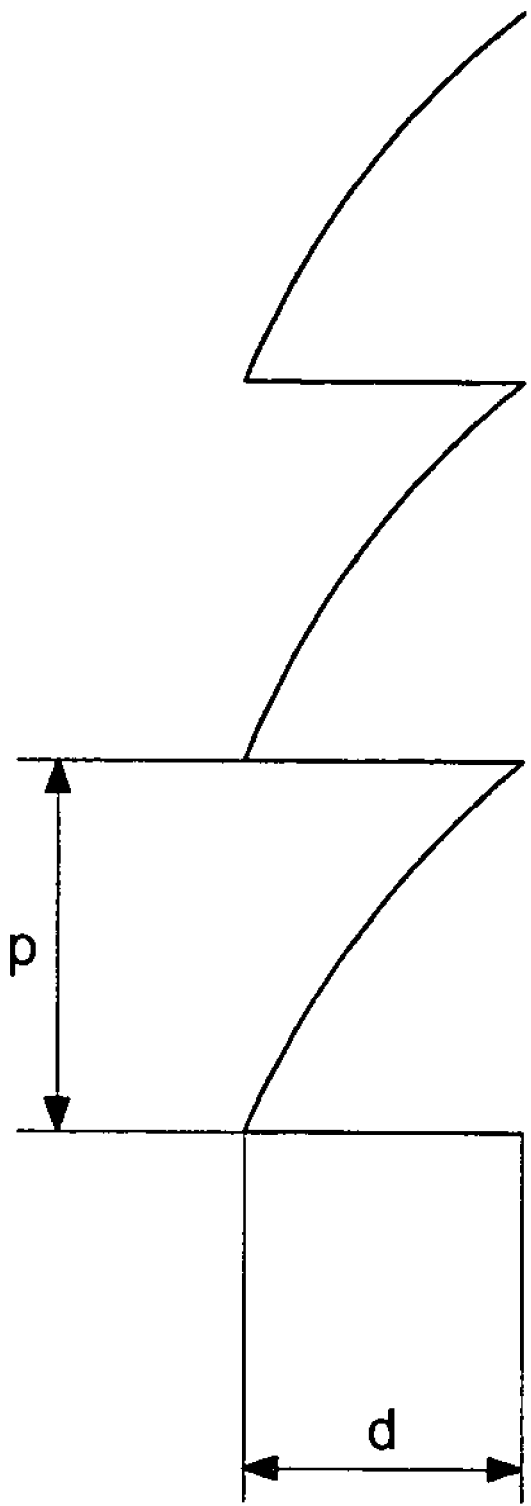
FIG. 29 is a diagram of an enlarged sectional view in the optical axis direction of an example of a diffractive structure.

In FIG. 29 which is a schematic enlarged diagram of the diffractive structure, the following relationship holds for refractive index $n_{\lambda B}$ of the diffractive optical element under the condition of diffraction order m, optimized wavelength λB and wavelength λB, when an amount of step in the optical axis direction is represented by dB.

$$dB = m\lambda_B/(n_{\lambda B} - 1) \quad \text{(Numeral 3)}$$

Figure 30:
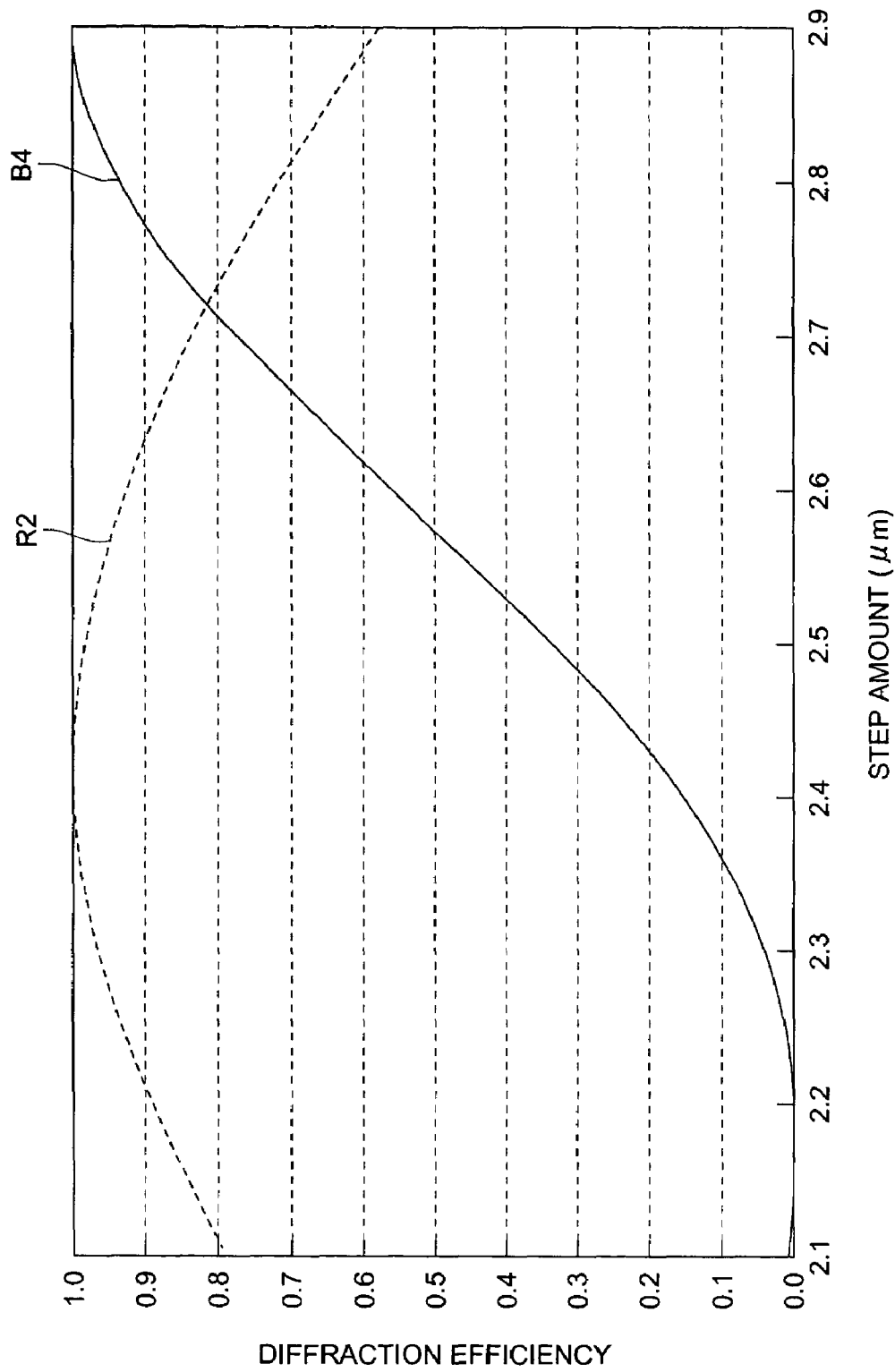
FIG. 30 is a diagram showing results of calculation wherein the axis of abscissas represents step amount dB in the optical axis direction, and the axis of ordinates represents changes in diffraction efficiency of a diffractive structure.

FIG. 30 is a diagram showing the results of calculation wherein the axis of abscissas represents amount of step dB in the optical axis direction and the axis of ordinates represents changes in diffraction efficiency of the diffractive structure, and B4 in the diagram represents diffraction efficiency of the 4$^{th}$ order diffracted light of a violet light flux having wavelength 405 nm, and R2 represents diffraction efficiency of the 2$^{nd}$ order diffracted light of a red light flux having wavelength 655 nm. Diffraction efficiency of the diffractive optical element is 1.5601 at 405 nm, and it is 1.5407 at 655 nm. It is possible to obtain the diffraction efficiency that is as high as 70% in each wavelength area in the vicinity of violet 405 nm used for high density DVD and in the vicinity of 655 nm used for DVD, by establishing amount of step dB to be within a range from 2.65 μm to 2.8 μm. Further, when diffraction order n1 of diffracted light having the maximum diffraction efficiency is made to be 4 or more, among diffracted rays of light generated when a light flux having a wavelength of violet 405 nm enters, ring-shaped zonal width P in the direction perpendicular to the optical axis grows greater. Therefore, transferability of the diffractive structure in the course of molding is enhanced, high light transmission factor is obtained, and the number of ring-shaped zones in the effective diameter can be small, which reduces time required for processing a die, resulting in reduction of cost for manufacturing diffractive optical elements.

When forming a diffractive structure on a refracting interface having refracting power, the longer a distance between the optical axis and a step is, the greater a difference between an amount of the step and an amount of a step obtained from "Numeral 3" is. In the present specification, therefore, an amount of step of a diffractive structure mentioned here means amount of step d of the step which is closest to the optical axis.

In the present specification, "the diffractive structure is optimized with diffraction order m and optimized wavelength λB" or "to optimize the diffractive structure with diffraction order m and optimized wavelength λB" is synonymous with determining an amount of step for the step of a diffractive structure so that the diffraction efficiency of the diffracted light with diffraction order m may be 100% theoretically when a light flux with wavelength λB enters, and the diffraction order m in this case is called an optimized diffraction order.

Optimized order m of the diffractive structure of the diffractive optical element manufactured actually and optimized wavelength λB are obtained by the following expression under the assumption that d represents an amount of step of the step which is closest to the optical axis and Ni represents refractive index of a diffractive optical element for i$^{th}$ light flux (i=1 or 2) with i$^{th}$ wavelength;

$$\lambda B(\mu m) = d(\mu m) \times (Ni-1)/m$$

wherein, m is obtained through calculation of the following expression when an integer obtained by rounding Y is represented by INT (Y).

$$m = INT(Y)$$

$$Y = d(\mu m) \times (Ni-1)/\lambda 1(\mu m)$$

As explained in FIG. 30 by giving an example, even when the chromatic aberration correcting optical element used in the invention corrects chromatic aberration of the objective lens in the wavelength area in the vicinity of wavelength λ1 with diffractive actions of the diffractive structure, by determining amount of step d of the step closest to the optical axis so that expression (a) may be satisfied for wavelength λ1 and wavelength λ2 whose wavelength difference is great, chromatic aberration of an objective lens in the wavelength area in the vicinity of wavelength λ2 is not corrected excessively, and further, high diffraction efficiency is obtained in each wavelength area of the first light flux with wavelength λ1 and the second light flux with wavelength λ2. Further, when diffraction order n1 of diffracted light having the maximum diffraction efficiency is made to be 4, among diffracted rays of light generated when a first light flux enters, ring-shaped zonal width P in the direction perpendicular to the optical axis grows greater. Therefore, transferability of the diffractive structure in the course of molding is enhanced, high light transmission factor is obtained, and the number of ring-shaped zones in the effective diameter can be small, which reduces time required for processing a die, resulting in reduction of cost for manufacturing diffractive optical elements.

Incidentally, for making a microscopic structure such as a diffractive structure on a lens surface through a molding method employing a metal die, it is preferable to make the chromatic aberration correcting optical element to be a plastic lens which is excellent in transferability in the course of molding. Refractive index of the plastic lens is within a range of 1.5-1.6 in general. Therefore, the refractive index N of the constituent lens having the diffracting surface of the chromatic aberration correcting optical element for the first light flux with the first wavelength λ1 was specified as stated above.

When using the chromatic aberration correcting optical element that satisfies the aforesaid combination (a), if the aforementioned diffractive structure is optimized with the diffraction order n1 and optimized wavelength λB, and the following expression is satisfied, recording and/or reproducing of information can be conducted for high density DVD.

370 (nm)<λB<410 (nm)

When using the chromatic aberration correcting optical element that satisfies the aforesaid combination (a), if the aforementioned diffractive structure is optimized with the diffraction order n2 and optimized wavelength λB', and the following expression is satisfied, recording and/or reproducing of information can be conducted for conventional DVD.

710 (nm)<λB'<790 (nm)

In the case of a chromatic aberration correcting optical element employing a diffraction order that satisfies the aforesaid combination (b), as explained in FIG. 30 by giving an example, even when the chromatic aberration correcting optical element used in the invention corrects chromatic aberration of the objective lens in the wavelength area in the vicinity of wavelength λ1 with diffractive actions of the diffractive structure, by determining amount of step d of the step closest to the optical axis so that expression (b) may be satisfied for wavelength λ1 and wavelength λ2 whose wavelength difference is great, chromatic aberration of an objective lens in the wavelength area in the vicinity of wavelength λ2 is not corrected excessively, and further, high diffraction efficiency is obtained in each wavelength area of the first light flux with wavelength λ1 and the second light flux with wavelength λ2. Further, when diffraction order n1 of diffracted light having the maximum diffraction efficiency is made to be 5, among diffracted rays of light generated when a first light flux enters, ring-shaped zonal width P in the direction perpendicular to the optical axis grows greater. Therefore, transferability of the diffractive structure in the course of molding is enhanced, high light transmission factor is obtained, and the number of ring-shaped zones in the effective diameter can be small, which reduces time required for processing a die, resulting in reduction of cost for manufacturing diffractive optical elements.

When using the chromatic aberration correcting optical element that satisfies the aforesaid combination (b), if the aforementioned diffractive structure is optimized with the diffraction order n1 and optimized wavelength λB, and the following expression is satisfied, recording and/or reproducing of information can be conducted for high density DVD.

380 (nm)<λB<430 (nm)

When using the chromatic aberration correcting optical element that satisfies the aforesaid combination (b), if the aforementioned diffractive structure is optimized with the diffraction order n2 and optimized wavelength λB', and the following expression is satisfied, recording and/or reproducing of information can be conducted for conventional DVD.

610 (nm)<λB'<690 (nm)

In the case of a chromatic aberration correcting optical element employing a diffraction order that satisfies the aforesaid combination (c), as explained in FIG. 30 by giving an example, even when the chromatic aberration correcting optical element used in the invention corrects chromatic aberration of the objective lens in the wavelength area in the vicinity of wavelength λ1 with diffractive actions of the diffractive structure, by determining amount of step d of the step closest to the optical axis so that expression (c) may be satisfied for wavelength λ1 and wavelength λ2 whose wavelength difference is great, chromatic aberration of an objective lens in the wavelength area in the vicinity of wavelength λ2 is not corrected excessively, and further, high diffraction efficiency is obtained in each wavelength area of the first light flux with wavelength λ1 and the second light flux with wavelength λ2. Further, when diffraction order n1 of diffracted light having the maximum diffraction efficiency is made to be 6, among diffracted rays of light generated when a first light flux enters, ring-shaped zonal width P in the direction perpendicular to the optical axis grows greater. Therefore, transferability of the diffractive structure in the course of molding is enhanced, high light transmission factor is obtained, and the number of ring-shaped zones in the effective diameter can be small, which reduces time required for processing a die, resulting in reduction of cost for manufacturing diffractive optical elements.

When using the chromatic aberration correcting optical element that satisfies the aforesaid combination (c), if the aforementioned diffractive structure is optimized with the diffraction order nl and optimized wavelength λB, and the following expression is satisfied, recording and/or reproducing of information can be conducted for high density DVD.

410 (nm)<λB<430 (nm)

When using the chromatic aberration correcting optical element that satisfies the aforesaid combination (c), if the aforementioned diffractive structure is optimized with the diffraction order n2 and optimized wavelength λB', and the following expression is satisfied, recording and/or reproducing of information can be conducted for conventional DVD.

600 (nm)<λB'<630 (nm)

In the case of a chromatic aberration correcting optical element employing a diffraction order that satisfies the aforesaid combination (d), as explained in FIG. 30 by giving an example, even when the chromatic aberration correcting optical element used in the invention corrects chromatic aberration of the objective lens in the wavelength area in the vicinity of wavelength λ1 with diffractive actions of the diffractive structure, by determining amount of step d of the step closest to the optical axis so that expression (d) may be satisfied for wavelength λ1 and wavelength λ2 whose wavelength difference is great, chromatic aberration of an objective lens in the wavelength area in the vicinity of wavelength λ2 is not corrected excessively, and further, high diffraction efficiency is obtained in each wavelength area of the first light flux with wavelength λ1 and the second light flux with wavelength λ2. Further, when diffraction order n1 of diffracted light having the maximum diffraction efficiency is made to be 7, among diffracted rays of light generated when a first light flux enters, ring-shaped zonal width P in the direction perpendicular to the optical axis grows greater. Therefore, transferability of the diffractive structure in the course of molding is enhanced, high light transmission factor is obtained, and the number of ring-shaped zones in the effective diameter can be small, which reduces time required for processing a die, resulting in reduction of cost for manufacturing diffractive optical elements.

When using the chromatic aberration correcting optical element that satisfies the aforesaid combination (d), if the aforementioned diffractive structure is optimized with the diffraction order n1 and optimized wavelength λB, and the following expression is satisfied, recording and/or reproducing of information can be conducted for high density DVD.

385 (nm)<λB<420 (nm)

When using the chromatic aberration correcting optical element that satisfies the aforesaid combination (d), if the aforementioned diffractive structure is optimized with the diffraction order n2 and optimized wavelength λB', and the following expression is satisfied, recording and/or reproducing of information can be conducted for conventional DVD.

650 (nm)<λB'<710 (nm)

In the case of a chromatic aberration correcting optical element employing a diffraction order that satisfies the aforesaid combination (e), as explained in FIG. 30 by giving an example, even when the chromatic aberration correcting optical element used in the invention corrects chromatic aberration of the objective lens in the wavelength area in the vicinity of wavelength λ1 with diffractive actions of the diffractive structure, by determining amount of step d of the step closest to the optical axis so that expression (e) may be satisfied for wavelength λ1 and wavelength λ2 whose wavelength difference is great, chromatic aberration of an objective lens in the wavelength area in the vicinity of wavelength λ2 is not corrected excessively, and further, high diffraction efficiency is obtained in each wavelength area of the first light flux with wavelength λ1 and the second light flux with wavelength λ2. Further, when diffraction order n1 of diffracted light having the maximum diffraction efficiency is made to be 8, among diffracted rays of light generated when a first light flux enters, ring-shaped zonal width P in the direction perpendicular to the optical axis grows greater. Therefore, transferability of the diffractive structure in the course of molding is enhanced, high light transmission factor is obtained, and the number of ring-shaped zones in the effective diameter can be small, which reduces time required for processing a die, resulting in reduction of cost for manufacturing diffractive optical elements.

When using the chromatic aberration correcting optical element that satisfies the aforesaid combination (e), if the aforementioned diffractive structure is optimized with the diffraction order n1 and optimized wavelength λB, and the following expression is satisfied, recording and/or reproducing of information can be conducted for high density DVD.

395 (nm)<λB<420 (nm)

When using the chromatic aberration correcting optical element that satisfies the aforesaid combination (e), if the aforementioned diffractive structure is optimized with the diffraction order n2 and optimized wavelength λB', and the following expression is satisfied, recording and/or reproducing of information can be conducted for conventional DVD.

610 (nm)<λB'<650 (nm)

In the case of a chromatic aberration correcting optical element employing a diffraction order that satisfies the aforesaid combination (f), as explained in FIG. 30 by giving an example, even when the chromatic aberration correcting optical element used in the invention corrects chromatic aberration of the objective lens in the wavelength area in the vicinity of wavelength λ1 with diffractive actions of the diffractive structure, by determining amount of step d of the step closest to the optical axis so that expression (f) may be satisfied for wavelength λ1 and wavelength λ2 whose wavelength difference is great, chromatic aberration of an objective lens in the wavelength area in the vicinity of wavelength λ2 is not corrected excessively, and further, high diffraction efficiency is obtained in each wavelength area of the first light flux with wavelength λ1 and the second light flux with wavelength λ2. Further, when diffraction order n1 of diffracted light having the maximum diffraction efficiency is made to be 10, among diffracted rays of light generated when a first light flux enters, ring-shaped shaped zonal width P in the direction perpendicular to the optical axis grows greater. Therefore, transferability of the diffractive structure in the course of molding is enhanced, high light transmission factor is obtained, and the number of ring-shaped zones in the effective diameter can be small, which reduces time required for processing a die, resulting in reduction of cost for manufacturing diffractive optical elements.

When using the chromatic aberration correcting optical element that satisfies the aforesaid combination (f), if the aforementioned diffractive structure is optimized with the diffraction order n1 and optimized wavelength λB, and the following expression is satisfied, recording and/or reproducing of information can be conducted for high density DVD.

390 (nm)<λB<420 (nm)

When using the chromatic aberration correcting optical element that satisfies the aforesaid combination (f), if the aforementioned diffractive structure is optimized with the diffraction order n2 and optimized wavelength λB', and the following expression is satisfied, recording and/or reproducing of information can be conducted for conventional DVD.

600 (nm)<λB'<650 (nm)

In the optical pickup device of the invention, it is preferable that a third light source emitting a third light flux having third wavelength λ3 which is different from the first wavelength λ1 and from the second wavelength λ2 is provided, the objective lens unit converges the third light flux emitted from the third light source on an information recording surface of the third optical disc having recording density that is different from those of the first and second optical discs, the chromatic aberration correcting optical element is arranged in the optical path that is common for the first-third light fluxes, the second wavelength λ2 is within a range of 600 nm-700 nm and the third wavelength λ3 is within a range of 730 nm-830 nm, and a combination of the diffraction orders n1, n2 and n3 is either one of (n1, n2, n3)=(2, 1, 1), (4, 2, 2), (6, 4, 3,), (8, 5, 4), (10, 6, 5), when n1 represents a diffraction order of the diffracted light having the maximum diffraction efficiency among diffracted rays of light generated when the first light flux enters the chromatic aberration correcting optical element, n2 represents a diffraction order of the diffracted light having the maximum diffraction efficiency among diffracted rays of light generated when the second light flux enters, and n3 represents a diffraction order of the diffracted light having the maximum diffraction efficiency among diffracted rays of light generated when the third light flux enters.

If a depth d of a step of the ring-shaped zone of the chromatic aberration correcting optical element is designed so that a combination of the diffraction orders n1, n2 and n3 may be either one of (n1, n2, n3)=(2, 1, 1), (4, 2, 2), (6, 4, 3,), (8, 5, 4), (10, 6, 5), it is possible to obtain sufficient diffraction efficiency in each wavelength area. Therefore, the chromatic aberration correcting optical element can be arranged in the optical path through which the first light flux and the second light flux having the second wavelength $\lambda 2$ pass, and an optical pickup device suitable for downsizing, weight reduction and cost reduction can be obtained. Further, even when longitudinal chromatic aberration is corrected in the wavelength area of the first wavelength $\lambda 1$, longitudinal chromatic aberration corrections in wavelength areas within a range of 600 nm-700 nm and within a range of 730 nm-830 nm are prevented from becoming excessive, which makes it possible to provide an optical pickup device having excellent recording characteristics for any of a high density optical disc, DVD and CD.

Further, when forming the diffractive structure stated above on the optical surface of the plastic lens, with the combination of diffraction orders n1, n2 and n3, the specific method is one wherein depth dO of the step in the optical axis direction closest to the optical axis among those in the diffractive structure satisfies either one of the following expressions (9)-(13).

$$1.2 \text{ μm} < d0 < 1.7 \text{ μm} \quad (9)$$

$$2.6 \text{ μm} < d0 < 3.0 \text{ μm} \quad (10)$$

$$4.4 \text{ μm} < d0 < 5.0 \text{ μm} \quad (11)$$

$$5.6 \text{ μm} < d0 < 6.5 \text{ μm} \quad (12)$$

$$6.9 \text{ μm} < d0 < 8.1 \text{ μm} \quad (13)$$

The expressions (9)-(13) represent a depth range for steps corresponding respectively to (n1, n2, n3)=(2, 1, 1), (4, 2, 2), (6, 4, 3), (8, 5, 4), (10, 6, 5).

It is preferable that the optical pickup device of the invention has a coupling lens which converts an angle of divergence for each of the first light flux emitted from the first light source and the second light flux emitted from the second light source, and guides it to the objective lens unit, and the coupling lens has the chromatic aberration correcting optical element.

In the optical pickup device of the invention, it is preferable that the coupling lens has at least one plastic lens, and a diffracting surface of the chromatic aberration correcting optical element further has a function for controlling changes of an angle of divergence or an angle of convergence for temperature changes of the first light flux emerging from the coupling lens.

In the optical pickup device, a coupling lens that converts an angle of divergence of a divergent light flux emitted from a light source is arranged to precede an objective lens. An aberration-free lens having NA of 0.05-0.2 is used as the coupling lens, and the coupling lens is used generally to collimate a divergent light flux emitted from a laser light source into a parallel light flux.

When a plastic lens is used as a coupling lens, the coupling lens can be manufactured stably on a mass production basis at low cost. However, a focal length of a plastic lens is varied by temperature changes, and therefore, a degree of divergence of a light flux emerging from the coupling lens is varied by temperature changes. As a result, there has been a problem that a position of an object point of the objective lens is changed, and spherical aberration is deteriorated. Since the deterioration of spherical aberration grows greater in proportion to the fourth power of NA of the lens, the aforementioned problem becomes more obvious on a high density optical disc employing an objective lens having NA 0.85.

In the aforesaid structure, it is possible to make changes in a degree of divergence of a light flux emitted from the coupling lens to be zero substantially even when ambient temperatures are varied, by determining paraxial power of the diffracting surface so that changes in a degree of divergence of an emerging light flux caused by changes in the refractive index of the coupling lens following upon temperature changes may be compensated by diffracting power changes caused by wavelength changes of a violet semiconductor laser following upon temperature changes. Owing to this, even when using an objective lens having NA 0.85, changes in magnification of the objective lens caused by temperature changes do not exist, and spherical aberration is not deteriorated accordingly. Further, a sign of paraxial power of a diffracting surface necessary for compensating changes in a degree of divergence of a light flux emerging from the coupling lens following upon temperature changes and a sign of paraxial power of the diffracting surface necessary for correcting chromatic aberration in a violet area are in the same positive direction, and therefore, a correction of chromatic aberration in the violet area can be made to be compatible with a compensation of changes in a degree of divergence of a light flux emerging from the coupling lens following upon temperature changes.

Further, it is preferable that recording density of the first optical disc is greater than that of the second optical disc, and the following expression is satisfied when NA1 represents a numerical aperture of the objective lens in the case of conducting recording and/or reproducing of information for the first optical disc, m1 represents a magnification of the objective lens unit in the case of conducting recording and/or reproducing of information for the first optical disc, f1 (mm) represents a focal length of the objective lens unit for $\lambda 1$ in the case of conducting recording and/or reproducing of information for the first optical disc, $\lambda 1$ (mm) represents the first wavelength, $f_c$ (mm) represents a focal length of the coupling lens for $\lambda 1$, n represents a refractive index of the coupling lens for $\lambda 1$, α represents the coefficient of linear expansion of the coupling lens, $P_D$ (mm$^{-1}$) represents paraxial power of the diffracting surface for $\lambda 1$, $P_C$ (mm$^{-1}$) represents paraxial power of the coupling lens for $\lambda 1$, dn/dt represents a change rate of refractive index of the coupling lens for temperature changes, dn/dλ represents a change rate of refractive index of the coupling lens for wavelength changes, and dλ/dt represents a change rate of wavelength of the first light source for temperature changes.

$$\{NA1 \cdot (1-m1)\}^4 \cdot (f1^2/f_C) \cdot |c1+(c2-c1) \cdot P_D/P_C| < 0.13 \cdot \lambda 1$$

wherein, the following expression holds, $$c1 = 1/(n-1) \cdot dn/dt + 1/(n-1) \cdot dn/d\lambda \cdot d\lambda/dt - \alpha$$

$$c2 = 1/\lambda 1 \cdot d\lambda/dt - 2\alpha$$

and $P_D$ is expressed by the following expression when an amount of addition of an optical path length by the aforesaid diffractive structure is defined by the optical path function expressed by the following Numeral 1, and n1 represents a diffraction order of diffracted light having the maximum diffraction efficiency among diffracted rays of light generated when the first light flux enters the diffractive structure.

$$P_D = -2 \cdot n1 \cdot B_2 \cdot (\lambda 1/\lambda B)$$

$$\phi_b = n \times (\lambda/\lambda B) \times \sum_{j=0} B_{2j} h^{2j} \quad \text{(Numeral 4)}$$

Incidentally, in the Numeral 4 above, h (mm) represents a height in the direction perpendicular to the optical axis, $B_{2j}$ represents the coefficient of optical path difference function, n represents a diffraction order of the diffracted light having the maximum diffraction efficiency among diffracted rays of light of the entering light flux, $\lambda$ (nm) represents a wavelength of a light flux entering the diffractive structure, and $\lambda B$ (nm) represents a manufacture wavelength of the diffractive structure.

In the specific method for compensating changes in a degree of divergence of the light flux emerging from a coupling lens following upon temperature changes, it is preferable to establish paraxial power of the diffracting surface so that the following expression may be satisfied.

$$[NA1 \cdot (1-m1)]^4 \cdot (f1^2/f_C) \cdot |c1 + (c2-c1) \cdot P_D/P_C| < 0.13 \cdot \lambda 1$$

wherein, the following expression holds.

$$c1 = 1/(n-1) \cdot dn/dt + 1/(n-1) \cdot dn/d\lambda \cdot d\lambda/dt - \alpha,$$

$$c2 = 1/\lambda 1 \cdot d\lambda/dt - 2\alpha$$

A change of wavefront aberration of the objective lens in the case of changes of a focal length of the coupling lens following upon temperature changes is obtained.

First, in the optical system composed of an objective lens and a coupling lens, there are considered changes in wavefront aberration of the objective lens caused by changes in a position of an object point of the objective lens and in a magnification of the objective lens both resulted from changes in a focal length of the coupling lens. Incidentally, the objective lens is assumed to be subjected to focusing so that defocusing component may become zero, in the case of magnification changes.

Rate of change $dW_0/dm_0$ of wavefront aberration $W_0$ (RMS value in a unit of mm) of the objective lens to changes of magnification m1 of the objective lens for wavelength $\lambda 1$ is expressed by the following expression under the assumption that NA1 represents a numerical aperture of the objective lens in the case of conducting recording and/or reproducing of information for a high density optical disc, f1 (mm) represents a focal length of the objective lens for wavelength $\lambda 1$, and $\beta$ represents the coefficient of proportion.

$$dW_0/dm_0 = \beta \cdot [NA1 \cdot (1-m1)]^4 \cdot f1$$

Incidentally, when the study was made with a single lens having NA1 of 0.85 and $\lambda 1$ of 405 nm, an absolute value of $\beta$ was 0.018.

Further, after obtaining rate of change $dm_0/df_C$ of a magnification of the objective lens to changes in a focal length of the coupling lens, the following expression is obtained approximately, when a light flux emerging from the coupling lens is close to the parallel light flux.

$$dm_0/df_c = -f1/f_c^2$$

Next, changes in a focal length of the coupling lens caused by temperature changes will be explained. First, the paraxial power of the total system of the coupling lens is made to be $P_C = P_R + P_D$ (mm$^{-1}$) under the assumption that $P_R$ (mm$^{-1}$) represents paraxial power of a refracting lens of the coupling lens and $P_D$ (mm$^{-1}$) represents paraxial power of the diffracting surface of the coupling lens. When plural optical surfaces are made to be diffracting surfaces, however, the sum total of paraxial powers of diffracting surfaces is represented by $P_D$.

Under the assumption that n represents a refractive index of the coupling lens for wavelength $\lambda 1$, $\alpha$ represents the coefficient of linear expansion, t represents a temperature and $f_C$ (mm) represents a focal length of the coupling lens for wavelength $\lambda 1$, rate of change $df_C/dt$ of a focal length of the coupling lens caused by temperature changes is expressed by the following expression;

$$df_C/dt = -f_C^2 \cdot dP_C/dt = -f_C^2 \cdot (c1 \cdot P_R + c2 \cdot P_D)$$

wherein, the following expression holds.

$$c1 = 1/(n-1) \cdot dn/dt + 1/(n-1) \cdot dn/d\lambda \cdot d\lambda/dt - \alpha$$

$$c2 = 1/\lambda 1 \cdot d\lambda/dt - 2\alpha$$

Or, the following expression holds, if $P_R = P_C - P_D$ is used.

$$df_C/dt = -f_C^2 \cdot [c1 \cdot (P_C - P_D) + c2 \cdot P_D]$$
$$= -f_C^2 \cdot P_C \cdot [c1 + (c2 - c1) \cdot (P_D/P_C)]$$
$$= -f_C \cdot [c1 + (c2 - c1) \cdot (P_D/P_C)]$$

In summarizing the foregoing, a change of wavefront aberration $\Delta W_0$ (RMS value in a unit of mm) of the objective lens for temperature change $\Delta t$ is expressed by the following expression, in this optical system.

$$\Delta W_0 = (dW_0/dm_0) \cdot |(dm_0/df_C) \cdot (df_C/dt) \cdot \Delta t|$$

In the aforesaid structure, it is possible to control this change $\Delta W_0$ to be small by providing a diffracting surface having appropriate paraxial power on the coupling lens.

Namely, the following condition is obtained under the necessary conditions that wavefront aberration of the objective lens at the standard state is assumed to be zero, and a change of wavefront aberration is controlled to be less than 0.07·$\lambda 1$ RMS for the temperature change of 300.

$$\Delta W_0 = (dw_0/dm_0) \cdot |(dm_0/df_C) \cdot (df_C/dt) \cdot 30| < 0.07 \cdot \lambda 1$$

When the aforesaid relationship is used for the expression above, the following conditional expression is obtained.

$$[NA1 \cdot (1-m1)]^4 \cdot (f1^2/f_C) \cdot |c1 + (c2-c1)P_D/P_C| < 0.13 \cdot \lambda 1$$

By establishing paraxial power of the diffracting surface so that the aforesaid relational expression may be satisfied, it is possible to arrange so that positional relationship between a light-emitting point of the laser light source and a position of focus of the coupling lens is not changed substantially even if temperatures are changed, thus, changes in a degree of divergence of the light flux emerging from the coupling lens caused by temperature changes can be compensated.

Further, it is preferable to satisfy the following expression.

$$|c1 + (c2-c1) \cdot P_D/P_C|/f_C < 0.08 \cdot \lambda 1 \text{ (mm)}$$

To comply with the optical pickup device employing an objective lens having standard specifications including NA1=0.85, f1=1.765 mm and m1=0, it is necessary to satisfy $$|c1 + (c2-c1) \cdot P_D/P_C|/f_C < 0.08 \cdot \lambda 1$$

as a range of practical conditions as a coupling lens, as stated above.

In the optical pickup device of the invention, it is preferable that the aforementioned chromatic aberration correcting optical unit has at least one optical surface whose paraxial power is negative, and is an optical element of a one-group construction through which the first light flux entering the optical element to be in parallel with an optical axis substantially emerges from it to be in parallel substantially.

In the aforesaid structure, it is possible to obtain a chromatic aberration correcting optical element capable of being arranged in the parallel light flux, by making paraxial power of a refracting lens for the first wavelength $\lambda 1$ and paraxial power of the diffracting surface for the first wavelength $\lambda 1$ to be the same substantially in terms of an absolute value, in the optical element of a one-group construction. The chromatic aberration correcting optical element of this kind is most suitable for an optical pickup device employing a liquid crystal element, as a spherical aberration correcting optical unit.

In the optical pickup device of the invention, it is preferable that the objective lens unit is composed of at least two types of optical discs including the first objective lens used for conducting recording and/or reproducing of information for an optical disc having prescribed recording density among the aforesaid two kinds of optical discs and the second objective lens used for conducting recording and/or reproducing of information for an optical disc other than one having prescribed recording density, and of an objective lens switching mechanism for switching these objective lenses selectively.

For the purpose of attaining low cost by simplifying the structure of an optical pickup device, it is preferable to make optical parts including an objective lens essentially to be common for a high density optical disc, DVD and CD. However, in the case of a high density optical disc, optical specifications such as a thickness of a protective layer and a numerical aperture are still in the actual circumstances that they are not determined, because light sources capable of being used are limited, with an exception that the wavelength to be used for recording/reproducing of information has mostly been determined.

Therefore, with respect to the objective lens used for conducting recording/reproducing of information for a high density optical disc, it is necessary to allow tediousness to be in design to a certain extent, and in this case, it is extremely difficult, on the point of aberration characteristics, to conduct recording/reproducing of information even for DVD and CD by using the common objective lens.

Therefore, as stated above, it is possible to provide an optical pickup device capable of conducting recording/reproducing of information properly while maintaining interchangeability for plural types of optical discs such as a high density optical disc, DVD and CD, by constituting the objective lens unit with at least two types of objective lenses including a first objective lens used for conducting recording/reproducing of information for an optical disc having prescribed recording density and a second objective lens used for conducting recording/reproducing of information for an optical disc other than the aforesaid optical disc, and with an objective lens switching lens.

For reducing the number of optical parts of an optical pickup device, it is preferable, essentially, that a diffractive structure for correcting chromatic aberration is formed on an optical surface of the objective lens used for conducting recording/reproducing of information for a high density optical disc. However, radius of curvature of the optical surface of the objective lens for a high density optical disc tends to be small because the objective lens needs a great power. When a diffractive structure is formed on an optical surface having such small radius of curvature, light utilization efficiency is lowered by an interference of a ring-shaped zonal step with a ray of light, it is preferable, from a viewpoint of light utilization efficiency, that a diffractive structure for chromatic aberration correction is formed on an optical surface of optical parts other than the objective lens.

However, it is not preferable, from a viewpoint of the number of optical parts, that an optical part on which a diffractive structure optimized in the violet area is provided in the optical path through which only light flux emitted from a violet laser light source passes.

From these reasons, it is preferable that a chromatic aberration correcting optical element is arranged in the optical path through which a light flux emitted from the violet laser light source for a high density optical disc and a light flux emitted from a laser light source for DVD and CD pass, and it is possible to arrange the chromatic aberration correcting optical element in the optical path through which a light flux emitted from the violet laser light source for a high density optical disc and a light flux emitted from a laser light source for DVD and CD pass, because a depth of the ring-shaped zonal step of the diffractive structure of the chromatic aberration correcting optical element is designed as stated above, in the optical pickup device of the invention. Thus, it is possible to obtain an optical pickup device suitable for downsizing, weight reduction and cost reduction.

In the optical pickup device of the invention, it is preferable that recording density of the first optical disc is greater than that of the second optical disc, and a numerical aperture of the objective lens unit for conducting recording and/or reproducing of information for the first optical disc is 0.8 or more.

In the optical pickup device of the invention, it is preferable that recording density of the first optical disc is greater than that of the second optical disc, the first optical disc has, on its information recording surface, the first protective layer whose thickness is within a range of 0.07-0.13 mm, the second optical disc has, on its information recording surface, the second protective layer whose thickness is within a range of 0.55-0.65 mm, and it is possible to conduct recording and/or reproducing of information for the first optical disc and the second optical disc by converging the first light flux on an information recording surface of each of the first and second optical discs.

As stated above, optical specifications such as a thickness of a protective layer and a numerical aperture are not yet determined, because light sources capable of being used are limited, although the wavelength to be used for recording/reproducing of information has been determined substantially. As a high density optical disc, there have been studied specifications including numerical aperture NA 0.85 and a thickness of a protective layer of 0.1 mm and specifications including numerical aperture NA 0.65 and a thickness of a protective layer of 0.6 mm. In an optical disc player for a high density optical disc, capability of conducting recording/reproducing of information properly even for plural types of high density optical discs each having a different standard leads to an enhancement of a product value. In the optical pickup device of the invention, it is possible to conduct recording/reproducing of information properly even for plural types of high density optical discs each having a different standard, by employing the aforesaid structure.

In the optical pickup device of the invention, it is preferable that the optical pickup device further has a third light source emitting a third light flux with third wavelength $\lambda 3$ (730 nm$\leq \lambda 3 \leq$830 nm), the objective lens unit converges a third light flux emitted from the third light source on an information recording surface of a third optical disc having recording density which is different from those of the first and second optical discs, and the third light flux enters the objective lens unit without being transmitted through the chromatic aberration correcting optical element.

In the lens design of the objective lens capable of conducting recording/reproducing for a high density optical disc, DVD and CD, if a magnification for conducting recording/reproducing of information for a high density optical disc is made to be the same as that for conducting recording/reproducing of information for DVD (magnification which is substantially zero is more preferable), and if a magnification for conducting recording/reproducing of information for CD is made to be a negative one smaller than that for conducting recording/reproducing of information for a high density optical disc and DVD, characteristics for each light flux can be enhanced and diffraction efficiency can be enhanced simultaneously, which makes a lens to be one having the greatest tolerance for manufacture errors.

In the optical pickup device employing the objective lens of this kind, therefore, it is preferable to make an arrangement wherein each of the first light flux and the second light flux enter the objective lens after passing through the chromatic aberration correcting optical element and the third light flux enters the objective lens without passing through the chromatic aberration correcting optical element, by arranging the chromatic aberration correcting optical element in the common optical path for the first and second light fluxes.

In the optical pickup device having the structure mentioned above, it is preferable, from the viewpoint of reduction of the number of parts, that the chromatic aberration correcting optical element is made to be integrated solidly with an optical unit having other functions. For example, a collimator lens and the chromatic aberration correcting optical element can be integrated solidly each other by forming a diffractive structure on an optical surface of the collimator lens that converts divergent light fluxes emitted respectively from the first and second light sources into parallel light fluxes to guide them to the objective lens. Further, it is more preferable to arrange a structure wherein a collimator lens integrated solidly with the chromatic aberration correcting optical element can be moved by an actuator in the optical axis direction, and thereby, it is possible to add a function as a chromatic aberration correcting optical element to the collimator lens to make it to have a function as a spherical aberration correcting optical unit.

Or, it is also possible to make an expander lens having a function as a spherical aberration correcting optical unit to have a function as a chromatic aberration correcting optical element by forming a diffractive structure on an optical surface of the expander lens which has been made to be capable of moving in the optical axis direction.

In the case of the structure wherein the third light flux does not pass through the chromatic aberration correcting optical element as in the invention, it is preferable to make the combination of diffraction order n1 of the first light flux and diffraction order n2 of the second light flux of the chromatic aberration correcting optical unit to be (n1, n2)=(5, 3). When the chromatic aberration correcting optical element is made to be a plastic lens, it is possible to make both of diffraction order of $5^{th}$ order diffracted light of the first light flux and diffraction order of $3^{rd}$ order diffracted light of the second light flux to be 100%, and high diffraction efficiency can be secured for any wavelength.

Contrary to this, in the case of the structure wherein the third light flux passes through the chromatic aberration correcting optical element, it is possible to make diffraction order of each light flux to be 100% by making the combination of diffraction order n1 of the first light flux, diffraction order n2 of the second light flux and diffraction order n3 of the third light flux to be (n1, n2, n3)=(10, 6, 5). However, since the diffraction order n1 of the first light flux is of a high order, the diffraction efficiency is lowered by about 6% when the first light source wavelength error of +5 nm. The combination of orders where a fall of diffraction efficiency by the wavelength errors is small is (n1, n2, n3)=(2, 1, 1), and diffraction efficiency of each light flux in this case is 100%, 87% and 100% respectively, which means that the diffraction efficiency of the second light flux is low. Incidentally, a fall of the diffraction efficiency for wavelength errors +5 nm of the first light source in the combination of the aforesaid (n1, n2)=(5, 3) is about 1.5%.

From the foregoing, it is preferable, from the viewpoint of a fall of the diffraction efficiency of a light flux passing through the chromatic aberration correcting optical element and of the diffraction efficiency for wavelength errors, to arrange the structure wherein the first light flux and the second light flux pass through the chromatic aberration correcting optical element and the third light flux does not pass through the chromatic aberration correcting optical element.

An optical information recording and reproducing apparatus of the invention houses therein the optical pickup device, and is capable of conducting at least one of recording of information on the first optical disc and on the second optical disc, and reproducing of information recorded on the first optical disc and the second optical disc.

An expander lens used in the invention is one having therein the first light source that emits the first light flux having the first wavelength $\lambda 1$ that is not more than 450 nm, the second light source that emits the second light flux having the second wavelength $\lambda 2$ that is longer than 1.3 times the first wavelength $\lambda 1$ that is not more than 450 nm, and an objective lens unit that converges the first light flux emitted from the first light source on an information recording surface of the first optical disc and converges the second light flux emitted from the second light source on an information recording surface of the second optical disc having recording density different from that of the first optical disc wherein the expander lens is arranged between a group of the first and second light sources and the objective lens unit and is arranged in the optical path that is common to the first and second light fluxes, the expander lens has a positive lens group and a negative lens group, the expander lens has a chromatic aberration correcting optical element having, on at least one optical surface thereof, a diffracting surface on which a diffractive structure composed of plural ring-shaped zones divided by microscopic steps is formed, a depth of the step in the optical axis direction is designed so that diffraction order n2 of the diffracted light having the maximum diffraction efficiency among diffracted rays of light generated when the second light flux enters may be lower than diffraction order n1 of the diffracted light having the maximum diffraction efficiency among diffracted rays of light generated when the first light flux enters the diffractive structure, and an angle of inclination of marginal ray of light of a light flux entering the objective lens unit is changed by changing and adjusting a distance between at least one lens group among lens groups constituting the expander lens and the objective lens.

In the expander lens used in the invention, it is preferable that the second wavelength $\lambda 2$ is a wavelength that is within a range of 600 nm-700 nm, and a combination of the diffraction orders n1 and n2 is either one of (n1, n2) (2, 1), (3, 2), (4, 2), (5, 3), (6, 4), (7, 4), (8, 5), (10, 6).

In the expander lens used in the invention, it is preferable that the refractive index of a constituent lens having the diffracting surface of the chromatic aberration correcting optical element for the first wavelength $\lambda 1$ is in a range of 1.5-1.6, Abbe's number for d line (wavelength 587.6 nm) is in a range of 50-60, and depth d0 of the step that is closest to the optical axis in the optical axis direction satisfies either one of the following expressions (1)-(8).

$$1.2 \text{ } \mu m < d0 < 1.7 \text{ } \mu m \tag{1}$$

$$1.9 \text{ } \mu m < d0 < 2.6 \text{ } \mu m \tag{2}$$

$$2.6 \text{ } \mu m < d0 < 3.2 \text{ } \mu m \tag{3}$$

$$3.3 \text{ } \mu m < d0 < 4.2 \text{ } \mu m \tag{4}$$

$$4.4 \text{ } \mu m < d0 < 5.0 \text{ } \mu m \tag{5}$$

$$4.7 \text{ } \mu m < d0 < 5.7 \text{ } \mu m \tag{6}$$

$$5.6 \text{ } \mu m < d0 < 6.5 \text{ } \mu m \tag{7}$$

$$6.9 \text{ } \mu m < d0 < 8.1 \text{ } \mu m \tag{8}$$

In the expander lens used in the invention, it is preferable that the optical pickup device has a third light source emitting a third light flux having third wavelength $\lambda 3$ that is different from each of the first wavelength $\lambda 1$ and the second wavelength $\lambda 2$, the objective lens unit converges the third light flux emitted from the third light source on an information recording surface of the third optical disc having recording density that is different from that of each of the first optical disc and the second optical disc, the expander lens is arranged in the optical path common for the first-third light fluxes, the second wavelength $\lambda 2$ is within a range of 600 nm-700 nm, the third wavelength $\lambda 3$ is within a range of 730 nm-830 nm, and a combination of the diffraction orders n1, n2 and n3 is either one of (n1, n2, n3)=(2, 1, 1), (4, 2, 2), (6, 4, 3,), (8, 5, 4), (10, 6, 5), when n3 represents a diffraction order of the diffracted light having the maximum diffraction efficiency among diffracted rays of light generated when the third light flux enters the diffractive structure.

In the expander lens used in the invention, it is more preferable that the refractive index of a constituent lens having the diffracting surface of the chromatic aberration correcting optical element for the first wavelength $\lambda 1$ is in a range of 1.5-1.6, Abbe's number for d line (wavelength 587.6 nm) is in a range of 50-60, and depth d0 of the step that is closest to the optical axis in the optical axis direction satisfies either one of the following expressions (9)-(13).

$$1.2 \text{ } \mu m < d0 < 1.7 \text{ } \mu m \tag{9}$$

$$2.6 \text{ } \mu m < d0 < 3.0 \text{ } \mu m \tag{10}$$

$$4.4 \text{ } \mu m < d0 < 5.0 \text{ } \mu m \tag{11}$$

$$5.6 \text{ } \mu m < d0 < 6.5 \text{ } \mu m \tag{12}$$

$$6.9 \text{ } \mu m < d0 < 8.1 \text{ } \mu m \tag{13}$$

A coupling lens used in the invention is one having therein the first light source that emits the first light flux having the first wavelength $\lambda 1$ that is not more than 450 nm, the second light source that emits the second light flux having the second wavelength $\lambda 2$ that is longer than 1.3 times the first wavelength $\lambda 1$ that is not more than 450 nm, and an objective lens unit that converges the first light flux emitted from the first light source on an information recording surface of the first optical disc and converges the second light flux emitted from the second light source on an information recording surface of the second optical disc having recording density different from that of the first optical disc wherein the coupling lens is arranged between a group of the first and second light sources and the objective lens unit and is arranged in the optical path that is common to the first and second light fluxes, the coupling lens has a positive lens group and a negative lens group, the coupling lens has a chromatic aberration correcting optical element having, on at least one optical surface thereof, a diffracting surface on which a diffractive structure composed of plural ring-shaped zones divided by microscopic steps is formed, a depth of the step in the optical axis direction is designed so that diffraction order n2 of the diffracted light having the maximum diffraction efficiency among diffracted rays of light generated when the second light flux enters may be lower than diffraction order n1 of the diffracted light having the maximum diffraction efficiency among diffracted rays of light generated when the first light flux enters the diffractive structure, and an angle of inclination of marginal ray of light of a light flux entering the objective lens unit is changed by changing and adjusting a distance between at least one lens group among lens groups constituting the coupling lens and the objective lens.

In the coupling lens used in the invention, it is preferable that the second wavelength $\lambda 2$ is a wavelength that is within a range of 600 nm -700 nm, and a combination of the diffraction orders n1 and n2 is either one of (n1, n2)=(2, 1), (3, 2), (4, 2), (5, 3), (6, 4), (7, 4), (8, 5), (10, 6).

In the coupling lens used in the invention, it is preferable that the refractive index of a constituent lens having the diffracting surface of the chromatic aberration correcting optical element for the first wavelength $\lambda 1$ is in a range of 1.5-1.6, Abbe's number for d line (wavelength 587.6 nm) is in a range of 50-60, and depth d0 of the step that is closest to the optical axis in the optical axis direction satisfies either one of the following expressions (1)-(8).

$$1.2 \text{ } \mu m < d0 < 1.7 \text{ } \mu m \tag{1}$$

$$1.9 \text{ } \mu m < d0 < 2.6 \text{ } \mu m \tag{2}$$

$$2.6 \text{ } \mu m < d0 < 3.2 \text{ } \mu m \tag{3}$$

$$3.3 \text{ } \mu m < d0 < 4.2 \text{ } \mu m \tag{4}$$

$$4.4 \text{ } \mu m < d0 < 5.0 \text{ } \mu m \tag{5}$$

$$4.7 \text{ } \mu m < d0 < 5.7 \text{ } \mu m \tag{6}$$

$$5.6 \text{ } \mu m < d0 < 6.5 \text{ } \mu m \tag{7}$$

$$6.9 \text{ } \mu m < d0 < 8.1 \text{ } \mu m \tag{8}$$

In the coupling lens used in the invention, it is preferable that the optical pickup device has a third light source emitting a third light flux having third wavelength $\lambda 3$ that is different from each of the first wavelength $\lambda 1$ and the second wavelength $\lambda 2$, the objective lens unit converges the third light flux emitted from the third light source on an information recording surface of the third optical disc having recording density that is different from that of each of the first optical disc and the second optical disc, the coupling lens is arranged in the optical path common for the first-third light fluxes, the second wavelength $\lambda 2$ is within a range of 600 nm-700 nm, the third wavelength $\lambda 3$ is within a range of 730 nm-830 nm, and a combination of the diffraction orders n1, n2 and n3 is either one of (n1, n2, n3)=(2, 1, 1), (4, 2, 2), (6, 4, 3,), (8, 5, 4), (10, 6, 5), when n3 represents a diffraction order of the diffracted light having the maximum diffraction efficiency among diffracted rays of light generated when the third light flux enters the diffractive structure.

In the coupling lens used in the invention, it is more preferable that the refractive index of a constituent lens having the diffracting surface of the chromatic aberration correcting optical element for the first wavelength $\lambda 1$ is in a range of 1.5-1.6, Abbe's number for d line (wavelength 587.6 nm) is in a range of 50-60, and depth d0 of the step that is closest to the optical axis in the optical axis direction satisfies either one of the following expressions (9)-(13).

$$1.2 \ \mu m < d0 < 1.7 \ \mu m \tag{9}$$

$$2.6 \ \mu m < d0 < 3.0 \ \mu m \tag{10}$$

$$4.4 \ \mu m < d0 < 5.0 \ \mu m \tag{11}$$

$$5.6 \ \mu m < d0 < 6.5 \ \mu m \tag{12}$$

$$6.9 \ \mu m < d0 < 8.1 \ \mu m \tag{13}$$

In the coupling lens used in the invention, it is preferable that a combination of the diffraction orders n1 and n2 is either one of (n1, n2)=(5, 3), (6, 4), (7, 4), (8, 5) and (10, 6), while, either one of (n1, n2)=(5, 3), (7, 4) and (10, 6) is preferable in particular, and (n1, n2)=(5, 3) is most preferable.

In the coupling lens used in the invention, it is preferable that the refractive index of a constituent lens having the diffracting surface for the first wavelength $\lambda 1$ is in a range of 1.5-1.6, Abbe's number of the constituent lens having the diffracting surface for d line (wavelength 587.6 nm) is in a range of 50-60, and depth d0 of the step that is closest to the optical axis in the optical axis direction satisfies either one of the following (4), (6) and (8) expressions.

$$3.3 \ \mu m < d0 < 4.2 \ \mu m \tag{4}$$

$$4.7 \ \mu m < d0 < 5.7 \ \mu m \tag{6}$$

$$6.9 \ \mu m < d0 < 8.1 \ \mu m \tag{8}$$

In the coupling lens used in the invention, it is preferable that the optical pickup device has a third light source emitting a third light flux having third wavelength $\lambda 3$ that is different from each of the first wavelength $\lambda 1$ and the second wavelength $\lambda 2$, the objective lens unit converges the third light flux emitted from the third light source on an information recording surface of the third optical disc having recording density that is different from that of each of the first optical disc and the second optical disc, the coupling lens is arranged in the optical path common for the first-third light fluxes, the second wavelength $\lambda 2$ is within a range of 600 nm-700 nm, the third wavelength $\lambda 3$ is within a range of 730 nm-830 nm, and a combination of the diffraction orders n1, n2 and n3 is either one of (n1, n2, n3)=(2, 1, 1), (8, 5, 4), (10, 6, 5), when n3 represents a diffraction order of the diffracted light having the maximum diffraction efficiency among diffracted rays of light generated when the third light flux enters the diffractive structure.

In the coupling lens stated above, it is preferable that depth d of the step closest to the optical axis in the optical axis direction satisfies either one of the following expressions (9), (12) and (13).

$$1.2 \ \mu m < d0 < 1.7 \ \mu m \tag{9}$$

$$5.6 \ \mu m < d0 < 6.5 \ \mu m \tag{12}$$

$$6.9 \ \mu m < d0 < 8.1 \ \mu m \tag{13}$$

In the coupling lens used in the invention, it is preferable that the coupling lens has at least one plastic lens, and a diffracting surface has a function for controlling changes of an angle of divergence or an angle of convergence for temperature changes of the first light flux emerging from the coupling lens.

In the coupling lens used in the invention, it is preferable that the following expression is satisfied when $\lambda 1$ (mm) represents the first wavelength, $f_C$ (mm) represents a focal length of the coupling lens for $\lambda 1$, n represents a refractive index of the coupling lens for $\lambda 1$, $\alpha$ represents the coefficient of linear expansion of the coupling lens, $P_D$ (mm$^{-1}$) represents paraxial power of the diffracting surface for $\lambda 1$, $P_C$ (mm$^{-1}$) represents paraxial power of the coupling lens for $\lambda 1$, dn/dt represents a change rate of refractive index of the coupling lens for temperature changes, dn/d$\lambda$ represents a change rate of refractive index of the coupling lens for wavelength changes, and d$\lambda$/dt represents a change rate of wavelength of the first light source for temperature changes;

$$|c1+(c2-c1) \cdot P_D/P_C|/f_C < 0.08 \cdot \lambda 1 \ (mm)$$

wherein, the following expression holds, $$c1=1/(n-1) \cdot dn/dt+1/(n-1) \cdot dn/d\lambda \cdot d\lambda/dt-\alpha,$$

$$c2=1/\lambda 1 \cdot d\lambda/dt-2\alpha$$

and $P_D$ is expressed by the following expression when an amount of addition of an optical path length by the aforesaid diffractive structure is defined by the optical path function expressed by the following Numeral 1, and n1 represents a diffraction order of diffracted light having the maximum diffraction efficiency among diffracted rays of light generated when the first light flux enters the diffractive structure.

$$P_D = -2 \cdot n1 \cdot B_2 \cdot (\lambda 1/\lambda B)$$

$$\phi_b = n \times (\lambda/\lambda B) \times \sum_{j=0} B_{2j} h^{2j} \tag{Numeral 4}$$

Incidentally, in the Numeral 4 above, h (mm) represents a height in the direction perpendicular to the optical axis, B2j represents the coefficient of optical path difference function, n represents a diffraction order of the diffracted light having the maximum diffraction efficiency among diffracted rays of light of the entering light flux, $\lambda$ (nm) represents a wavelength of a light flux entering the diffractive structure, and $\lambda B$ (nm) represents a manufacture wavelength of the diffractive structure.

A chromatic aberration correcting optical element used in the invention is one having therein the first light source that emits the first light flux having the first wavelength $\lambda 1$ that is not more than 450 nm, the second light source that emits the second light flux having the second wavelength $\lambda 2$ that is longer than 1.3 times the first wavelength $\lambda 1$ that is not more than 450 nm, and an objective lens unit that converges the first light flux emitted from the first light source on an information recording surface of the first optical disc and converges the second light flux emitted from the second light source on an information recording surface of the second optical disc having recording density different from that of the first optical disc wherein the chromatic aberration correcting optical element is arranged between a group of the first and second light sources and the objective lens unit and is arranged in the optical path that is common to the first and second light fluxes, and it is the chromatic aberration correcting optical element where the first light flux enters to be substantially parallel with the optical axis and emerges to be substantially in parallel, and it has, on at least one optical surface thereof, the diffracting surface on which a diffractive structure composed of plural ring-shaped zones divided by microscopic steps is formed, and a depth of the step in the optical axis direction is designed so that diffraction order n2 of the diffracted light having the maximum diffraction efficiency among diffracted rays of light generated when the second light flux enters may be lower than diffraction order n1 of the diffracted light having the maximum diffraction efficiency among diffracted rays of light generated when the first light flux enters the diffractive structure.

In the chromatic aberration correcting optical element used in the invention, it is preferable that the diffractive structure is formed on an optical surface that is macroscopically flat, and an optical surface opposite to the aforementioned optical surface is one on which the paraxial power is negative and no diffractive structure is formed.

In the chromatic aberration correcting optical element used in the invention, it is preferable that the second wavelength λ2 is within a range of 600 nm-700 nm, and a combination of the diffraction orders n1 and n2 is either one of (n1, n2)=(2, 1), (3, 2), (4, 2), (5, 3), (6, 4), (7, 4), (8, 5), (10, 6).

In the chromatic aberration correcting optical element used in the invention, it is preferable that the refractive index of a constituent lens having the diffracting surface of the chromatic aberration correcting optical element for the first wavelength λ1 is in a range of 1.5-1.6, Abbe's number for d line (wavelength 587.6 nm) is in a range of 50-60, and depth d0 of the step that is closest to the optical axis in the optical axis direction satisfies either one of the following expressions (1)-(8).

$$1.2\ \mu m < d0 < 1.7\ \mu m \quad (1)$$

$$1.9\ \mu m < d0 < 2.6\ \mu m \quad (2)$$

$$2.6\ \mu m < d0 < 3.2\ \mu m \quad (3)$$

$$3.3\ \mu m < d0 < 4.2\ \mu m \quad (4)$$

$$4.4\ \mu m < d0 < 5.0\ \mu m \quad (5)$$

$$4.7\ \mu m < d0 < 5.7\ \mu m \quad (6)$$

$$5.6\ \mu m < d0 < 6.5\ \mu m \quad (7)$$

$$6.9\ \mu m < d0 < 8.1\ \mu m \quad (8)$$

In the chromatic aberration correcting optical element used in the invention, it is preferable that the optical pickup device has a third light source emitting a third light flux having third wavelength λ3 that is different from each of the first wavelength λ1 and the second wavelength λ2, the objective lens unit converges the third light flux emitted from the third light source on an information recording surface of the third optical disc having recording density that is different from that of each of the first optical disc and the second optical disc, the chromatic aberration correcting optical element is arranged in the optical path common for the first-third light fluxes, the second wavelength λ2 is within a range of 600 nm-700 nm, the third wavelength λ3 is within a range of 730 nm-830 nm, and a combination of the diffraction orders n1, n2 and n3 is either one of (n1, n2, n3)=(2, 1, 1, (4, 2, 2), (6, 4, 3), (8, 5, 4), (10, 6, 5) when n3 represents the diffraction order of the diffracted light having the maximum diffraction efficiency among diffracted rays of light generated when the third light flux enters the diffractive structure.

In the chromatic aberration correcting optical element used in the invention, it is preferable that the refractive index of a constituent lens having the diffracting surface of the chromatic aberration correcting optical element for the first wavelength λ1 is in a range of 1.5-1.6, Abbe's number for d line (wavelength 587.6 nm) is in a range of 50-60, and depth d0 of the step that is closest to the optical axis in the optical axis direction satisfies either one of the following expressions (9)-(13).

$$1.2\ \mu m < d0 < 1.7\ \mu m \quad (9)$$

$$2.6\ \mu m < d0 < 3.0\ \mu m \quad (10)$$

$$4.4\ \mu m < d0 < 5.0\ \mu m \quad (11)$$

$$5.6\ \mu m < d0 < 6.5\ \mu m \quad (12)$$

$$6.9\ \mu m < d0 < 8.1\ \mu m \quad (13)$$

Exemplary Embodiments of the Invention

Preferred embodiments for the working of the invention will be explained in detail as follows, referring to the drawings.

First Embodiment

FIG. 1 is a plan view showing schematically the structure of first optical pickup device PU1 capable of conducting recording/reproducing of information properly for any of high density optical disk HD, DVD and CD.

In the optical specifications of the high density optical disk HD, a wavelength is 405 nm, a thickness of a protective layer is 0.6 mm and numerical aperture NA is 0.65, in the optical specifications of DVD, a wavelength is 655 nm, a thickness of a protective layer is 0.6 mm and numerical aperture NA is 0.63, and in the optical specifications of CD, a wavelength is 785 nm, a thickness of a protective layer is 1.2 mm and a numerical aperture is 0.50. However, a combination of a wavelength, a thickness of a protective layer and a numerical aperture is not limited to the foregoing.

The optical pickup device PU1 is composed of module MD1 for high density optical disc wherein violet semiconductor laser LD1 that emits a laser light flux having a wavelength of 405 nm when conducting recording/reproducing of information for high density optical disc HD and photodetector PD1 are integrated solidly, laser module LM having therein first light emitting point EP1 that emits a laser light flux having a wavelength of 655 nm when conducting recording/reproducing of information for DVD, second light emitting point EP2 that emits a laser light flux having a wavelength of 785 nm when conducting recording/reproducing of information for CD, first light-receiving portion DS1 that receives a light flux reflected from information recording surface RL2 of DVD, second light-receiving portion DS2 that receives a light flux reflected from information recording surface RL3 of CD and prism PS, objective lens unit OU that is made up of objective lens OBJ, biaxial actuator AC2 and of diaphragm STO corresponding to numerical aperture NA of 0.65 of high density disc HD, polarized beam splitter BS, collimator lens COL, and of expander lens unit EU that is made up of negative lens NL and positive lens P1.

Incidentally, FIG. 1 also shows a side view of laser module LM.

Further, as a light source for high density optical disc HD, it is also possible to use a violet SHG laser in addition to the aforementioned violet semiconductor laser LD1.

Further, objective lens OBJ is a plastic lens having an aspheric surface on its both sides optimized for high density optical disc HD, and a filter having wavelength-selectivity is formed on an optical surface of the plastic lens closer to the light source. This filter realizes numerical aperture NA of 0.63 for DVD and realizes numerical aperture NA of 0.50 for CD, by limiting a passage area for a light flux depending on a wavelength.

In place of the filter having the wavelength-selectivity, it is also possible to form the diffractive structures such as those described on pages 55-56 on the abstract of lecture for $27^{th}$ Optics Symposium, on the light-source-side optical surface of objective lens OBJ.

Further, on the objective lens unit OU, there is provided an operation control circuit that controls operations of biaxial actuator AC2, though the operation control circuit is not illustrated.

The expander lens unit EU has both of a function as an optical unit for correcting chromatic aberration and a function as an optical unit for correcting spherical aberration. In other words, the same optical unit serves as an optical unit for correcting chromatic aberration and as an optical unit for correcting spherical aberration.

Further, on the optical surface of positive lens PL of expander lens EXP, there is formed a diffractive structure for correcting chromatic aberration of objective lens OBJ in a violet area, and as is shown on an enlarged diagram in FIG. 1, depth d0 of a step of its ring-shaped zone in the optical axis direction is designed so that the order of diffraction of the diffracted light having the maximum diffraction efficiency among diffracted light generated when light fluxes having respectively a wavelength of 655 nm and a wavelength of 785 nm enter may be lower than the order of diffraction of the diffracted light having the maximum diffraction efficiency among diffracted light generated when a laser light flux having a wavelength of 405 nm enters. Owing to this, sufficient diffraction efficiency can be obtained in each wavelength area, and chromatic aberration corrections in a wavelength area for wavelength 655 nm and that for wavelength 785 nm are prevented from being excessive.

Since an inclined angle of a marginal ray of light for a light flux entering objective lens OBJ can be changed when negative lens NL of the expander lens EXP is displaced along an optical axis by uniaxial actuator AC1, it is possible to correct spherical aberration changes of the spot on an information recording surface of a high density optical disc generated by various factors, details of which will be explained later.

Incidentally, on the expander lens unit EU, there is provided an operation control circuit that controls operations of uniaxial actuator AC1, though the illustration thereof is omitted.

When conducting recording/reproducing of information for high density optical disc HD in optical pickup device PU1, module MD1 for high density optical disc HD is operated to make violet semiconductor laser LD1 to emit light, as its course for a ray of light is shown with solid lines in FIG. 1. A divergent light flux emitted from the violet semiconductor laser LD1 is transmitted through polarized beam splitter BS, then, passes through collimator lens COL to be transformed into a collimated light flux, then, is transmitted through expander lens EXP to be enlarged in terms of a diameter of the light flux, then, its diameter is regulated by diaphragm STO to become a spot formed on information recording surface RL1 through protective layer PL1 of high density optical disc HD by objective lens OBJ. The objective lens OBJ conducts focusing and tracking with biaxial actuator AC that is arranged around the objective lens. The reflected light flux modulated by information pits on information recording surface RL1 is transmitted again through objective lens OBJ, diaphragm STO, expander lens EXP and collimator lens COL to become a converged light flux, and is converged on a light-receiving surface of photodetector PD1 of module MD1 for high density optical disc HD, after being transmitted through polarized beam splitter. Thus, information recorded on high density optical disc HD can be read by the use of output signals of the photodetector PD1.

In the course of conducting recording/reproducing of information for high density optical disc HD, when spherical aberration of the spot on information recording surface RL1 is changed in the direction toward the excessive correction by the influence of, for example, wavelength changes of violet semiconductor laser LD1, errors in thickness of protective layer PL1, focus jump between information recording surfaces of a two-layer disc, ambient temperature changes and changes in refractive index of objective lens OBJ caused by heat generation of biaxial actuator AC2, negative lens NL of expander lens EXP is displaced by uniaxial actuator AC1 so that a distance to the objective lens OBJ may be shortened. On the contrary, when spherical aberration of the spot on information recording surface RL1 is changed in the direction toward insufficient correction, negative lens NL of expander lens EXP is displaced by uniaxial actuator AC1 so that a distance to the objective lens OBJ may be broadened. Due to this, the spot on the information recording surface RL1 turns out to be in the state where spherical aberration is corrected constantly, thus, excellent characteristics for recording/reproducing for high density optical disc HD can be obtained.

Further, a wavefront transmitted through positive lens PL of expander lens EXP and objective lens OBJ turns out to be in the state where chromatic aberration is properly corrected, a diameter of the spot converged on information recording surface RL1 is prevented from becoming large even when violet semiconductor laser LD1 causes mode hopping in the course of switching from reproducing of information to recording.

Further, when conducting recording/reproducing of information for DVD in the optical pickup device PU1, light-emitting point EP1 is made to emit light. A divergent light flux emitted from the light-emitting point EP1 is reflected on prism PS, and is reflected by polarized beam splitter BS to be transformed into a collimated light flux by collimator lens COL, as its course for a ray of light is shown with broken lines in FIG. 1. After that, a diameter of the light flux is enlarged by expander lens EXP, and then, it is regulated by diaphragm STO and is further regulated by a filter having wavelength-selectivity. Subsequently, the light flux becomes a spot which is formed by objective lens OBJ on information recording surface RL2 through protective layer PL2 of DVD. The objective lens OBJ conducts focusing and tracking with biaxial actuator AC arranged around the objective lens. The reflected light flux modulated by information pits on information recording surface RL2 is transmitted again through the objective lens, the diaphragm STO, expander lens EXP and collimator lens COL to become a converged light flux, then, reflected by polarized beam splitter BS to be converged on light-receiving portion DS1 after being reflected twice in prism PS. Thus, information recorded on DVD can be read by the use of output signals of the light-receiving portion DS1.

Since the objective lens OBJ is a plastic lens having an aspheric surface on its both sides optimized for high density optical disc HD as stated above, when a light flux having a wavelength of 655 nm enters objective lens OBJ, a spot formed on information recording surface RL2 of DVD through converging is changed in terms of spherical aberration in the direction toward excessive correction, by an influence of wavelength dispersion of objective lens OBJ. Therefore, when conducting recording/reproducing of information for DVD, a distance between negative lens NL of expander lens EXP and objective lens OBJ is optimized (namely, a position of an object point of objective lens OBJ is optimized) by narrowing a distance to objective lens OBJ so that spherical aberration changes may be corrected, to conduct recording/reproducing of information for DVD.

Further, when conducting recording/reproducing of information for CD in the optical pickup device PU1, light-emitting point EP2 is made to emit light. A divergent light flux emitted from the light-emitting point EP2 is reflected on prism PS, and is reflected by polarized beam splitter BS to be transformed into a collimated light flux by collimator lens COL, as its course for a ray of light is shown with two-dot chain lines in FIG. 1. After that, a diameter of the light flux is enlarged by expander lens EXP, and then, it is regulated by diaphragm STO and is further regulated by a filter having wavelength-selectivity. Subsequently, the light flux becomes a spot which is formed by objective lens OBJ on information recording surface RL3 through protective layer PL3 of CD. The objective lens OBJ conducts focusing and tracking with biaxial actuator AC arranged around the objective lens. The reflected light flux modulated by information pits on information recording surface RL3 is transmitted again through objective lens OBJ, diaphragm STO, expander lens EXP and collimator lens COL to become a converged light flux, and is reflected by polarized beam splitter BS to be converged on light-receiving portion DS2 after being reflected twice in prism PS. Thus, information recorded on DVD can be read by the use of output signals of the light-receiving portion DS2.

Since the objective lens OBJ is a plastic lens having an aspheric surface on its both sides optimized for high density optical disc HD as stated above, when a light flux having a wavelength of 785 nm enters objective lens OBJ, a spot formed on information recording surface RL3 of CD through converging is changed in terms of spherical aberration in the direction toward excessive correction, by an influence of wavelength dispersion of objective lens OBJ and of a difference between protective layer PL1 and protective layer PL3 of CD. Therefore, when conducting recording/reproducing of information for CD, a distance between negative lens NL of expander lens EXP and objective lens OBJ is optimized (namely, a position of an object point of objective lens OBJ is optimized) by narrowing a distance to objective lens OBJ so that spherical aberration changes may be corrected, to conduct recording/reproducing of information for CD.

Second Embodiment

Figure 2:
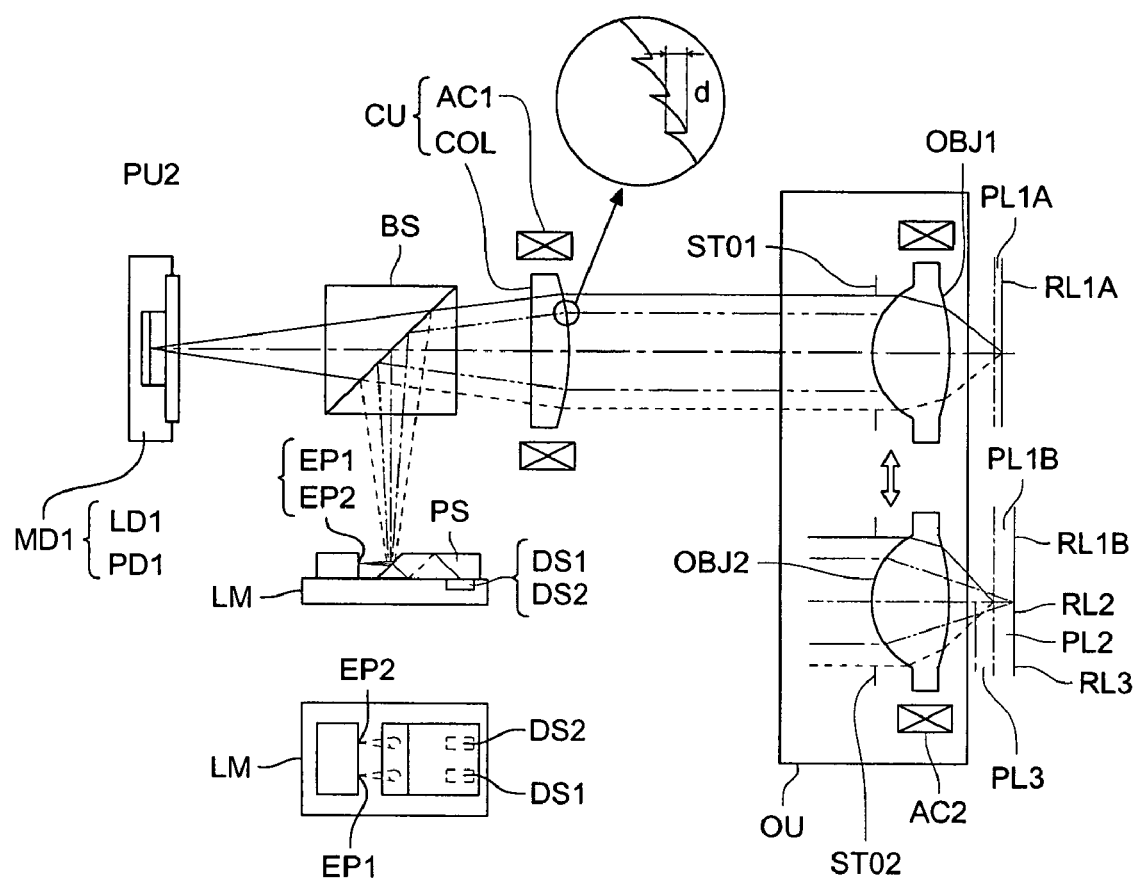
FIG. 2 is a plan view for primary portions showing the structure of an optical pickup device.

FIG. 2 is a plan view showing schematically the structure of second optical pickup device PU2 capable of conducting recording/reproducing of information properly for any of two types of high density optical discs each having a different standard including first high density optical disk HD1 and second high density optical disc HD2, DVD and CD. In the optical specifications of the first high density optical disk HD1, a wavelength is 405 nm, a thickness of a protective layer is 0.1 mm and numerical aperture NA is 0.85, in the optical specifications of the second high density optical disk HD2, a wavelength is 405 nm, a thickness of a protective layer is 0.6 mm and numerical aperture NA is 0.65, in the optical specifications of DVD, a wavelength is 655 nm, a thickness of a protective layer is 0.6 mm and numerical aperture NA is 0.63, and in the optical specifications of CD, a wavelength is 785 nm, a thickness of a protective layer is 1.2 mm and a numerical aperture is 0.50. However, a combination of a wavelength, a thickness of a protective layer and a numerical aperture is not limited to the foregoing.

The optical pickup device PU2 is composed of module MD1 for high density optical disc HD wherein violet semiconductor laser LD1 that emits a laser light flux having a wavelength of 405 nm when conducting recording/reproducing of information for the first high density optical disc HD1 and the second high density optical disc HD2 and photodetector PD1 are integrated solidly, laser module LM having therein first light emitting point EP1 that emits a laser light flux having a wavelength of 655 nm when conducting recording/reproducing of information for DVD, second light emitting point EP2 that emits a laser light flux having a wavelength of 785 nm when conducting recording/reproducing of information for CD, first light-receiving portion DS1 that receives a light flux reflected from information recording surface RL2 of DVD, second light-receiving portion DS2 that receives a light flux reflected from information recording surface RL3 of CD and prism PS, objective lens unit OU, polarized beam splitter BS, and of collimator lens unit CU that is made up of collimator lens COL and uniaxial actuator AC1.

Incidentally, FIG. 2 also shows a side view of laser module LM.

Further, as a light source for high density optical disc HD, it is also possible to use a violet SHG laser in addition to the aforementioned violet semiconductor laser LD1.

Further, the objective lens unit OU is composed of first objective lens OBJ1 for conducting recording/reproducing of information for first high density optical disc HD1, first diaphragm STO1 corresponding to numerical aperture NA 0.85 of the first high density optical disc HD1, second objective lens OBJ2 for conducting recording/reproducing of information for second high density optical disc HD2, DVD and CD, second diaphragm STO2 corresponding to numerical aperture NA 0.65 of the second high density optical disc HD2, biaxial actuator AC2, and of an objective lens switching means (not shown) that switches the first objective lens OBJ1 and the second objective lens OBJ2 selectively depending on recording density of an optical disc conducting recording/reproducing as shown with an arrow in FIG. 2.

Further, the objective lens OBJ1 is a plastic lens having aspheric surfaces on its both sides optimized for first high density optical disc HD1, and a filter having wavelength-selectivity is formed on an optical surface of the plastic lens closer to the light source. This filter realizes numerical aperture NA of 0.63 for DVD and realizes numerical aperture NA of 0.50 for CD, by limiting a passage area for a light flux depending on a wavelength.

In place of the filter having the wavelength-selectivity, it is also possible to form the diffractive structures such as those described on pages 55-56 on the abstract of lecture for $27^{th}$ Optics Symposium, on the light-source-side optical surface of the second objective lens OBJ2.

Figure 3:
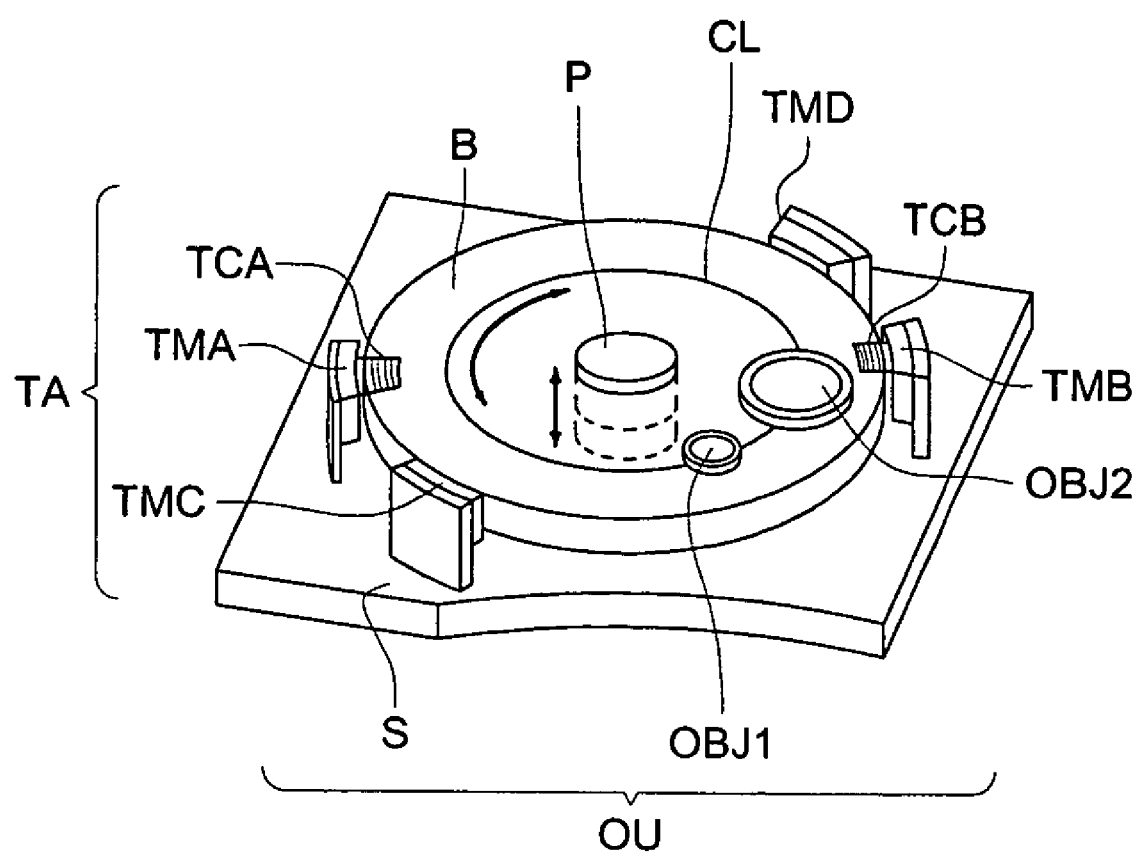
FIG. 3 is a perspective view of an objective lens unit.

FIG. 3 is a perspective view of objective lens unit OU used in the second optical pickup device PU2. The objective lens unit OU shown in FIG. 3 is provided with first objective lens OBJ1 for conducting recording/reproducing of information for first high density optical disc HD1, first diaphragm STO1 (not shown) corresponding to numerical aperture NA 0.85 of the first high density optical disc HD1, second objective lens OBJ2 for conducting recording/reproducing of information for second high density optical disc HD2, DVD and CD, second diaphragm STO2 (not shown) corresponding to numerical aperture NA 0.65 of the second high density optical disc HD2, bobbin B that holds optical axes of the first objective lens OBJ1 and the second objective lens OBJ2 on the same circumference CL, stepping motor SM (not shown) serving as an objective lens switching means that rotates and moves the bobbin through supporting shaft P provided at the position of the center shaft of the circumference CL, chassis S that holds the bobbin rotatably through supporting shaft P provided at the position of the central axis of the circumference CL, and holds the bobbin so that it can reciprocate freely along the central axis of the aforementioned rotation, focusing actuator FA (not shown) that reciprocates the bobbin in the direction that is parallel to the supporting shaft P, and with tracking actuator TA that urges the bobbin B to rotate to position the first objective lens OBJ1 and the second objective lens OBJ2. On the objective lens unit OU, there is provided an operation control circuit that controls operations of biaxial actuator AC2 (focusing actuator FA and tracking actuator TA), for which the illustration will be omitted here.

The first objective lens OBJ1 and the second objective lens OBJ2 are arranged respectively in though hole portions on a plane of disc-shaped bobbin B, to be identical in terms of a distance from the center of the bobbin. The bobbin B is engaged rotatably, at its central part, with an upper end portion of the supporting shaft P that is planted on the chassis S, and focusing actuator FA which is not illustrated is arranged on the lower portion of the supporting shaft P. This focusing actuator FA is composed of magnet FM provided on the lower end portion of the supporting shaft P and of focusing coil FC provided on a circumference of the magnet FM, to conduct focusing for the first objective lens OBJ1 and the second objective lens OBJ2.

Further, as stated above, the bobbin B is given rotary operations whose center is on the supporting shaft P having its axial line that is parallel with an optical axis, by tracing actuator TA. The tracing actuator TA is equipped with a pair of tracking coils TCA and TCB which are provided on an edge portion of the bobbin to be symmetrical about the supporting shaft P, and with two pairs of magnets TMA, TMB, TMC and TMD which are provided on an edge portion of the bobbin closely each other to be symmetrical about the supporting shaft P.

When the tracking coils TCA and TCB face respectively a pair of magnets TMA and TMB on the other side, positions of the magnets TMA and TMB are established so that the first objective lens OBJ1 may be on the optical path for a light flux emitted from a laser light source, and when the tracking coils TCA and TCB face respectively another pair of magnets TMC and TMD on the other side, positions of the magnets TMA and TMB are established so that the second objective lens OBJ2 may be on the optical path for a light flux emitted from a laser light source.

Further, on the aforementioned bobbin B, there is provided an unillustrated stopper that limits a range of rotation so that tracking coil TCA may not face magnet TMA or magnet TMD, and tracking coil TCB may not face magnet TMB or magnet TMC.

Further, the tracking actuator TA is arranged so that the direction of a tangent on the outer circumference of circular bobbin B may be perpendicular to the direction of a tangent of the track of an optical disc, and correction (tracking) for deviation of the spot for the track is conducted by urging the bobbin B to rotate at a microscopic unit.

Collimator lens unit CU has a function as a chromatic aberration correcting optical unit and a function as a spherical aberration correcting optical unit, and on an optical surface of collimator lens COL, there is formed a diffractive structure for correcting chromatic aberration of the first objective lens OBJ1 and the second objective lens OBJ2 in a violet area, and as is shown in the enlarged diagram in FIG. 2, depth d of a step of its ring-shaped zone in the optical axis direction is designed so that the order of diffraction of the diffracted light having the maximum diffraction efficiency among diffracted light generated when light fluxes having respectively a wavelength of 655 nm and a wavelength of 785 nm enter may be lower than the order of diffraction of the diffracted light having the maximum diffraction efficiency among diffracted light generated when a laser light flux having a wavelength of 405 nm enters. Owing to this, sufficient diffraction efficiency can be obtained in each wavelength area, and chromatic aberration corrections in a wavelength area for wavelength 655 nm and that for wavelength 785 nm are prevented from being excessive.

Since an inclined angle of a marginal ray of light for a light flux entering the first objective lens OBJ1 and the second objective lens OBJ2 can be changed when collimator lens COL is displaced along an optical axis by uniaxial actuator AC1, it is possible to correct spherical aberration changes of the spot on an information recording surface of a high density optical disc generated by various factors, details of which will be explained later.

Incidentally, on the collimator lens unit, there is provided an operation control circuit that controls operations of uniaxial actuator AC1, though the illustration thereof is omitted.

When conducting recording/reproducing of information for first high density optical disc HD1 in optical pickup device PU2, the first objective lens OBJ1 is inserted into an optical path for a light flux emitted from violet semiconductor laser LD1, by an objective lens switching means of objective lens unit OU. After that, module MD1 for high density optical disc HD is operated to make violet semiconductor laser LD1 to emit light, as its course for a ray of light is shown with solid lines in FIG. 2. A divergent light flux emitted from the violet semiconductor laser LD1 is transmitted through polarized beam splitter BS, then, passes through collimator lens COL to be transformed into a collimated light flux, then, is regulated in terms of a diameter of the light flux by the first diaphragm STO1 to become a spot formed on information recording surface RL1A through protective layer PL1A of first high density optical disc HD1 by first objective lens OBJ1. The first objective lens OBJ1 conducts focusing and tracking with biaxial actuator AC that is arranged around the objective lens. The reflected light flux modulated by information pits on information recording surface RL1A is transmitted again through the first objective lens OBJ1, the first diaphragm STO1, and collimator lens COL to become a converged light flux, and is converged on a light-receiving surface of photodetector PD1 of module MD1 for high density optical disc HD, after being transmitted through polarized beam splitter BS. Thus, information recorded on the first high density optical disc HD1 can be read by the use of output signals of the photodetector PD1.

Further, when conducting recording/reproducing of information for second high density optical disc HD2 in optical pickup device PU2, the second objective lens OBJ2 is inserted into an optical path for a light flux emitted from violet semiconductor laser LD1, by an objective lens switching means of objective lens unit OU. After that, module MD1 for high density optical disc HD is operated to make violet semiconductor laser LD1 to emit light, as its course for a ray of light is shown with solid lines in FIG. 2. A divergent light flux emitted from the violet semiconductor laser LD1 is transmitted through polarized beam splitter BS, then, passes through collimator lens COL to be transformed into a collimated light flux, then, is regulated in terms of a diameter of the light flux by the second diaphragm STO2 to become a spot formed on information recording surface RL1B through protective layer PL1B of second high density optical disc HD2 by second objective lens OBJ2. The second objective lens OBJ2 conducts focusing and tracking with biaxial actuator AC that is arranged around the objective lens. The reflected light flux modulated by information pits on information recording surface RL1B is transmitted again through the second objective lens OBJ2, the second diaphragm STO2, and collimator lens COL to become a converged light flux, and is converged on a light-receiving surface of photodetector PD1 of module MD1 for high density optical disc HD, after being transmitted through polarized beam splitter BS. Thus, information recorded on the second high density optical disc HD2 can be read by the use of output signals of the photodetector PD1.

In the case of conducting recording/reproducing of information for first high density disc HD1 (or second high density disc HD2), when spherical aberration of a spot on information recording surface RL1A (RL1B) is changed in the direction toward excessive correction, by influences including wavelength changes of violet semiconductor laser LD1, errors of a thickness of protective layer PL1A (PL1B), focus jump between recording surfaces of two-layer disc, ambient temperature changes and refractive index changes of first optical lens OBJ1 (second optical lens OBJ2) caused by heat generation of biaxial actuator AC2, for example, collimator lens COL is displaced by uniaxial actuator AC1 so that a distance to the first objective lens OBJ1 (second objective lens OBJ2) may be increased. On the contrary, when spherical aberration of a spot on information recording surface RL1A (RL2B) is changed in the direction toward insufficient correction, collimator lens COL is displaced by uniaxial actuator AC1 so that a distance to the first objective lens OBJ1 (second objective lens OBJ2) may be decreased. Owing to this, a spot on information recording surface RL1A (RL1B) is constantly in the state where spherical aberration of the spot is corrected, which makes it possible to obtain excellent recording/reproducing characteristics for the first high density optical disc HD1 (the second high density optical disc HD2).

Further, since a wavefront which has been transmitted through collimator lens COL and objective lens OBJ each having thereon a formed diffractive structure comes under the state where chromatic aberration is properly corrected, even when violet semiconductor laser LD1 causes mode hopping in the course of switching from information reproducing to information recording, a diameter of a spot formed on information recording surface RL1A (RL1B) through converging does not grow greater.

Further, when conducting recording/reproducing of information for DVD in the optical pickup device PU1, light-emitting point EP1 is made to emit light. A divergent light flux emitted from the light-emitting point EP1 is reflected on prism PS, and is reflected by polarized beam splitter BS to be transformed into a collimated light flux by collimator lens COL, as its course for a ray of light is shown with broken lines in FIG. 1. After that, a diameter of the light flux is enlarged by expander lens EXP, and then, it is regulated by diaphragm STO and is further regulated by a filter having wavelength-selectivity. Subsequently, the light flux becomes a spot which is formed by objective lens OBJ on information recording surface RL2 through protective layer PL2 of DVD. The objective lens OBJ conducts focusing and tracking with biaxial actuator AC2 arranged around the objective lens. The reflected light flux modulated by information pits on information recording surface RL2 is transmitted again through the objective lens, the diaphragm STO, expander lens EXP and collimator lens COL to become a converged light flux, then, reflected by polarized beam splitter BS to be converged on light-receiving portion DS1 after being reflected twice in prism PS. Thus, information recorded on DVD can be read by the use of output signals of the light-receiving portion DS1.

Since the second objective lens OBJ2 is a plastic lens having an aspheric surface on its both sides optimized for the second high density optical disc HD2 as stated above, when a light flux having a wavelength of 655 nm enters the second objective lens OBJ2, a spot formed on information recording surface RL2 of DVD through converging is changed in terms of spherical aberration in the direction toward excessive correction, by an influence of wavelength dispersion of the second objective lens OBJ2. Therefore, when conducting recording/reproducing of information for DVD, a distance between collimator lens COL and the second objective lens OBJ2 is optimized (namely, a position of an object point of the second objective lens OBJ2 is optimized) by expanding a distance to the second objective lens OBJ2 so that spherical aberration changes may be corrected, to conduct recording/reproducing of information for DVD.

Further, when conducting recording/reproducing of information for CD in the optical pickup device PU2, light-emitting point EP2 is made to emit light after the second objective lens OBJ2 is inserted in an optical path for a light flux coming from the light-emitting point EP2 by an objective lens switching means of objective lens unit OU. A divergent light flux emitted from the light-emitting point EP2 is reflected on prism PS, and is reflected by polarized beam splitter BS to be transformed into a collimated light flux by collimator lens COL, as its course for a ray of light is shown with two-dot chain lines in FIG. 2. After that, a diameter of the light flux is regulated by a filter having wavelength-selectivity a diameter of the light flux is regulated by the second diaphragm STO2. Subsequently, the light flux becomes a spot which is formed by the second objective lens OBJ2 on information recording surface RL3 through protective layer PL3 of CD. The second objective lens OBJ2 conducts focusing and tracking with biaxial actuator AC2 arranged around the objective lens. The reflected light flux modulated by information pits on information recording surface RL3 is transmitted again through the second objective lens OBJ, second diaphragm STO2 and collimator lens COL to become a converged light flux, and is reflected by polarized beam splitter BS to be converged on light-receiving portion DS2 after being reflected twice in prism PS, after being reflected by polarized beam splitter BS. Thus, information recorded on DVD can be read by the use of output signals of the light-receiving portion DS2.

Since the second objective lens OBJ2 is a plastic lens having an aspheric surface on its both sides optimized for the second high density optical disc HD2 as stated above, when a light flux having a wavelength of 785 nm enters the second objective lens OBJ2, a spot formed on information recording surface RL3 of CD through converging is changed in terms of spherical aberration in the direction toward excessive correction, by an influence of wavelength dispersion of the second objective lens OBJ2 and of a difference between protective layer PL1B of the second high density disc and protective layer PL3 of CD. Therefore, when conducting recording/reproducing of information for CD, a distance between collimator lens and the second objective lens OBJ2 is optimized (namely, a position of an object point of the second objective lens OBJ2 is optimized) by expanding a distance to the second objective lens OBJ2 so that spherical aberration changes may be corrected, to conduct recording/reproducing of information for CD.

Third Embodiment

Figure 4:
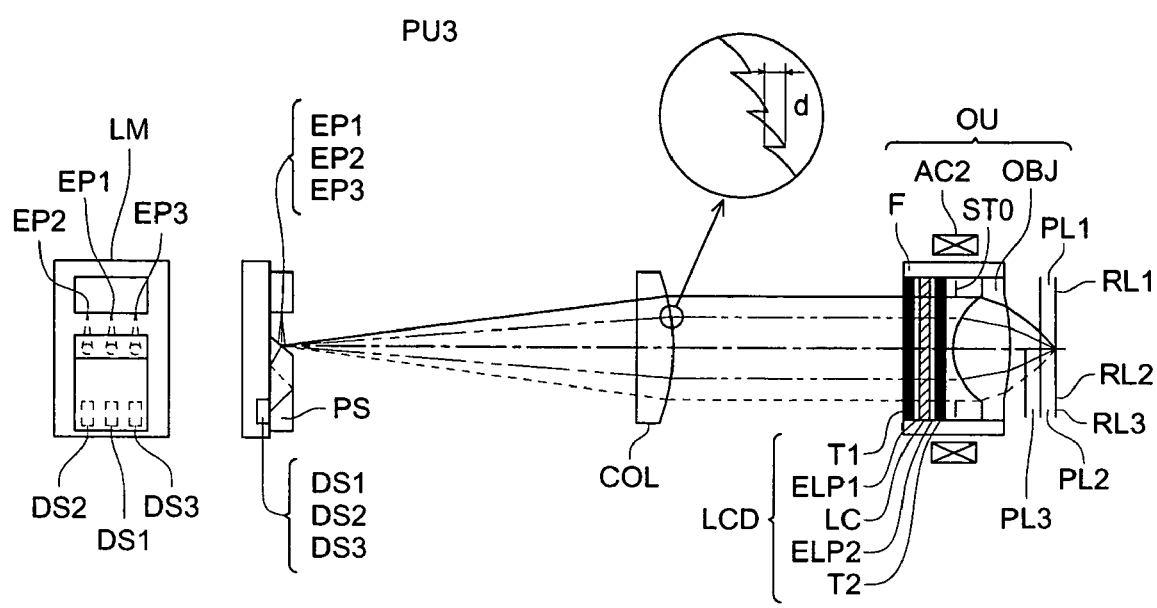
FIG. 4 is a plan view for primary portions showing the structure of an optical pickup device.

FIG. 4 is a diagram showing schematically the structure of third optical pickup device PU3 capable of high density optical disc HD, DVD and CD. In the optical specifications of the high density optical disk HD, a wavelength is 405 nm, a thickness of a protective layer is 0.6 mm and numerical aperture NA is 0.65, in the optical specifications of DVD, a wavelength is 655 nm, a thickness of a protective layer is 0.6 mm and numerical aperture NA is 0.63, and in the optical specifications of CD, a wavelength is 785 nm, a thickness of a protective layer is 1.2 mm and numerical aperture NA is 0.50. However, a combination of a wavelength, a thickness of a protective layer and a numerical aperture is not limited to the foregoing.

The optical pickup device PU3 is composed of laser module MD1 having therein first light emitting point EP1 that emits a laser light flux with wavelength of 405 nm which is emitted when conducting recording/reproducing of information for high density optical disc HD, second light emitting point EP2 that emits a laser light flux with wavelength of 655 nm which is emitted when conducting recording/reproducing of information for DVD, third light emitting point EP3 that emits a laser light flux with wavelength of 785 nm which is emitted when conducting recording/reproducing of information for CD, first light-receiving portion DS1 that receives reflected light flux coming from information recording surface RL1 of high density optical disc HD, second light-receiving portion DS2 that receives reflected light flux coming from information recording surface RL2 of DVD, third light-receiving portion DS3 that receives reflected light flux coming from information recording surface RL3 of CD, and prism PS, objective lens unit OU composed of objective lens OBJ, biaxial actuator AC2 and of diaphragm STO corresponding to numerical aperture NA 0.65 of high density optical disc HD, collimator lens COL, and liquid crystal element LCD equipped with a pair of electrodes ELP1 and ELP2 arranged to be held between a pair of optical transparent base boards T1 and T2, liquid crystal molecule layer LC arranged to be held between the electrodes ELP1 and ELP2 and with a power supply (not shown) for impressing voltage on the electrodes ELP1 and ELP2.

Further, as a light source for high density optical disc HD, it is also possible to use a violet SHG laser in addition to the aforementioned violet semiconductor laser LD1.

Further, objective lens OBJ is a plastic lens having an aspheric surface on its both sides optimized for high density optical disc HD, and a filter having wavelength-selectivity is formed on an optical surface of the plastic lens closer to the light source. This filter realizes numerical aperture NA of 0.63 for DVD and realizes numerical aperture NA of 0.50 for CD, by limiting a passage area for a light flux depending on a wavelength.

In place of the filter having the wavelength-selectivity, it is also possible to form the diffractive structures such as those described on pages 55-56 on the abstract of lecture for 27$^{th}$ Optics Symposium, on the light-source-side optical surface of objective lens OBJ.

Further, on the objective lens unit OU, there is provided an operation control circuit that controls operations of biaxial actuator AC2, though the operation control circuit is not illustrated.

Further, the objective lens OBJ is integrated solidly with liquid crystal element LCD by folder F and it conducts tracking and focusing together with the liquid crystal element LCD.

Collimator lens COL is equipped with a function as a chromatic aberration correcting optical unit, and on an optical surface of collimator lens COL, there is formed a diffractive structure for correcting chromatic aberration of objective lens OBJ in a violet area, and as is shown on an enlarged diagram in FIG. 4, depth d of a step of its ring-shaped zone in the optical axis direction is designed so that the order of diffraction of the diffracted light having the maximum diffraction efficiency among diffracted light generated when light fluxes having respectively a wavelength of 655 nm and a wavelength of 785 nm enter may be lower than the order of diffraction of the diffracted light having the maximum diffraction efficiency among diffracted light generated when a laser light flux having a wavelength of 405 nm enters. Owing to this, sufficient diffraction efficiency can be obtained in each wavelength area, and chromatic aberration corrections in a wavelength area for wavelength 655 nm and that for wavelength 785 nm are prevented from becoming excessive.

The liquid crystal element LCD is equipped with a function as spherical aberration correcting optical unit, and it can correct spherical aberration changes of a spot formed on an information recording surface of high density optical disc generated by various factors. Since technologies to correct spherical aberration changes with these liquid crystal elements LCD are described in TOKKAI No. 2001-43549, for example, detailed description will be omitted here.

When conducting recording/reproducing of information for high density optical disc HD in optical pickup device PU3, light-emitting point EP1 is made to emit light, first. A divergent light flux emitted from the light-emitting point EP1 is reflected by prism PS, then, is transmitted through polarized beam splitter BS to be transformed into a parallel light flux by collimator lens COL. After that, it is transmitted through the liquid crystal element LCD, and is regulated by diaphragm STO in terms of a diameter of a light flux, to become a spot that is formed by objective lens OBJ on information recording surface RL1 through protective layer PL1 of high density optical disc HD. The objective lens OBJ conducts focusing and tracking with biaxial actuator AC that is arranged around the objective lens. The reflected light flux modulated by information pits on information recording surface RL1 is transmitted again through the objective lens OBJ, the diaphragm STO, liquid crystal element LCD and collimator lens COL to become a converged light flux which is reflected by polarized beam splitter BS and then, is reflected twice in prism PS to be converged on a light-receiving portion DS1. Thus, information recorded on the high density optical disc HD can be read by the use of output signals of the light-receiving portion DS1.

In the case of conducting recording/reproducing of information for high density optical disc HD, when spherical aberration of the spot on information recording surface RL1 is changed in the direction of excessive correction by influences such as, for example, wavelength changes of a violet laser light flux emitted from light-emitting point EP1, errors in a thickness of protective layer PL1, focus jump between information recording surfaces of a two-layer disc and refractive index changes of objective lens OBJ caused by ambient temperature changes and heat generation of biaxial actuator AC2, distribution of refractive index in liquid crystal molecule layer LC is changed by making a power supply to impress voltage on electrodes ELP1 and ELP2, so that spherical aberration wavefront that is corrected insufficiently may be given to a violet laser light flux that passes through liquid crystal element LCD. On the contrary, when spherical aberration of the spot on information recording surface RL1 is changed in the direction of insufficient correction, distribution of refractive index in liquid crystal molecule layer LC is changed by making a power supply to impress voltage on electrodes ELP1 and ELP2, so that spherical aberration wavefront that is corrected excessively may be given to a violet laser light flux that passes through liquid crystal element LCD. Due to this, the spot on the information recording surface RL1 turns out to be in the state where spherical aberration is corrected constantly, thus, excellent characteristics for recording/reproducing for high density optical disc HD can be obtained.

Further, a wavefront transmitted through collimator lens COL and objective lens OBJ turns out to be in the state where chromatic aberration is properly corrected, a diameter of the spot formed on information recording surface RL1 through converging is prevented from becoming large even when violet semiconductor laser LD1 causes mode hopping in the case of switching from reproducing of information to recording.

Further, when conducting recording/reproducing of information for DVD in the optical pickup device PU3, light-emitting point EP1 is made to emit light. A divergent light flux emitted from the light-emitting point EP2 is reflected on prism PS, and is reflected by polarized beam splitter BS to be transformed into a collimated light flux by collimator lens COL, as a path of a ray of light for the divergent light flux is shown with broken lines in FIG. 4. After that, the collimated light passes through liquid crystal element LCD and is regulated in terms of a diameter of the light flux by diaphragm STO to become a spot which is formed by objective lens OBJ on information recording surface RL2 through protective layer PL2 of DVD. The objective lens OBJ conducts focusing and tracking with biaxial actuator AC arranged around the objective lens. The reflected light flux modulated by information pits on information recording surface RL2 is transmitted again through the objective lens OBJ, the diaphragm STO, liquid crystal element LCD and collimator lens COL to become a converged light flux, then, reflected by polarized beam splitter BS to be converged on light-receiving portion DS1 after being reflected twice in prism PS. Thus, information recorded on DVD can be read by the use of output signals of the light-receiving portion DS1.

Since the objective lens OBJ is a plastic lens having an aspheric surface on its both sides optimized for high density optical disc HD as stated above, when a light flux having a wavelength of 655 nm enters objective lens OBJ, a spot formed on information recording surface RL2 of DVD through converging is changed in terms of spherical aberration in the direction toward excessive correction, by an influence of wavelength dispersion of objective lens OBJ. Therefore, when conducting recording/reproducing of information for DVD, insufficiently-corrected spherical aberration wavefront is given to the light flux having a wavelength of 655 nm that is transmitted through liquid crystal element LCD, by impressing voltage to electrodes ELP1 and ELP2 from a power supply and thereby by changing refractive index distribution in liquid crystal molecule layer LC, so that spherical aberration changes may be corrected. Due to this, the light flux having a wavelength of 655 nm that has been transmitted through liquid crystal element LCD and objective lens OBJ and is converged on information recording surface RL2 of DVD turns out to be in the state where spherical aberration is corrected, which makes it possible to conduct recording/reproducing of information for DVD.

Further, when conducting recording/reproducing of information for CD in the optical pickup device PU3, light-emitting point EP3 is made to emit light. A divergent light flux emitted from the light-emitting point EP3 is reflected on prism PS, and is reflected by polarized beam splitter BS to be transformed into a collimated light flux by collimator lens COL, as a path of the divergent light flux is shown with two-dot chain lines in FIG. 4. After that, the collimated light flux passes through liquid crystal element LCD and is regulated in terms of a diameter of the light flux by diaphragm STO to become a spot which is formed by objective lens OBJ on information recording surface RL3 through protective layer PL3 of CD. The objective lens OBJ conducts focusing and tracking with biaxial actuator AC2 arranged around the objective lens. The reflected light flux modulated by information pits on information recording surface RL3 is transmitted again through objective lens OBJ, diaphragm STO, liquid crystal element LCD and collimator lens COL to become a converged light flux, and is reflected by polarized beam splitter BS to be converged on light-receiving portion DS3 after being reflected twice in prism PS. Thus, information recorded on CD can be read by the use of output signals of the light-receiving portion DS3.

Since the objective lens OBJ is a plastic lens having an aspheric surface on its both sides optimized for high density optical disc HD as stated above, when a light flux having a wavelength of 785 nm enters objective lens OBJ, a spot formed on information recording surface RL3 of CD through converging is changed in terms of spherical aberration in the direction toward excessive correction, by an influence of wavelength dispersion of objective lens OBJ and of a difference between protective layer PL1 and protective layer PL3 of CD. Therefore, when conducting recording/reproducing of information for CD, insufficiently-corrected spherical aberration wavefront is given to the light flux having a wavelength of 785 nm that is transmitted through liquid crystal element LCD, by impressing voltage to electrodes ELP1 and ELP2 from a power supply and thereby by changing refractive index distribution in liquid crystal molecule layer LC, so that spherical aberration changes may be corrected. Due to this, the light flux having a wavelength of 785 nm that has been transmitted through liquid crystal element LCD and objective lens OBJ and is converged on information recording surface RL3 of CD turns out to be in the state where spherical aberration is corrected, which makes it possible to conduct recording/reproducing of information for CD.

Fourth Embodiment

Figure 5:
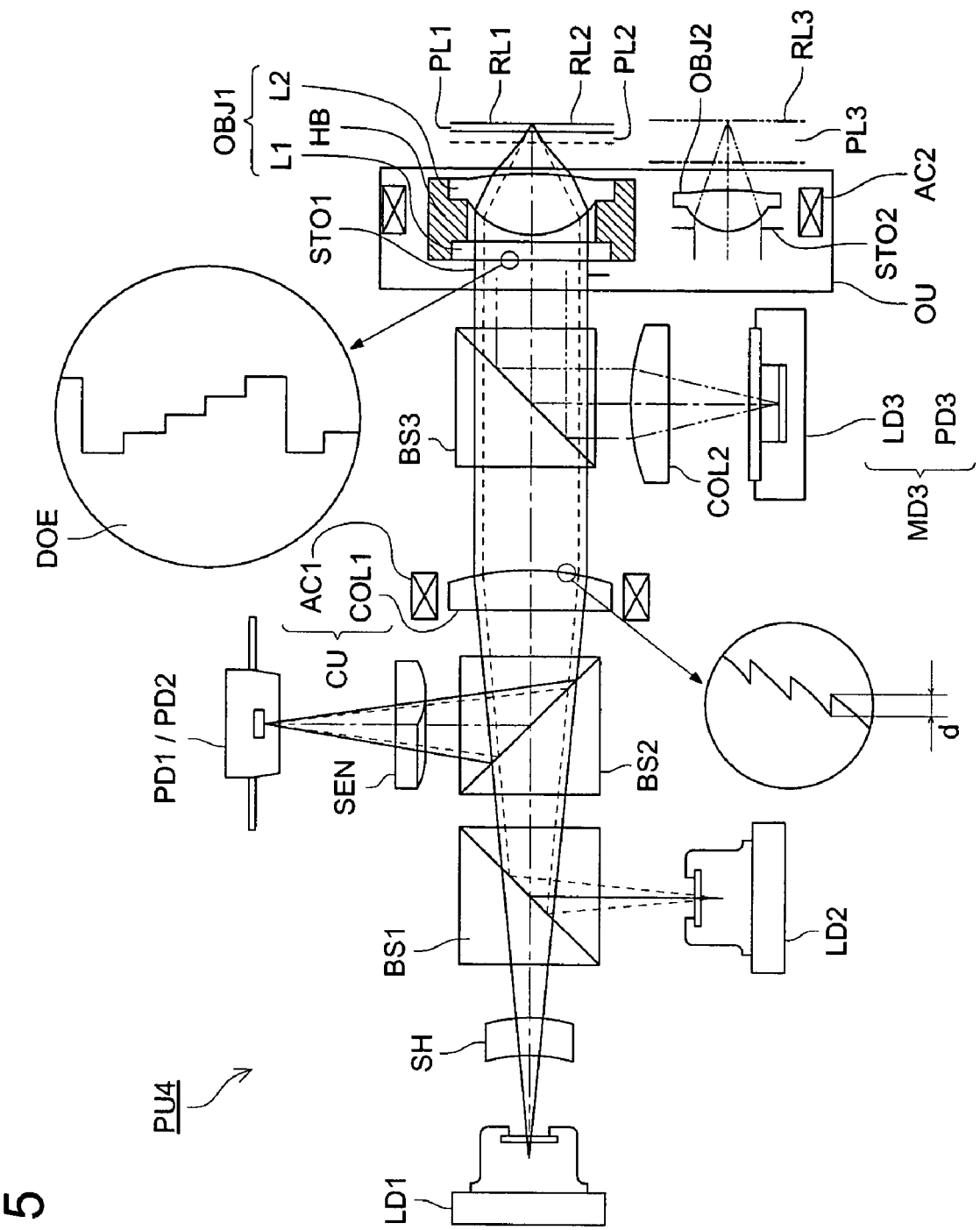
FIG. 5 is a plan view for primary portions showing the structure of an optical pickup device.

FIG. 5 is a diagram showing schematically the structure of fourth optical pickup device PU4 capable of high density optical disc HD, DVD and CD. In the optical specifications of the high density optical disk HD, a wavelength is 405 nm, a thickness of a protective layer is 0.1 mm and numerical aperture NA is 0.85, in the optical specifications of DVD, a wavelength is 655 nm, a thickness of a protective layer is 0.6 mm and numerical aperture NA is 0.65, and in the optical specifications of CD, a wavelength is 785 nm, a thickness of a protective layer is 1.2 mm and numerical aperture NA is 0.50. However, a combination of a wavelength, a thickness of a protective layer and a numerical aperture is not limited to the foregoing.

The optical pickup device PU4 is composed of violet semiconductor laser LD1 that is made to emit light when conducting recording/reproducing of information for high density optical disc HD and emits a laser light flux having a wavelength of 405 nm, red semiconductor laser LD2 that is made to emit light when conducting recording/reproducing of information for DVD and emits a laser light flux having a wavelength of 655 nm, photodetector PD1/PD2 that can be used commonly for high density optical disc HD and DVD, laser module MD3 for CD wherein infrared semiconductor laser LD3 which is made to emit light when conducting recording/reproducing of information for CD and emits a laser light flux having a wavelength of 785 nm and photodetector PD3 are integrated solidly, objective lens unit OU, first polarized beam splitter BS1, second polarized beam splitter BS2, third polarized beam splitter BS3, collimator lens unit CU that is composed of first collimator lens COL1 and of uniaxial actuator AC1, second collimator lens COL2, sensor lens SEN and beam arranging element SH.

Incidentally, it is also possible to use violet SHG laser in addition to the violet semiconductor laser LD1, as a light source for high density optical disc HD.

The objective lens unit OU is composed of first objective lens OBJ1 for conducting recording/reproducing of information for high density optical disc HD and DVD, first diaphragm STO1 corresponding to numerical aperture NA 0.85 of high density optical disc HD, second objective lens OBJ2 for conducting recording/reproducing of information for CD, second diaphragm STO2 corresponding to numerical aperture NA 0.50 of CD, biaxial actuator AC2 and an objective lens switching means (not shown) for switching the first objective lens OBJ1 and the second objective lens OBJ2 selectively depending on recording density of an optical disc for recording/reproducing of information, as shown by an arrow in FIG. 5. Incidentally, the structure of the objective lens OU is the same as that shown in FIG. 3, and its explanation will be omitted. The first objective lens OBJ1 is composed of diffracting lens L1 and light-converging lens L2 which has, on its both sides, aspheric surfaces and has a function to converge a laser light flux having passed the diffracting lens L1 on an information recording surface of an optical disc. The diffracting lens L1 is a plastic lens, while, the light-converging lens L2 is a glass lens. Respective lenses are integrated solidly through holding member HB.

With respect to optical specifications of high density optical disc HD and of DVD which are assumed in the course of designing the first objective lens OBJ1, wavelength $\lambda 1$ is 405 nm, a thickness of protective layer PL1 is 0.1 mm and numerical aperture NA1 is 0.85 for high density optical disc HD, and wavelength $\lambda 2$ is 655 nm, thickness t2 of protective layer PL2 is 0.6 mm and numerical aperture NA2 is 0.65. However, a combination of a wavelength, a thickness of a protective layer and a numerical aperture is not limited to the foregoing.

Further, on the objective lens unit OU, there is provided an operation control circuit that controls operations of biaxial actuator AC2, though an explanation for the circuit will be omitted here.

Optical functional surface S1 of diffracting lens L1 on the light source side is divided into first area AREA1 corresponding to an area within NA2 and second area AREA2 (not shown) corresponding to an area from NA2 to NA1, and on the first area AREA1, there is formed stepwise diffractive structure DOE wherein plural ring-shaped zones in which a step structure is formed are arranged around the optical axis that serves as a center.

In the stepwise diffractive structure DOE formed on the first area AREA1, depth d per one step of the stepwise structure formed in each ring-shaped zone is established to be a value calculated by $d=2 \cdot \lambda 1/(n1-1)$ ($\mu m$), and division number N of each ring-shaped zone is established to be 5. However, $\lambda 1$ is one wherein a wavelength of a laser light flux emitted from a violet semiconductor laser is expressed in a unit of micron (in this case, $\lambda 1=0.405$ $\mu m$), and n1 is a refractive index of diffracting lens L1 for wavelength $\lambda 1$ (in this case, n1=1.524694).

When a laser light source having wavelength $\lambda 1$ enters for the stepwise diffractive structure DOE, there is generated an optical path difference of $2 \times \lambda 1$ ($\mu m$) between adjoining steps, and the laser light source having wavelength $\lambda 1$ is transmitted as it is without being diffracted because it is not given a phase difference substantially. Incidentally, in the following explanation, the light flux that is transmitted through the stepwise diffractive structure while being kept intact without being given a phase difference substantially is called zero-order diffracted light.

On the other hand, when a laser light source having wavelength $\lambda 2$ ($\lambda 2=0.655$ m in this case) emitted from a red semiconductor laser enters for the stepwise diffractive structure DOE, there is generated an optical path difference of $d \times (n2-1)-\lambda 2=0.13$ $\mu m$, and on one ring-shaped zone representing one fifth of the total ring-shaped zones, there is generated an optical path difference of $0.13 \times 5=0.65$ $\mu m$ that is equivalent to one wavelength of wavelength $\lambda 2$, therefore, wavefronts passing through adjoining ring-shaped zones are shifted by one wavelength to be overlapped. Namely, the light flux with wavelength $\lambda 2$ is changed by the stepwise diffractive structure DOE to be diffracted light that is diffracted in the primary direction. On the objective lens OBJ, diffracting effects of the stepwise diffractive structure DOE for wavelength $\lambda 2$ is utilized to correct spherical aberration caused by a difference of thickness between protective layer PL1 of high density optical disc HD and protective layer PL2 of DVD. Incidentally, n2 represents a refractive index of diffracting lens L2 for wavelength $\lambda 2$ (n2=1.506513 in this case). The diffraction efficiency of the primary diffracted light of the laser beam having wavelength $\lambda 2$ in this case is 87.3% which, however, corresponds to a sufficient amount of light for conducting recording/reproducing of information for DVD.

Incidentally, since the stepwise diffractive structure DOE is formed on the first area AREA1 including the optical axis, the spherical aberration caused by a difference of thickness between protective layer PL1 and protective layer PL2 is corrected only for the light flux with wavelength $\lambda 2$ that passes through the first area AREA1, and it is not corrected for the light flux with wavelength $\lambda 2$ that passes through the second area AREA2. Therefore, the light flux passing through the second area AREA2 among light fluxes with wavelength $\lambda 2$ entering the objective lens OBJ becomes flare components which do not contribute to spot formation on information recording surface RL2 of DVD.

Since this is equivalent to automatic regulation of an aperture corresponding to NA2, it is not necessary to provide an aperture regulating element corresponding to numerical aperture NA of DVD, in the fourth optical pickup device PU4.

The first collimator lens COL1 is equipped with both of the function as an optical unit for correcting chromatic aberration and the function as an optical unit for correcting spherical aberration. Namely, the optical unit for correcting chromatic aberration and the optical unit for correcting spherical aberration are represented by the same optical unit.

Further, on the plane of emergence of the first collimator lens COL1, there is formed a diffractive structure for correcting chromatic aberration of the first objective lens OBJ1 in the violet area, and as is shown on an enlarged diagram in FIG. 5, depth d of a step of its ring-shaped zone in the optical axis direction is designed so that the order of diffraction of the diffracted light having the maximum diffraction efficiency among diffracted light generated when light flux having a wavelength of 655 nm enter may be lower than the order of diffraction of the diffracted light having the maximum diffraction efficiency among diffracted light generated when a laser light flux having a wavelength of 405 nm enters. Owing to this, sufficient diffraction efficiency can be obtained in each wavelength area, and chromatic aberration correction in a wavelength area for wavelength 655 nm is prevented from being excessive.

Since an inclined angle of a marginal ray of light for a light flux entering the first objective lens OBJ1 can be changed when the first collimator lens COL1 is displaced along an optical axis by uniaxial actuator AC1, it is possible to correct spherical aberration changes of the spot on an information recording surface of a high density optical disc generated by various factors, details of which will be explained later.

Incidentally, on the collimator lens unit CU, there is provided an operation control circuit that controls operations of uniaxial actuator AC1, though the illustration thereof is omitted.

When conducting recording/reproducing of information for high density optical disc HD in optical pickup device PU4, violet semiconductor laser LD1 is made to emit light, as its course for a ray of light is shown with solid lines in FIG. 5. A divergent light flux emitted from the violet semiconductor laser LD1 passes through beam arranging element SH, thereby, its sectional form is arranged to be a circular form from an oval, and then, it passes through the first and second polarized beam splitters BS1 and BS2 to be converted into a parallel light flux by the first collimator lens COL1. Then, it passes through the third polarized beam splitter BS3, and is regulated by diaphragm STO1 in terms of a diameter of the light flux to become a spot that is formed on information recording surface RL1 by the first objective lens OBJ1 through protective layer PL1 of high density optical disc HD. The first objective lens OBJ1 conducts focusing and tracking with biaxial actuator AC2.

The reflected light flux modulated by information pits on information recording surface RL1 is transmitted again through the first objective lens OBJ1, the third polarized beam splitter BS3 and the first collimator lens COL1, and then, is reflected by the second polarized beam splitter BS2 to be given astigmatism by sensor lens SEN, and to be converted into the converged light flux, thus, it is converged on a light-receiving surface of each of photodetectors PD1/PD2. Thus, information recorded on high density optical disc HD can be read by the use of output signals of the photodetectors PD1/PD2.

In the case of conducting recording/reproducing of information for high density optical disc HD, when spherical aberration of the spot on information recording surface RL1 is changed in the direction of excessive correction by influences such as, for example, wavelength changes of a violet semiconductor laser LD1, errors in a thickness of protective layer PL1, focus jump between information recording surfaces of a two-layer disc and refractive index changes of objective lens OBJ caused by ambient temperature changes and heat generation of biaxial actuator AC2, the first collimator lens COL1 is displaced by uniaxial actuator AC1 so that a distance to the first objective lens OBJ1 may be broadened. On the contrary, when spherical aberration of the spot on information recording surface RL1 is changed in the direction of insufficient correction, the first collimator lens COL1 is displaced by uniaxial actuator AC1 so that a distance to the first objective lens OBJ1 may be narrowed. Due to this, the spot on the information recording surface RL1 turns out to be in the state where spherical aberration is corrected constantly, thus, excellent characteristics for recording/reproducing for high density optical disc HD can be obtained.

Further, a wavefront transmitted through the first collimator lens COL1 and the first objective lens OBJ1 turns out to be in the state where chromatic aberration is properly corrected, a diameter of the spot formed on information recording surface RL1 through converging is prevented from becoming large even when violet semiconductor laser LD1 causes mode hopping in the case of switching from reproducing of information to recording.

Further, the first collimator lens COL1 has a function to compensate changes in a degree of divergence of an emitted light flux caused by changes in refractive index (changes in refracting power) of the first collimator lens COL1 following upon ambient temperature changes with a change of diffracting power caused by changes in wavelength of violet semiconductor laser LD1 following upon ambient temperature changes. Therefore, the degree of divergence of the light flux emitted from the first collimator lens COL1 is not changed substantially, even when ambient temperatures are changed. Due to this, changes of magnification of the first objective lens OBJ1 caused by temperature changes are not present, which does not deteriorate spherical aberration.

When conducting recording/reproducing of information for DVD in optical pickup device PU4, red semiconductor laser LD2 is made to emit light, as its path for a ray of light is shown with broken lines in FIG. 5. A divergent light flux emitted from the red semiconductor laser LD2 is reflected by the first polarized beam splitter BS1, and passes through the second polarized beam splitter BS2 to be converted into a parallel light flux by the first collimator lens COL1. Then, it passes through the third polarized beam splitter BS3 and is regulated in terms of a diameter of the light flux by diaphragm STO1 to become a spot that is formed on information recording surface RL2 by the first objective lens OBJ1 through protective layer PL2 of DVD. The first objective lens OBJ1 conducts focusing and tracking with biaxial actuator AC2.

The reflected light flux modulated by information pits on information recording surface RL2 is transmitted again through the first objective lens OBJ1, the third polarized beam splitter BS3 and the first collimator lens COL1, and then, is reflected by the second polarized beam splitter BS2 to be given astigmatism by sensor lens SEN, and to be converted into the converged light flux, thus, it is converged on a light-receiving surface of each of photodetectors PD1/PD2. Thus, information recorded on DVD can be read by the use of output signals of the photodetectors PD1/PD2.

When conducting recording/reproducing of information for CD in optical pickup device PU4, second objective lens OBJ2 is inserted in an optical path for a light flux emitted from red semiconductor laser LD3 by an objective lens switching means of objective lens unit OU. After that, module MD3 for CD is operated, as a path of the ray of light is shown with two-dot chain lines in FIG. 5, to make the red semiconductor laser LD3 to emit light. A divergent light flux emitted from the red semiconductor laser LD3 is converted into a parallel light flux by the second collimator lens COL2, then, is reflected by the third polarized beam splitter BS3 and is regulated in terms of a diameter of the light flux by diaphragm STO2 to become a spot that is formed on information recording surface RL3 by the second objective lens OBJ2 through protective layer PL3 of CD. The second objective lens OBJ2 conducts focusing and tracking with biaxial actuator AC2 arranged around the objective lens.

The reflected light flux modulated by information pits on information recording surface RL3 is transmitted again through the second objective lens OBJ2, and is reflected by the third polarized beam splitter BS3 to be converged on a light-receiving surface of photodetector PD3 of module MD3 for CD. Thus, information recorded on CD can be read by the use of output signals of the photodetector PD3.

Fifth Embodiment

Figure 6:
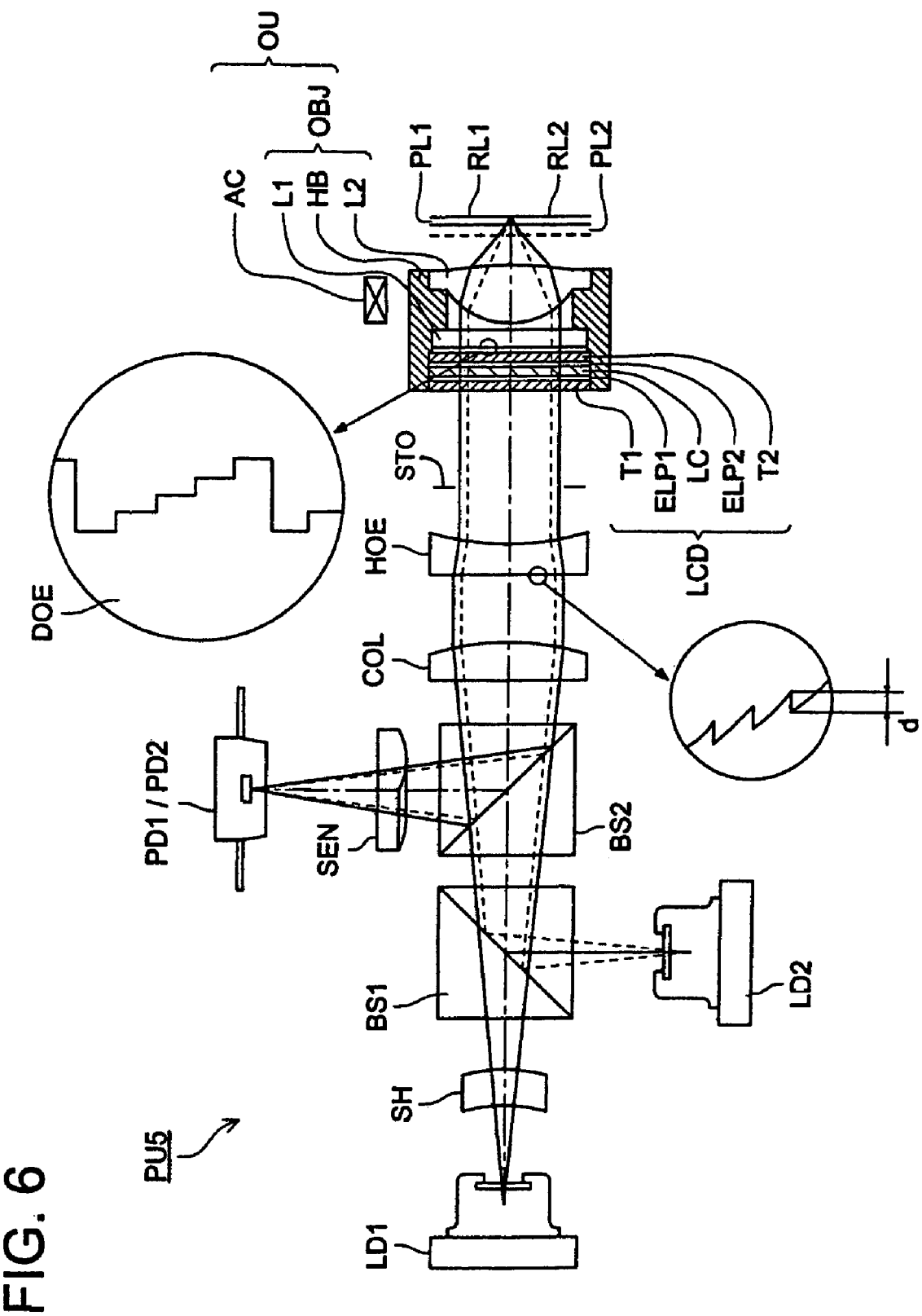
FIG. 6 is a plan view for primary portions showing the structure of an optical pickup device.

FIG. 6 is a diagram showing schematically the structure of fifth optical pickup device PU5 capable of conducting recording/reproducing of information properly for high density optical disc HD and DVD. In the optical specifications of the high density optical disk HD, a wavelength is 405 nm, a thickness of a protective layer is 0.1 mm and numerical aperture NA is 0.85, and in the optical specifications of DVD, a wavelength is 655 nm, a thickness of a protective layer is 0.6 mm and numerical aperture NA is 0.65. However, a combination of a wavelength, a thickness of a protective layer and a numerical aperture is not limited to the foregoing.

The optical pickup device PU5 is composed of violet semiconductor laser LD1 that is made to emit light when conducting recording/reproducing of information for high density optical disc HD and emits a laser light flux having a wavelength of 405 nm, red semiconductor laser LD2 that emits a laser light flux having a wavelength of 655 nm when conducting recording/reproducing of information for DVD, photodetector PD1/PD2 that is used commonly for high density optical disc HD and DVD, objective lens unit OU composed of objective lens OBJ, biaxial actuator AC and diaphragm STO corresponding to numerical aperture NA 0.85 of high density optical disc HD, collimator lens COL, liquid crystal element LCD in which a pair of electrodes ELP1 and ELP2 are interposed between a pair of optical transparent base boards T1 and T2 and liquid crystal molecule layer LC is arranged to be interposed between the paired electrodes ELP1 and ELP2 and a power supply (not shown) for impressing voltage on the electrodes ELP1 and ELP2 is provided, optical element for correcting chromatic aberration HOE, first polarized beam splitter BS1, second polarized beam splitter BS2, sensor lens SEN and beam arranging element SH.

Incidentally, it is also possible to use a violet SHG laser in addition to the aforementioned violet semiconductor laser LD1, as a light source for high density optical disc HD.

The objective lens OBJ is composed of diffracting lens L1 and light-converging lens L2 which has, on its both sides, aspheric surfaces and has a function to converge a laser light flux having passed through the diffracting lens L1 on an information recording surface of an optical disc. The diffracting lens L1 is a plastic lens, while, the light-converging lens L2 is a glass lens. Respective lenses are integrated solidly through holding member HB.

With respect to optical specifications of high density optical disc HD and of DVD which are assumed in the course of designing the objective lens OBJ, wavelength λ1 is 405 nm, a thickness of protective layer PL1 is 0.1 mm and numerical aperture NA1 is 0.85 for high density optical disc HD, and wavelength λ2 is 655 nm, thickness t2 of protective layer PL2 is 0.6 mm and numerical aperture NA2 is 0.65. However, a combination of a wavelength, a thickness of a protective layer and a numerical aperture is not limited to the foregoing.

Further, on the objective lens unit OU, there is provided an operation control circuit that controls operations of biaxial actuator AC, though an explanation for the circuit will be omitted here.

Optical functional surface S1 of diffracting lens L1 on the light source side is divided into first area AREA1 corresponding to an area within NA2 and second area AREA2 (not shown) corresponding to an area from NA2 to NA1, and on the first area AREA1, there is formed stepwise diffractive structure DOE wherein plural ring-shaped zones in which a step structure is formed are arranged around the optical axis that serves as a center. Incidentally, the form and the function of the stepwise diffractive structure DOE are the same as those in the Fourth Embodiment, and explanation of them will be omitted here accordingly.

The optical element for correcting chromatic aberration HOE is equipped with a function as an optical unit for correcting chromatic aberration, and liquid crystal element LCD is equipped with a function as an optical unit for correcting spherical aberration.

On the plane of incidence of the optical element for correcting chromatic aberration HOE, there is formed a diffractive structure for correcting chromatic aberration of objective lens OBJ in the violet area, and as is shown on an enlarged diagram in FIG. 6, depth d of a step of its ring-shaped zone in the optical axis direction is designed so that the order of diffraction of the diffracted light having the maximum diffraction efficiency among diffracted light generated when light flux having a wavelength of 655 nm enters may be lower than the order of diffraction of the diffracted light having the maximum diffraction efficiency among diffracted light generated when a laser light flux having a wavelength of 405 nm enters. Owing to this, sufficient diffraction efficiency can be obtained in each wavelength area, and chromatic aberration correction in a wavelength area for wavelength 655 nm is prevented from being excessive even when chromatic aberration is corrected in the violet area.

The liquid crystal element LCD is equipped with a function as spherical aberration correcting optical unit, and it can correct spherical aberration changes of a spot formed on an information recording surface of high density optical disc generated by various factors. Since technologies to correct spherical aberration changes with these liquid crystal elements LCD are described in TOKKAI No. 2001-43549, for example, detailed description will be omitted here.

When conducting recording/reproducing of information for high density optical disc HD in optical pickup device PU5, violet semiconductor laser LD1 is made to emit light, as its course for a ray of light is shown with solid lines in FIG. 6. A divergent light flux emitted from the violet semiconductor laser LD1 passes through beam arranging element SH, thereby, its sectional form is arranged to be a circular form from an oval, and then, it passes through the first and second polarized beam splitters BS1 and BS2 to be converted into a parallel light flux by the collimator lens COL. Then, it passes through the optical element for correcting chromatic aberration HOE and is regulated by diaphragm STO in terms of a diameter of the light flux to pass through liquid crystal element LCD to become a spot that is formed on information recording surface RL1 by the objective lens OBJ through protective layer PL1 of high density optical disc HD. The objective lens OBJ conducts focusing and tracking with biaxial actuator AC arranged around the objective lens.

The reflected light flux modulated by information pits on information recording surface RL1 is transmitted again through the objective lens OBJ, the liquid crystal element CD, the optical element for correcting chromatic aberration HOE and the collimator lens COL, and then, is reflected by the second polarized beam splitter BS2 to be given astigmatism by sensor lens SEN, and is converted into the converged light flux, thus, it is converged on a light-receiving surface of photodetector PD1/PD2. Thus, information recorded on high density optical disc HD can be read by the use of output signals of the photodetector PD1/PD2.

In the case of conducting recording/reproducing of information for high density optical disc HD, when spherical aberration of the spot on information recording surface RL1 is changed in the direction of excessive correction by influences such as, for example, wavelength changes of a violet laser light flux emitted from violet semiconductor laser LD1, errors in a thickness of protective layer PL1, focus jump between information recording surfaces of a two-layer disc and refractive index changes of objective lens OBJ caused by ambient temperature changes and heat generation of biaxial actuator AC, distribution of refractive index in liquid crystal molecule layer LC is changed by making a power supply to impress voltage on electrodes ELP1 and ELP2, so that spherical aberration wavefront that is corrected insufficiently may be given to a violet laser light flux that passes through liquid crystal element LCD. On the contrary, when spherical aberration of the spot on information recording surface RL1 is changed in the direction of insufficient correction, distribution of refractive index in liquid crystal molecule layer LC is changed by making a power supply to impress voltage on electrodes ELP1 and ELP2, so that spherical aberration wavefront that is corrected excessively may be given to a violet laser light flux that passes through liquid crystal element LCD. Due to this, the spot on the information recording surface RL1 turns out to be in the state where spherical aberration is corrected constantly, thus, excellent characteristics for recording/reproducing for high density optical disc HD can be obtained.

Further, a wavefront transmitted through the optical element for correcting chromatic aberration HOE and objective lens OBJ turns out to be in the state where chromatic aberration is properly corrected, a diameter of the spot formed on information recording surface RL1 through converging is prevented from becoming large even when violet semiconductor laser LD1 causes mode hopping in the case of switching from reproducing of information to recording.

When conducting recording/reproducing of information for DVD in optical pickup device PU5, red semiconductor laser LD2 is made to emit light, as its course for a ray of light is shown with broken lines in FIG. 6. A divergent light flux emitted from the red semiconductor laser LD2 is reflected by the first polarized beam splitter BS1, and then, passes the second polarized beam splitter BS2 to be converted into a parallel light flux by the collimator lens COL, then, passes through the optical element for correcting chromatic aberration HOE, regulated in terms of a diameter of the light flux by diaphragm STO, and passes through liquid crystal element LCD to become a spot that is formed on information recording surface RL2 by the objective lens OBJ through protective layer PL2 of DVD. The objective lens OBJ conducts focusing and tracking with biaxial actuator AC2 arranged around the objective lens.

The reflected light flux modulated by information pits on information recording surface RL2 is transmitted again through the objective lens OBJ, liquid crystal element LCD, the optical element for correcting chromatic aberration HOE, and the collimator lens COL, and then, is reflected by the second polarized beam splitter BS2 to be given astigmatism by sensor lens SEN, to be converted into the converged light flux, thus, it is converged on a light-receiving surface of photodetector PD1/PD2. Thus, information recorded on DVD can be read by the use of output signals of the photodetector PD1/PD2.

Incidentally, in each of the first-fifth optical pickup devices stated above, there has been explained an example to correct spherical aberration of a spot on an information recording surface by an optical unit for correcting spherical aberration in the course of conducting recording/reproducing of information for high density optical disc HD. However, it is also possible to make the structure to be one wherein spherical aberration is corrected even in the case of conducting recording/reproducing of information for DVD and CD.

Figure 24:
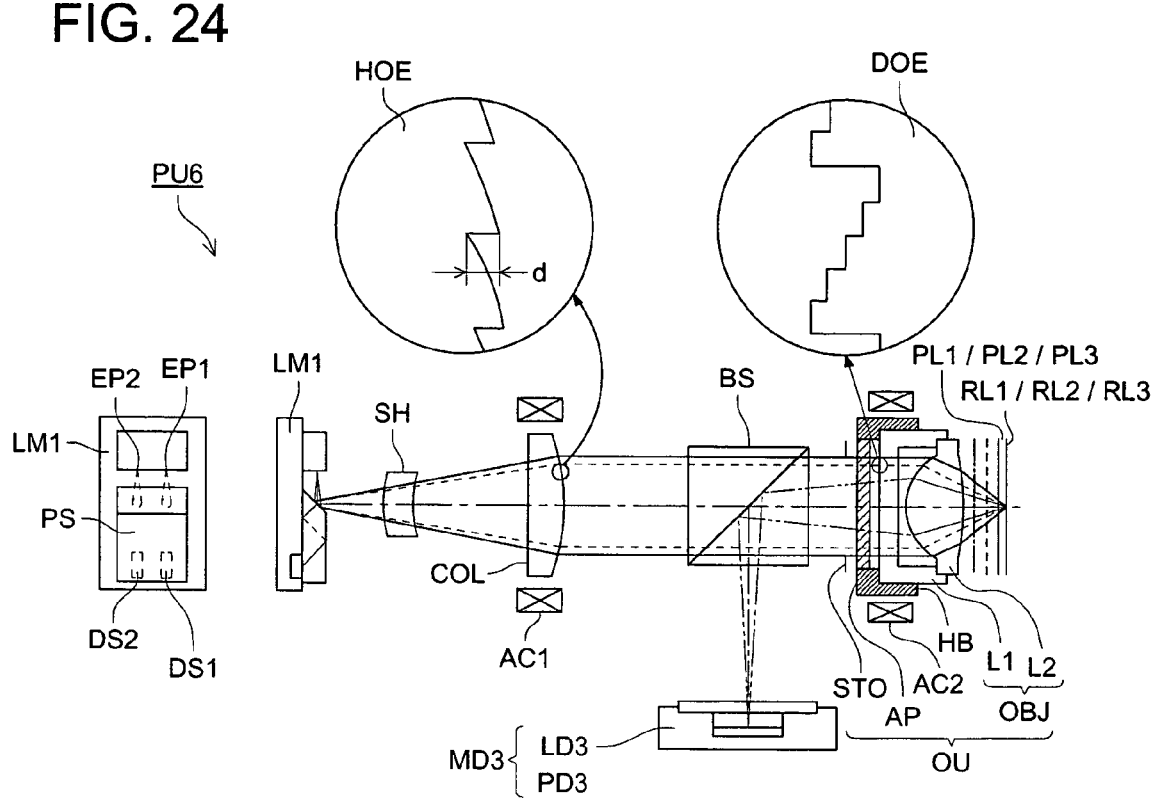
FIG. 24 is a plan view for primary portions showing the structure of an optical pickup device.

FIG. 24 is a schematic diagram of the sixth configuration of an optical pick-up unit PU6 used to record/reproduce information on a high-density optical disc HD, DVD and CD appropriately. Specifications for optical characteristics of a high-density optical disc are follows. Wavelength: 405 nm, Thickness of protective layer: 0.0875 mm, Numerical aperture NA: 0.85. Specifications for optical characteristics of DVD are as follows. Wavelength: 655 nm, Thickness of protective layer: 0.6 mm, Numerical aperture NA: 0.60. Specifications for optical characteristics of a CD are as follows. Wave length: 785 nm, Thickness of protective layer: 1.2 mm, Numerical aperture: 0.45. However, a combination of wavelength, thickness of protective layer and numerical aperture described above are not limited to the combination above.

Optical pick-up unit PU6 comprises laser module LM1 including: the first light emission point EP1 (the first light source) to emit laser beams (the first laser beams) whose wavelength is 405 nm to record/reproduce information on/from a high density optical disc HD, the second light emission point EP2 (the second light source) to emit laser beams (the second laser beams) to record/reproduce information on/from a DVD, whose wavelength is 655 nm, the first light beam detector DS1, which detects reflected laser beams from information recorded layer RL1 of a high density optical disc HD, the second light beam detector DS2, which detects reflected laser beams from information recorded layer RL2 of a DVD and Prism PS, module MD3 for CD including: infrared semiconductor laser LD3 (the third light source) to emit laser beams (the third light beams) whose wave length is 785 nm to record/reproduce information on/from CD. and photodetector PD3, which are integrated, object lens unit OU comprising: object lens OBJ, aperture limiting element AP for CD, two-axis actuator AC2, diaphragm STO corresponding to numerical aperture 0.85 of high-density optical disc HD and holding member HB, collimator lens unit CU including, polarized beam splitter BS, collimator lens COL and one-axis actuator AC1, and beam forming element SH.

When optical pickup unit PU6 records/reproduces information on/from high-density optical disc HD, laser module LM1 for high-density optical disc HD/DVD is activated to emit laser beams from emitting point EP1. Divergently emitted light beams from emitting point EP1 are reflected by prism PS and cross-sectional shape of the light beams is formed from ellipse to circle while the beams are passing through beam forming element SH, as drawn in solid line in FIG. 24. And the light beams are formed into parallel beams after passing through collimator lens COL, and penetrating through polarized beam splitter BS, then the diameter of light beams are limited by a diaphragm STO and passing through the aperture limited element AP and formed into a beam spot on information-recorded layer RL1 through protective layer PL1 of high density optical disc HD by object lens OBJ. Object lens AC2 is moved focusing and tracking directions by two-axis actuator provided adjacent to it. Reflected light beams by the information pits on information recorded layer RL1, are converged onto first light beam detector DS1 after penetrating object lens OBJ, aperture limiting element AP, polarized beam splitter BS and converged by the collimator lens COL, passing through the beam forming element SH and reflected twice in prism PS. Information recorded on the high density optical disc HD can be reproduced by using an output signal of light beam detector DS1.

And when optical pickup PU6 records/reproduces information on/from DVD, the distance between object lens OBJ and collimator lens COL is controlled shorter than the distance of which when recording/reproducing information on/from the high density optical disc HD by one axis actuator AC2 so that the second light beams come out from the collimator lens COL in parallel light beams. Then, the object lens OBJ and first laser module LM1 for high-density optical disc DH/DVD start is operated and second emission point EP2 emits light beams. The emitted divergent light beams from second emission point EP2, whose optical path is drawn in doted line in FIG. 24, are reflected by prism PS and passing through bean-forming element SH. The cross-sectional shape of the light beams is changed from ellipse to circle by beam-forming element SH. The emitted divergent light beams are formed to parallel light beams by passing through collimator lens COL. And the parallel light beams are formed to a light beam spot on information recorded layer RL2 of DVD by object lens OBJ after passing through polarized beam splitter BS, aperture limiting element AP and protective layer PL2 of DVD. Object lens OBJ is moved focusing and tracking directions by two-axis actuator AC2, which is provided adjacent to object lens OBJ. Reflected beams which have been modulated by information pits on information recorded layer RL2 are passing back through object lens OBJ, aperture limiting element AP, polarized beam splitter BS and entering collimator lens COL. Then the light beams are converged by collimator les COL and passing through beam forming element SH. The light beams are reflected twice in prism PS and focused on to light beam detector DS2. Information recorded on DVD can be reproduced by using an output signal from light beam detector DS2.

In the case of recording/reproducing information on/from CD, module MD3 for CD is operated and infrared semiconductor laser LD3 emits light beams. The divergent light beams from infrared semiconductor laser LD3 are reflected by polarized beam splitter BS and formed into a light beam spot onto information-recorded layer RL3 through protective layer of PL3 of CD after passing through object lens OBJ. Object lens OBJ is moved focusing and tracking directions by two-axis actuator AC2 provided adjacent to object lens OBJ. The reflected light beams modulated by information pits on information-recorded layer RL3 are passing back through object lens OBJ, aperture limiting element AP, and reflected by polarized beam splitter BS. The reflected light beams are focused on a light-receiving surface of photo-detector PD3 of module MD for CD. Thus, information recorded on CD is reproduced by using an output signal of photo-detector PD3.

Object lens OBJ comprises diffractive lens L1 and condensing lens L2 whose two surfaces are formed in aspheric surface so as to focus laser beams passed through diffractive lens L1 on information-recorded layer of an optical disc. Each lens is plastic made and combined at a flange portion, which is integrated with an optical surface.

An operation control circuit (not shown), which controls movement of 2-axis actuator AC2, is provided with object lens unit OU. A light source-side optical function surface of diffractive lens L1 is divided into first area AREA1 (not shown) corresponding to an area, which is inside of NA2, and second area AREA2 (not shown) corresponding to an area from NA2 to NA1. And a plurality of a ring-shaped zones, within which a ladder type structure is formed, is arranged in centered round an optical axis, which is a ladder type diffractive structure DOE, in first area AREA1. A depth "d0" of a step of the ladder type structure formed in each ring-shaped zone within the ladder type diffractive structure DOE formed in first area AREA1 is set by a following formula:

$$d0 = 2 \times \lambda/(n1-1) \, (\mu m)$$

Each ring-shaped zone is divided into 5 (number of partitions N is set to 5). Where $\lambda$ represents a wavelength of laser beams in microns, which are emitted from violet colored semiconductor laser (Where $\lambda 1 = 0.405 \, \mu m$), n1 represents refractive index of diffractive lens L1 for wavelength $\lambda 1$. (Where n1=1.524694).

When laser beams, whose wavelength is $\lambda 1$, incidents into this ladder diffractive structure DOE, they are not diffracted and passing through as they been, since an optical path difference, "$2 \times \lambda 1$" ($\mu m$) occurs between adjacent ladders, and no phase difference is given to laser beams whose wavelength is $\lambda 1$ and the laser beams are no diffracted and passing through the diffractive structure. Light beams passing through the ladder type diffractive structure without diffraction is called zero (0) order diffraction beams.

Light beams, whose wavelength is $\lambda 3$ incidents to ladder type diffractive structure DOE, an optical path difference occurs of $1 \times \lambda 3$ ($\mu m$) between light beams of adjacent ladders, since $\lambda 3$ is nearly equals to $2 \times \lambda 1$. Then, light beams whose wavelength is $\lambda 1$ and light beams whose wavelength is $\lambda 3$ are passing through the ladder structure since practically, there is no phase difference between light beams of $\lambda 1$ same and light beams of $\lambda 3$. When laser beams (wavelength $\lambda 2 = 0.655 \, (\mu m)$) from infrared semiconductor laser incidents to the ladder type diffractive structure, an optical path between adjacent ladders is given by formula: $(d \times (n2-1) - \lambda 2 = 0.13 \, \mu m)$. Namely, the optical path difference becomes 0.13 $\mu m$. Then, in the case that a ring-shaped zone is divided into five portions, the optical path between adjacent ring-shaped zones is 0.13×5=0.65 $\mu m$, which is equal to one wavelength. Then, the wave surfaces of light beams passing through adjacent ring-shaped zone become in phase, since one wavelength shift occurs. Namely, light beams whose wavelength is $\lambda 2$ are diffracted to first-order diffraction direction as diffracted light beams. Object lens OBJ absorbs spherical aberration caused by the difference between a depth of protective layer PL1 of high-density optical disc HD and that of protective layer pL2 of DVD. In addition, n2 represents a refractive index of diffractive lens L2 for laser beam wavelength $\lambda 2$ (Where, n2=1.506513). In this case, diffraction efficiency of first-order diffracted light beams of laser beams whose wavelength is $\lambda 2$ is 87.3% and it is enough quantity of light beams to record/reproduce information on/from DVD.

Furthermore, spherical aberration caused by a difference between the depth of protective layer PL1 of high-density optical disc HD and that of protective layer pL2 of DVD is corrected only against the light beams whose wavelength is $\lambda 2$, passing through first area AREA1, not against the light beams passing through second area AREA2 which surrounds the area AREA1. Accordingly, light beams whose wavelength is $\lambda 2$, passing through area AREA2 become flare components, which does not contribute to form light beam spot on information-recorded layer RL2 of DVD. In regard to forth optical pickup PU4, it is not necessary to provide an aperture-limiting element as a separate element corresponding to DVD whose numerical aperture NA2 since it has same effects that aperture limitation corresponding to NA2 is done automatically. Collimator lens unit CU has functions as a chromatic aberration correcting element and a spherical aberration correcting optical element. Namely, a chromatic aberration correcting element and a spherical aberration correcting optical element are combined into one optical unit.

Diffractive structure HOE is formed on an emitting surface of collimator lens COL to correct chromatic aberration in violet colored region of object lens OBJ. As shown in FIG. 24, the depth of a step of a ring-shaped zone in an optical axis direction is designed to obtain lower order number of diffraction order of diffracted light beam whose diffraction efficiency shows maximum efficiency, when the light beams whose wavelength is 655 nm, incident to object lens OBJ than the number of diffraction order of diffracted light beams whose diffraction efficiency shows maximum efficiency, when the light beams whose wavelength is 405 nm. Accordingly, enough diffraction efficiency can be achieved in each wavelength region and correction of chromatic aberration in the wavelength 655 nm region is controlled appropriately.

Collimator lens COL is moved along an optical axis by one axis-actuator AC1 to change an inclination angle of marginal light beams which incident to object lens OBJ so that collimator lens COL absorbs an chromatic aberration between the first wavelength and the second wavelength and forms parallel light beams of any wavelength from collimator lens COL. Furthermore, it is possible to maintain good recording and reproducing characteristics constantly with high density optical discs HD since a spherical aberration of a beam spot on an information record/reproduce layer of high density optical disc HD can be corrected by shifting collimator lens COL along the optical axis direction, when recording and/or reproducing a high density optical disc HD.

Causes of spherical aberration, which can be corrected by shifting a position of collimator lens COL, are for example, a variation of wavelength of violet laser LD1 caused by manufacturing tolerances, a variation of a temperature dependency of refractive index and distribution of a refractive index of object lens OBJ, a focus jump characteristic of multiple-layer discs such as two-layer discs or four-layer discs, when recording and reproducing multiple-layered discs, and a variation of depth of the protective layer PL1 based on manufacturing tolerances and variations of distribution of the depth etc.

In the above, an example of that a spherical aberration of a light beam spot formed on an information recording layer of high density optical discs is corrected, is explained, however it can be applied to the case where a spherical aberration of a beam spot formed on an information recording layer RL2 of DVD.

In this embodiment of the present invention, aperture-limiting element AP, which is integrated with object lens OBJ via connecting member HB, is provided as an aperture-limiting element to perform aperture-limiting function corresponding to NA3. And two-axis actuator AC2 actuates aperture-limiting element AP and object lens OBJ as a combined unit.

A wavelength selection filter WF (not shown) having a wavelength selection for transmittance is provided on an optical surface of aperture limiting element AP. The wavelength selection filter passes all light beams from wavelength λ1 through wavelength λ3 within area NA3, and passes wave length λ1 and wavelength λ2 and cuts off the third wavelength λ3 in the area from NA3 to NA1. Accordingly an aperture-limiting corresponding to NA3 can be achieved based on the wavelength selection characteristics explained above. In addition, it is possible to provide wavelength selection filter WF on the optical functional surface of diffractive lens L1 or that of converging lens L2.

Figure 25:
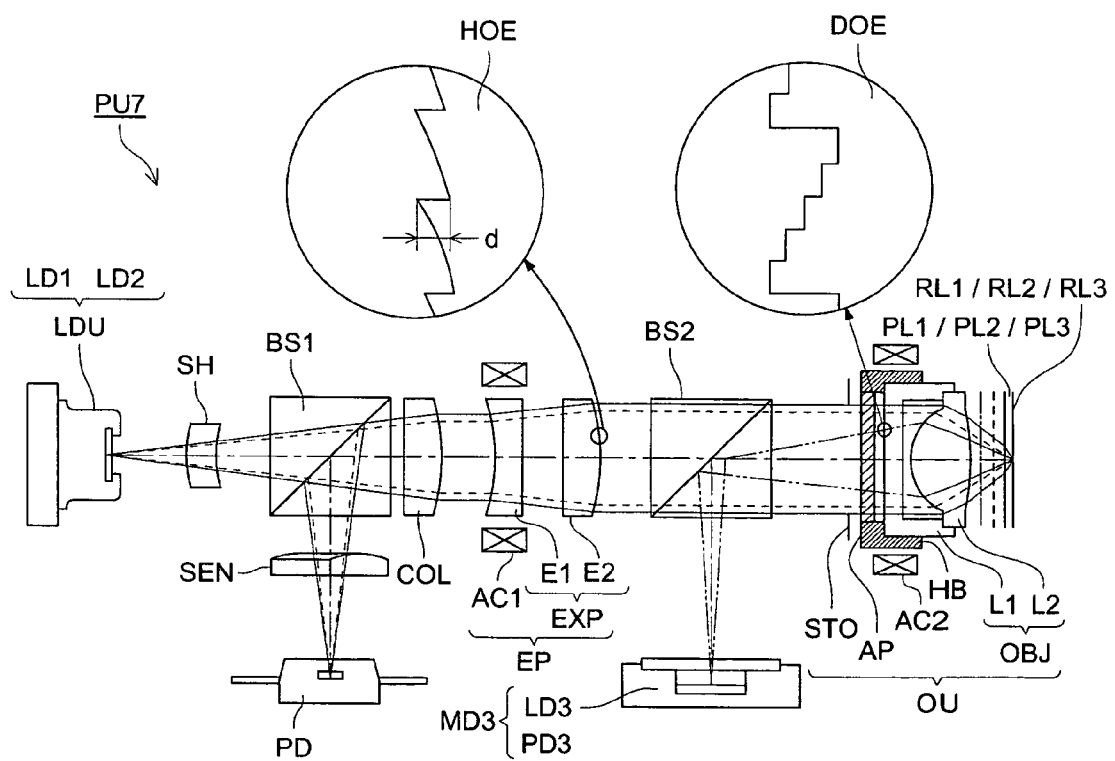
FIG. 25 is a plan view for primary portions showing the structure of an optical pickup device.

FIG. 25 shows a schematic diagram of the seventh optical pickup unit capable to recording/reproducing a high-density optical disc HD, a DVD and a CD. Optical characteristic specifications for a high-density optical disc are as follows. Wavelength: 405 nm, Thickness of a protective layer: 0.0875 mm, Numerical aperture: 0.85, Optical characteristic specifications for DVD, Wavelength 655 nm, Thickness of a protective layer: 0.6 mm, Numerical aperture: 0.60, Optical characteristic specifications for a CD, Wavelength: 785 nm, Thickness of a protective layer: 1.2 mm and Numerical aperture: 0.45. In addition, a combination of the wavelength, the thickness of a protective layer and the numerical aperture is not limited to this combination.

Optical pickup unit PU7 comprises light beam source LDU including violet semiconductor laser diode LD1 to emit laser beams (the first laser beams) whose wave length is 405 nm to record/reproduce information on/from a high density optical disc HD and red colored semiconductor laser LD2 whose wavelength is 655 nm (the second laser beams) to record/reproduce information on/from a DVD; photo-detector PD used for both a high density optical disc HO and a DVD; module MD3 for a CD including infrared laser diode LD3 whose wavelength is 785 nm, to emit laser beams (the third laser beam) to record/reproduce information on/from a CD and photo-detector PD3 as an integrated unit; object lens unit OU including object lens OBJ, aperture limiting element AP for CD, two-axis actuator AC2, diaphragm STO corresponding to NA 0.85 which is a numerical aperture of a high density optical disc HD and hub member HB; the first diffracting beam splitter BS1; the second diffracting beam splitter BS2; collimator lens COL; expander lens unit EP including one-axis actuator AC1 and expander lens EXP including negative lens E1 and positive lens E2; sensor lens SEN; and beam forming element SH.

Violet laser LD1 in optical pickup unit PU7 emits violet laser beams to record/reproduce information on/from a high-density optical disc HD and optical paths of the laser beams are drawn in solid line in FIG. 25. Divergently emitted laser beams from violet laser LD1 are formed into parallel laser beams after passing through collimator lens COL and beam splitter BS, after a cross-sectional shape of the laser beams are formed from an ellipse into a circle while the light beams are passing through beam-forming element SH. A diameter of the laser beams passing through expander lens EXP and second polarized beam splitter BS2 is limited by diaphragm STO and focused onto information recorded layer RL1 through protective layer PL1 of a high-density optical disc HD by object lens OBj after passing through aperture limiting element AP.

Reflected laser beams modulated by information pits on information recorded layer RL1 are reflected by beam splitter BS1 after passing back through objective lens OBJ, aperture-limiting element AP, second diffracting beam splitter BS2, expanding lens EXP, collimator lens COL and converged onto a light receiving surface of photo-detector PD after astigmatism is given by sensor lens SEN. Information recorded on a high-density optical disc HD can be reproduced by using an output signal from photo-detector PD.

When recording/reproducing information on/from DVD, one-axis actuator AC1 moves negative lens E1 so that an output laser beams from beam expander EPX is formed into parallel laser beams, and a distance between negative lens E1 of expander lens EXP and positive lens E2 is longer than that of distance when recording/reproducing information on/from a high density optical disc HD. After that, an infrared semi-conductor laser is activated and emits laser beams as drawn in dotted line in FIG. 25. The laser beams are formed so that a cross-sectional shape of laser beams, which are divergently emitted from red-colored laser diode LD2 is changed from an ellipse into a circle while the laser beams are passing through beam-forming element SH. The beams passing through first beam splitter BS and collimator lens COL are formed into slightly divergent light beams and they are changed into parallel laser beams after passing through expander lens EXP. A laser beam spot is formed by object lens OBJ on information recorded layer RL2 through protective layer of a DVD after the laser beams have passed through second polarized beam splitter BS2 and aperture limiting element AP. Object lens unit OBJ is moved in focusing and tracking directions to perform focusing and tracking functions by two-axis actuator AC2 provided adjacent to the object lens.

Reflected light beams modulated by information pits on information recorded layer RL2 are converged onto a light surface of photo-detector PD after passing back through objective lens unit OBJ, aperture limiting element AP, second polarized beam splitter BS2, expander lens EXP, collimator lens COL, first polarized beam splitter BS1, by which the light beams are reflected, and sensor lens SEN, which gives astigmatism to light beams. Recorded information on DVD can be reproduced by using an output signal from photo-detector PD.

When recording/reproducing information on/from a CD, module MD3 for a CD is operated to activate infrared semiconductor laser LD3 to emit laser beams whose optical path is drawn in two-dotted chain line shown in FIG. 25. Divergent laser beams from infrared semiconductor laser LD3 are focused on information recorded layer RL3 through protective layer PL3 of CD by object lens unit OBJ after passing through second polarized beam splitter BS2, which reflects the laser beams, aperture limiting element AP, which limits the diameter of the light beams. Object lens unit OBJ performs focusing and tracking function together with two-axis actuator AC2 provided adjacent to the object lens.

Reflected light beams modulated by information pits on information-recorded layer RL3 are converged onto a light receiving surface of photo-detector PD 3 provided in module unit MD1 after passing back through object lens unit OBJ, aperture limiting element AP, second polarized beam splitter BS2, which the light beams are reflected. Recorded information on CD can be reproduced by using an output signal from photo-detector PD3.

The detail explanation of object lens unit is eliminated since configurations and functions of object lens unit OBJ is same as object lens unit OBJ used in the sixth embodiment of the present invention. The detail explanation of aperture limiting element AP will be eliminated since, configurations and functions of aperture limiting element AP is same as aperture limiting element AP used in the sixth embodiment.

In this embodiment, expander lens unit EU has two functions combined. First one is a chromatic aberration correction optical element and second one is a spherical aberration correction optical element. Namely, a chromatic aberration correction optical element and a spherical aberration correction optical element are combined into one optical unit.

Diffractive structure HOE is formed on an emission side surface of positive lens E2 of expander lens EXP. As shown in FIG. 25, depth of a step in a ring-shaped zone in an optical axis direction is designed to obtain lower number of diffraction order of diffracted light beams whose diffraction efficiency shows maximum efficiency, when the light beams whose wavelength is 655 nm, incident to object lens OBJ than the diffraction order number of diffracted light beams whose diffraction efficiency shows maximum efficiency, when the light beams whose wavelength is 405 nm. Accordingly, enough diffraction efficiency can be achieved in each wavelength region and the correction of chromatic aberration in the wavelength of 655 nm region is controlled appropriately.

And, a negative lens E1 of expander lens EXP is configured to moved along with its optical axis direction by one-axis actuator AC2. As explained above, it absorbs chromatic aberration between wavelength λ1 and wavelength λ2 and forms light beams of any wavelength into parallel light beams and emits from expander lens EXP. Furthermore, it is possible to maintain excellent recording/reproducing characteristics with a high density optical disc HD since spherical aberration of a beam spot formed on information recorded layer RL1 of high density optical disc HD can be corrected by shifting negative lens E1 along with its optical axis when recording/reproducing information on/from a high density optical disc HD.

Causes of spherical aberration, which can be corrected by shifting a position of negative lens E1 is for example, a variation of wavelength of violet laser LD1 caused by manufacturing tolerances, a variation of a temperature dependency of refractive index and distribution of a refractive index of object lens OBJ, a focus jump characteristic of multiple-layer discs such as two-layer discs, or four-layer discs, when recording and reproducing multiple-layered discs, and a variation of depth of the protective layer PL1 based on manufacturing tolerances and variations of distribution of the depth etc.

In the above, an example of that a spherical aberration of a light beam spot formed on an information recording layer of high density optical discs is corrected, is explained, however it can be applied to the case where a spherical aberration of a beam spot formed on an information recording layer RL2 of DVD.

EXAMPLES

Next, there will be explained some examples including Example 1 representing an optical system that is suitable as expander lens EXP and objective lens OBJ in the aforementioned optical pickup device PU1, Example 2 representing an optical system that is suitable as collimator lens COL, the first objective lens OBJ1 and the second objective lens OBJ2 in the aforementioned optical pickup device PU2, Example 3 representing an optical system that is suitable as the first collimator lens COL1 and the first objective lens OBJ1 in the aforementioned optical pickup device PU4, Example 4 representing an optical system that is suitable as the optical element for correcting chromatic aberration HOE and the objective lens OBJ in the aforementioned optical pickup device PU5, Example 5 representing an optical system that is suitable as the collimator lens COL and the objective lens OBJ in the aforementioned optical pickup device PU6, and Example 5 representing an optical system that is suitable as the expander lens EXP and objective lens OBJ in the aforementioned optical pickup device PU7.

The aspheric surface in each Example is expressed by the following Numeral 5 when X (mm) represents an amount of deformation from a plane that is tangential to the aspheric surface at its vertex, h (mm) represents a height in the direction perpendicular to the optical axis, and r (mm) represents a radius of curvature, wherein κ represents a conic constant and $A_{2i}$ represents an aspheric surface coefficient.

$$X = \frac{h^2/r}{1 + \sqrt{1-(1+\kappa)h^2/r^2}} + \sum_{i=2} A_{2i}h^{2i} \qquad \text{(Numeral 5)}$$

Further, a diffractive structure in each Example is expressed by an optical path difference added to the transmission wavefront by the diffractive structure (amount of optical path difference added). The optical path difference of this kind is expressed by optical path difference function $\Phi_b$ (mm) defined by the aforesaid Numeral 4, when h (mm) represents a height in the direction perpendicular to the optical axis, $B_{2j}$ represents the optical path difference function, n represents an order of diffraction, λ (mm) represents a wavelength of a light flux entering the diffractive structure and λB (nm) represents a construction wavelength (or blazed wavelength) of the diffractive structure.

Example 1

Example 1 is represented an optical system suitable as expander lens EXP and objective lens OBJ in optical pickup device PU1, and the optical system is composed of objective lens OBJ representing a plastic lens whose aberration correction is optimized for wavelength 405 nm and for a protective layer with a thickness 0.6 mm and of expander lens EXP composed of two plastic lenses including negative lens NL and positive lens PL.

Figure 7:
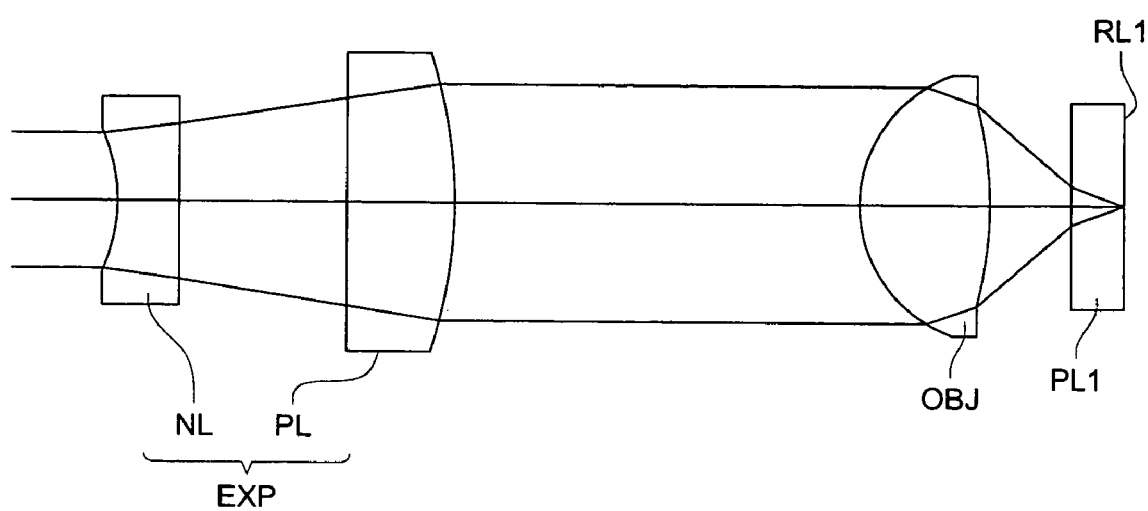
FIG. 7 is an optical path diagram for conducting recording/reproducing of information for high density optical disc.
Figure 8:
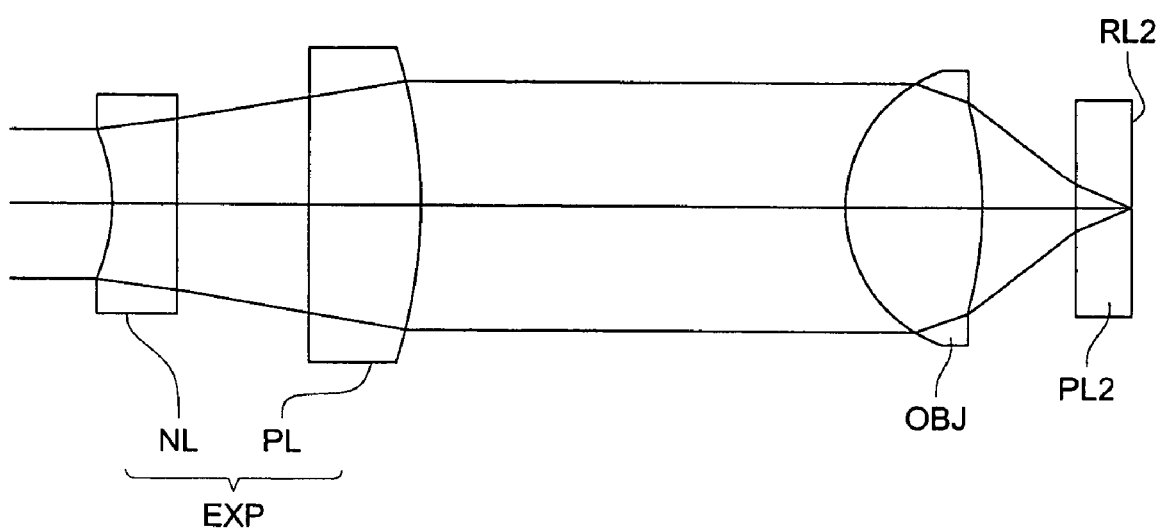
FIG. 8 is an optical path diagram for conducting recording/reproducing of information for DVD.
Figure 9:
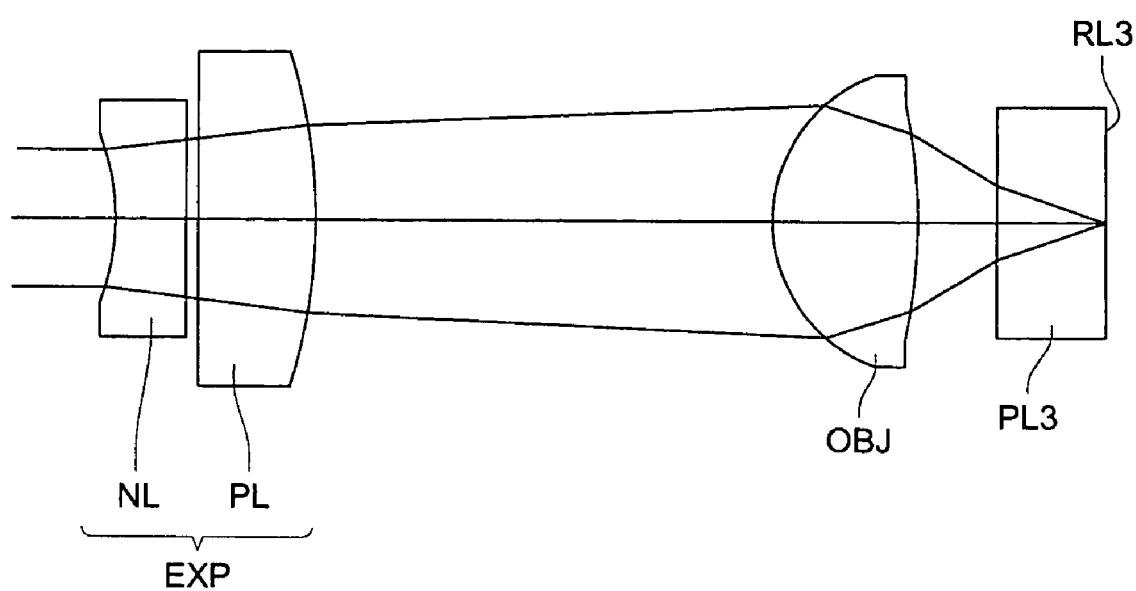
FIG. 9 is an optical path diagram for conducting recording/reproducing of information for CD.

Table 1 shows specific lens data of the optical system, FIG. 7 shows an optical path diagram for conducting recording/reproducing of information for high density optical disc HD, FIG. 8 shows an optical path diagram for conducting recording/reproducing of information for DVD and FIG. 9 shows an optical path diagram for conducting recording/reproducing of information for CD.

TABLE 1

$f1 = 2.308$, $NA1 = 0.65$, $\lambda 1 = 405$ nm, $m1 = 0.00$, $n1 = 10$, $d2 = 2.000$, $d6 = 1.059$, $d7 = 0.6$
$f2 = 2.385$, $NA2 = 0.63$, $\lambda 2 = 655$ nm, $m2 = -0.02$, $n2 = 6$, $d2 = 1.510$, $d6 = 1.172$, $d7 = 0.6$
$f3 = 2.392$, $NA3 = 0.50$, $\lambda 3 = 785$ nm, $m3 = -0.09$, $n3 = 5$, $d2 = 0.100$, $d6 = 0.936$, $d7 = 1.2$ Paraxial value

| Surface No. | r (mm) | d (mm) | N$\lambda$1 | N$\lambda$2 | N$\lambda$3 | vd |
|---|---|---|---|---|---|---|
| 0 | — | ∞ | — | — | — | — |
| 1 | −2.4275 | 0.8000 | 1.5247 | 1.5065 | 1.5050 | 56.5 |
| 2 | ∞ | d2 | — | — | — | — |
| 3 | ∞ | 1.3000 | 1.5247 | 1.5065 | 1.5050 | 56.5 |
| 4 | −5.5265 | 5.0000 | — | — | — | — |
| 5 | 1.4461 | 1.6000 | 1.5247 | 1.5065 | 1.5050 | 56.5 |
| 6 | −4.6094 | d6 | — | — | — | — |
| 7 | ∞ | d7 | 1.6195 | 1.5772 | 1.57050 | 30.0 |
| 8 | ∞ | — | — | — | — | — |

Aspheric surface coefficient

| | First surface | Fourth surface | Fifth surface | Sixth surface |
|---|---|---|---|---|
| κ | −0.8860E+00 | −9.8200E−01 | −0.6905E+00 | −0.1166E+02 |
| A4 | −0.6345E−05 | 6.0653E−04 | 0.6960E−02 | 0.3525E−01 |
| A6 | −0.1949E−03 | 0 | 0.1261E−02 | −0.1316E−01 |
| A8 | 0 | 0 | 0.6829E−03 | 0.3206E−02 |
| A10 | 0 | 0 | −0.1649E−03 | −0.3705E−03 |
| A12 | 0 | 0 | 0.5041E−04 | 0 |

Coefficient of optical path difference function

| | Fourth surface |
|---|---|
| $\lambda$B | 405 nm |
| B2 | −1.5000E−03 |
| B4 | −4.0136E−05 |

In Table 1, f1 represents a focal length of objective lens OBJ, NA1 represents a numerical aperture of objective lens OBJ, $\lambda$1 represents a design wavelength of an optical system, m1 represents magnification of objective lens OBJ and n1 represents a diffraction order of diffracted light having the maximum diffraction efficiency among diffracted light generated by the diffractive structure that is formed on positive lens PL of expander lens EXP, in the case of using high density optical disc HD, f2, NA2, $\lambda$2, m2 and n2 represent similar values in the case of using DVD, and f3, NA3, $\lambda$3, m3 and n3 represent similar values in the case of using CD. Further, d2, d6 and d7 represent respectively a distance between negative lens NL and positive lens PL, a thickness of a protective layer and a working distance in the case of using each optical disc. Further, r (mm) represents a radius of curvature, d (mm) represents a distance between surfaces, N$\lambda$1 represents a refractive index in wavelength $\lambda$1, N$\lambda$2 represents a refractive index in wavelength $\lambda$2, N$\lambda$3 represents a refractive index in wavelength $\lambda$3, vd represents Abbe's number in d line and $\lambda$B represents a manufacture wavelength of the diffractive structure.

On the optical surface (Fourth surface in Table 1) of positive lens PL on the objective lens OBJ side, there is formed a diffractive structure wherein a depth of the step closest to the optical axis is 7.6 μm. When a laser light flux emitted from violet semiconductor laser LD1 enters the diffractive structure, $10^{th}$ order diffracted light is generated to have the maximum diffraction efficiency, when a laser light flux emitted from first light-emitting point EP1 of laser module LM enters the diffractive structure, $6^{th}$ order diffracted light is generated to have the maximum diffraction efficiency, and when a laser light flux emitted from second light-emitting point EP2 of laser module LM enters the diffractive structure, $5^{th}$ order diffracted light is generated to have the maximum diffraction efficiency.

Owing to this structure, diffraction efficiency at each diffraction order for each wavelength is 100% at $10^{th}$ diffracted light for wavelength 405 nm, then, it is 99.7% at $6^{th}$ diffracted light for wavelength 655 nm, and it is 99.6% at $5^{th}$ diffracted light for wavelength 785 nm, and high diffraction efficiency can be secured for any wavelength.

Figure 10:
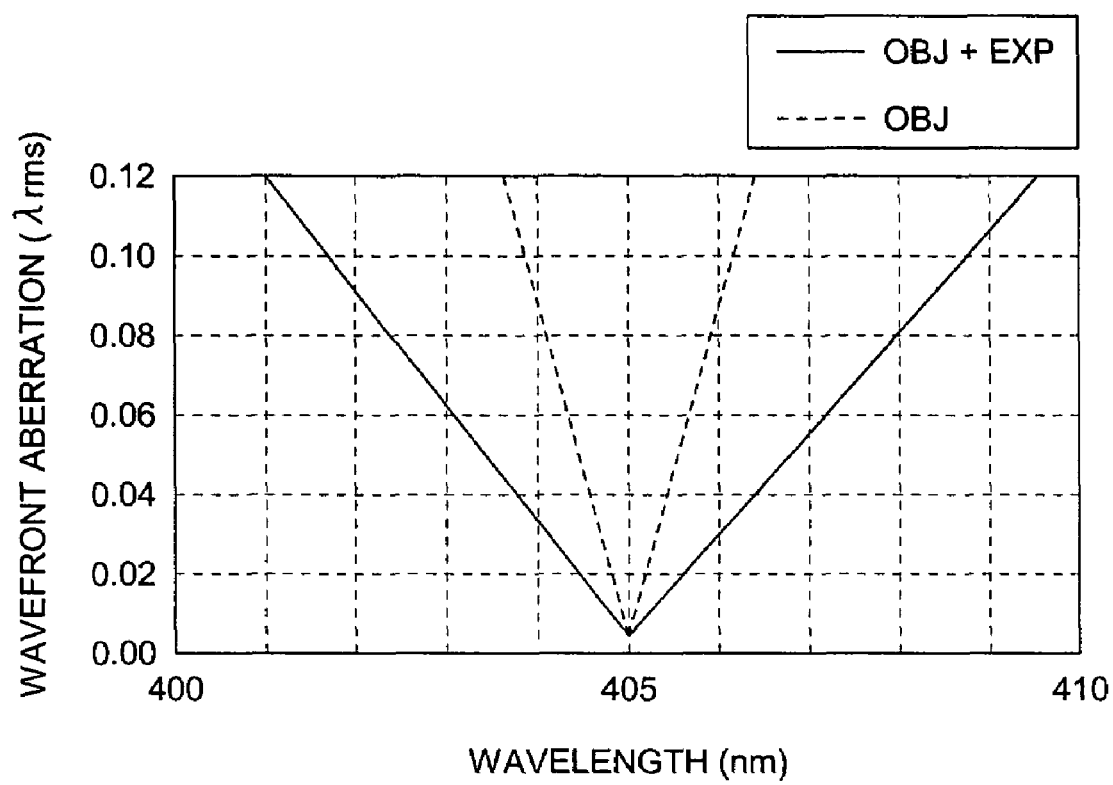
FIG. 10 is a graph showing chromatic aberration correcting effects of an objective lens in a violet area.

FIG. 10 shows an effect of the diffractive structure for correction of chromatic aberration of objective lens OBJ in a violet area. In the figure, "OBJ+EXP" shows characteristics of the optical system composed of the objective lens OBJ and expander lens EXP, and "OBJ" shows characteristics of the objective lens OBJ. When calculating wavefront aberration, the objective lens OBJ is fixed at the best image surface position at wavelength 405 nm. FIG. 10 implies that the optical system composed of the objective lens OBJ and expander lens EXP has sufficient capacity for wavelength changes (approximately, +1 nm) caused by mode hopping of violet semiconductor laser LD1.

In this optical system, it is possible to correct spherical aberration caused by various factors, by changing and adjusting a distance between negative lens NL and positive lens PL in expander lens EXP, while conducting recording/reproducing of information for high density optical disc HD.

Figure 11:
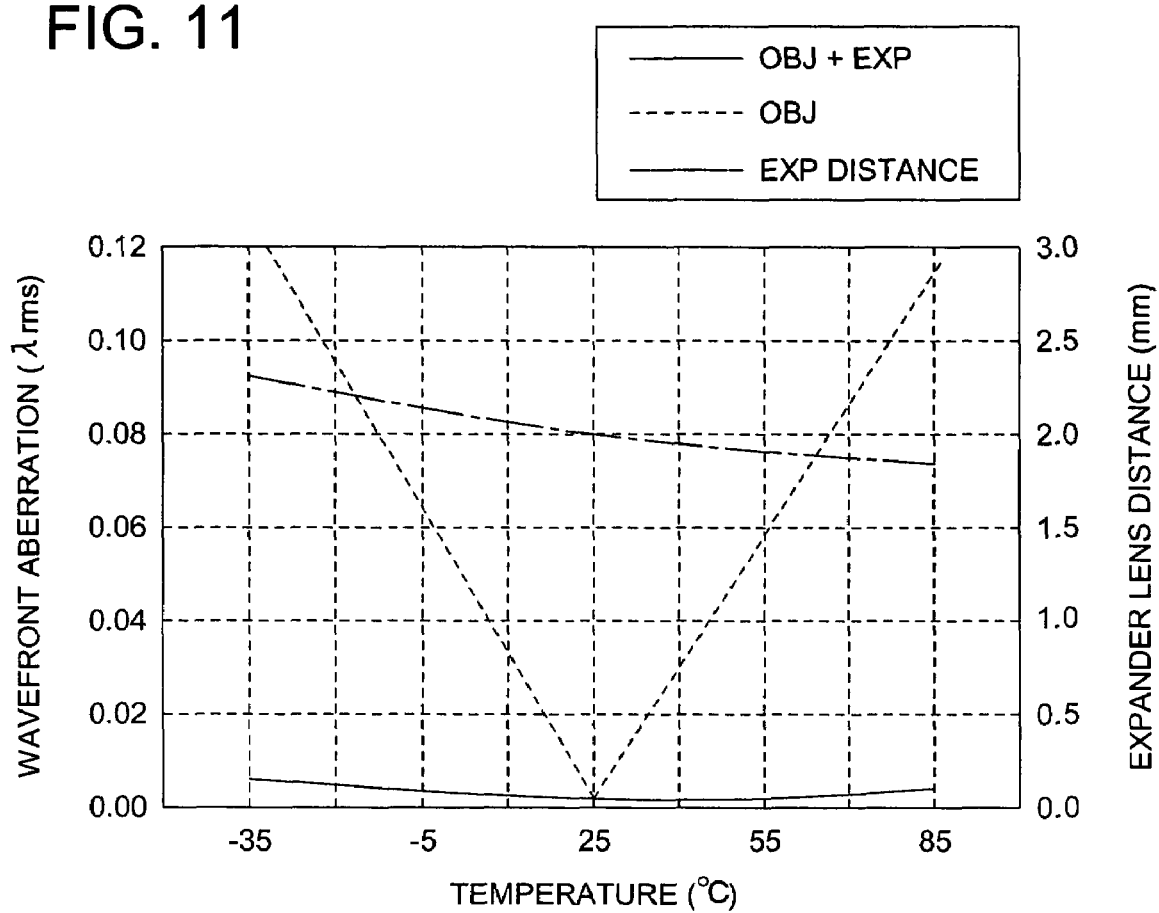
FIG. 11 is a graph showing results of correction of spherical aberration caused in an objective lens by temperature changes correcting effects of an objective lens in a violet area.

As an example, FIG. 11 shows results of correction for spherical aberration caused on objective lens OBJ by temperature changes. In the figure, "OBJ+EXP" shows characteristics of the optical system composed of the objective lens OBJ and expander lens EXP, "OBJ" shows characteristics of the objective lens OBJ and "EXP distance" shows the optimum distance between negative lens NL and positive lens PL for each temperature. An amount of changes for refractive index for temperature changes of objective lens OBJ is $-1.1 \times 10^{-5}$/° C. FIG. 11 implies that the optical system composed of objective lens OBJ and expander lens EXP can maintain excellent capacity even when a temperature of the objective lens OBJ is changed by ambient temperature changes and by heat generation of biaxial actuator AC2.

For DVD, recording/reproducing of information is conducted under the condition where a distance between negative lens NL and positive lens PL is made to be 1.51 mm so that a divergent light flux may enter the objective lens OBJ, and spherical aberration caused by wavelength dispersion of objective lens OBJ is corrected.

For CD, recording/reproducing of information is conducted under the condition where a distance between negative lens NL and positive lens PL is made to be 0.10 mm so that a divergent light flux may enter the objective lens OBJ, and spherical aberration caused by wavelength dispersion of objective lens OBJ and spherical aberration caused by a difference of protective layer thickness between high density optical disc HD and CD are corrected.

Example 2

Example 2 is represented by an optical system suitable as collimator lens COL, first objective lens OBJ1 and second objective lens OBJ2 in optical pickup device PU2, and the optical system is composed of first objective lens OBJ1 representing a plastic lens of a two-group two-element structure optimized in terms of aberration correction for wavelength 405 nm and a protective layer with thickness 0.1 mm, second objective lens OBJ2 representing a plastic lens optimized in terms of aberration correction for wavelength 405 nm and a protective layer with thickness 0.6 mm and of collimator lens COL representing a plastic lens.

Figure 12:
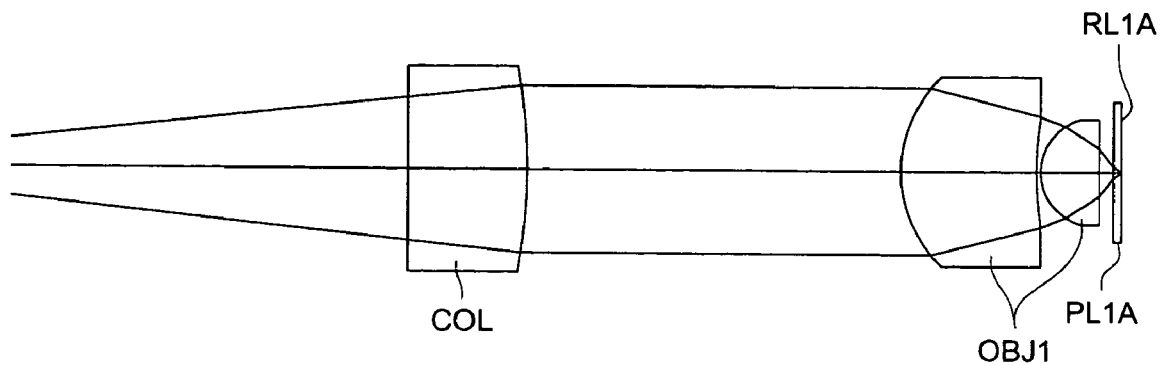
FIG. 12 is an optical path diagram for conducting recording/reproducing of information for the first high density optical disc.
Figure 13:
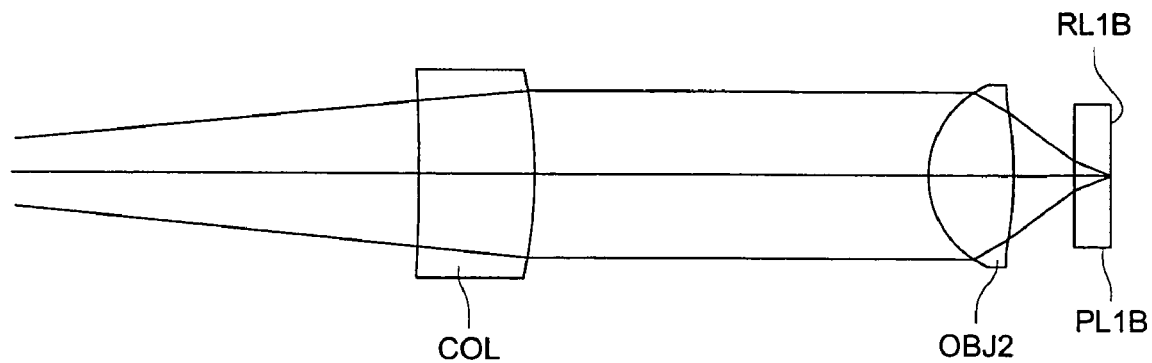
FIG. 13 is an optical path diagram for conducting recording/reproducing of information for the second high density optical disc.
Figure 14:
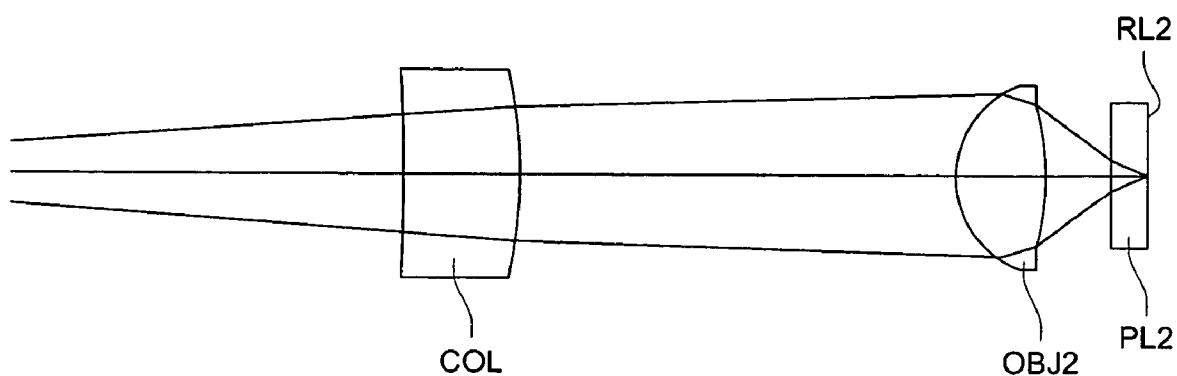
FIG. 14 is an optical path diagram for conducting recording/reproducing of information for DVD.
Figure 15:
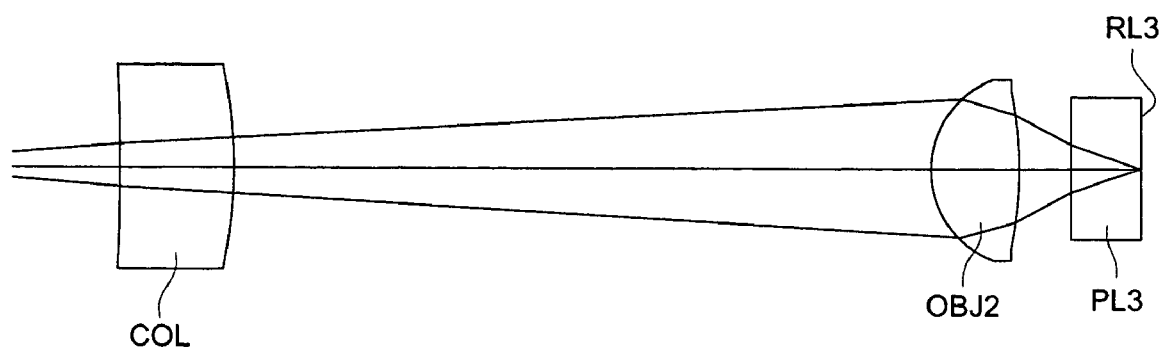
FIG. 15 is an optical path diagram for conducting recording/reproducing of information for CD.

Table 2 shows specific lens data of the optical system composed of first objective lens OBJ1 and collimator lens COL, Table 3 shows specific lens data of the optical system composed of second objective lens OBJ2 and collimator lens COL, FIG. 12 shows an optical path diagram for conducting recording/reproducing of information for the first high density optical disc HD1, FIG. 13 shows an optical path diagram for conducting recording/reproducing of information for the second high density optical disc HD2, FIG. 14 shows an optical path diagram for conducting recording/reproducing of information for DVD and FIG. 15 shows an optical path diagram for conducting recording/reproducing of information for CD.

In Table 2, f1 represents a focal length of first objective lens OBJ1, NA1 represents a numerical aperture of first objective lens OBJ1, $\lambda 1$ represents a design wavelength of an optical system, m1 represents magnification of first objective lens OBJ1 and n1 represents a diffraction order of diffracted light having the maximum diffraction efficiency among diffracted light generated by the diffractive structure formed on collimator lens COL, in the case of using first high density optical disc HD1. Further, r (mm) represents a radius of curvature, d (mm) represents a distance between surfaces, $N\lambda 1$ represents a refractive index in wavelength $\lambda 1$, $N\lambda 2$ represents a refractive index in wavelength $\lambda 2$, $N\lambda 3$ represents a refractive index in wavelength $\lambda 3$, vd represents Abbe's number in d line and $\lambda B$ represents a manufacture wavelength of the diffractive structure.

In Table 3, f1 represents a focal length of second objective lens OBJ2, NA1 represents a numerical aperture of second objective lens OBJ2, $\lambda 1$ represents a design wavelength of an optical system, m1 represents magnification of second objective lens OBJ2 and n1 represents a diffraction order of diffracted light having the maximum diffraction efficiency among diffracted light generated by the diffractive structure formed on collimator lens COL, in the case of using second high density optical disc HD2, f2, NA2, $\lambda 2$, m2 and n2 represent similar values in the case of using DVD, and f3, NA3, $\lambda 3$, m3 and n3 represent similar values in the case of using CD. Further, d0, d2, d4, and d5 represent respectively a distance between objects, a distance between collimator lens COL and second objective lens OBJ2, a thickness of a protective layer and s working distance. Further, r (mm) represents a radius of curvature, d (mm) represents a distance between surfaces, $N\lambda 1$ represents a refractive index in wavelength $\lambda 1$, $N\lambda 2$ a represents refractive index in wavelength $\lambda 2$, $N\lambda 3$ represents a refractive index in wavelength $\lambda 3$, and vd represents Abbe's number in d line.

TABLE 2 f1 = 1.765, NA1 = 0.85, $\lambda 1$ = 405 nm, m1 = 0.00, n1 = 2

Paraxial value

| Surface No. | r (mm) | d (mm) | $N\lambda 1$ | $N\lambda 2$ | $N\lambda 3$ | vd |
|---|---|---|---|---|---|---|
| 0 | — | 13.5332 | — | — | — | — |
| 1 | −60.0547 | 2.0000 | 1.5247 | 1.5065 | 1.5050 | 56.5 |
| 2 | −12.6988 | 10.0000 | — | — | — | — |
| 3 | 2.0993 | 2.5000 | 1.5247 | 1.5065 | 1.5050 | 56.5 |
| 4 | 7.4878 | 0.0500 | — | — | — | — |
| 5 | 0.8495 | 1.1000 | 1.5247 | 1.5065 | 1.5050 | 56.5 |
| 6 | ∞ | 0.2396 | — | — | — | — |
| 7 | ∞ | 0.1000 | 1.6195 | 1.5772 | 1.57050 | 30.0 |
| 8 | ∞ | — | — | — | — | — |

Aspheric surface coefficient

| | Second surface | Third surface | Fourth surface | Fifth surface |
|---|---|---|---|---|
| κ | −1.1627E−01 | −0.1297E+00 | 0.4212E+02 | −0.7523E+00 |
| A4 | −8.5920E−06 | −0.3325E−02 | 0.7053E−02 | 0.1335E+00 |
| A6 | 0 | −0.6201E−04 | −0.1832E−01 | 0.8649E−02 |
| A8 | 0 | −0.5159E−03 | 0.9122E−02 | 0.2157E+00 |
| A10 | 0 | −0.1181E−03 | −0.6431E−02 | −0.1010E+00 |
| A12 | 0 | −0.6648E−04 | −0.7441E−02 | |
| A14 | 0 | 0.1212E−03 | 0 | |
| A16 | 0 | −0.39442E−04 | 0 | |

Coefficient of optical path difference function

| | Second surface |
|---|---|
| $\lambda B$ | 390 nm |
| B2 | −8.0000E−03 |
| B4 | −7.3601E−06 |

TABLE 3 f1 = 2.308, NA1 = 0.65, $\lambda 1$ = 405 nm, m1 = 0.00, n1 = 2, d0 = 13.5332, d2 = 10.0000, d4 = 1.059, d5 = 0.6
f2 = 2.385, NA2 = 0.63, $\lambda 2$ = 655 nm, m2 = −0.02, n2 = 1, d0 = 12.8785, d2 = 7.5500, d4 = 1.172, d5 = 0.6
f3 = 2.392, NA3 = 0.50, $\lambda 3$ = 785 nm, m3 = −0.09, n3 = 1, d0 = 6.1285, d2 = 14.3000, d4 = 0.936, d5 = 1.2

Paraxial value

| Surface No. | r (mm) | d (mm) | $N\lambda 1$ | $N\lambda 2$ | $N\lambda 3$ | vd |
|---|---|---|---|---|---|---|
| 0 | — | d0 | — | — | — | — |
| 1 | −60.0547 | 2.0000 | 1.5247 | 1.5065 | 1.5050 | 56.5 |
| 2 | −12.6988 | d2 | — | — | — | — |
| 3 | 1.4461 | 1.6000 | 1.5247 | 1.5065 | 1.5050 | 56.5 |
| 4 | −4.6094 | d4 | — | — | — | — |
| 5 | ∞ | d5 | 1.6195 | 1.5772 | 1.57050 | 30.0 |
| 6 | ∞ | — | — | — | — | — |

Aspheric surface coefficient

| | Second surface | Fifth surface | Sixth surface |
|---|---|---|---|
| κ | −1.1627E−01 | −0.6906E+00 | −0.1166E+02 |
| A4 | −8.5920E−06 | 0.6960E−02 | 0.3525E−01 |
| A6 | 0 | 0.1261E−02 | −0.1316E−01 |
| A8 | 0 | 0.6829E−03 | 0.3206E−02 |
| A10 | 0 | −0.1649E−03 | −0.3705E−03 |
| A12 | 0 | 0.5041E−04 | 0 |

TABLE 3-continued f1 = 2.308, NA1 = 0.65, λ1 = 405 nm, m1 = 0.00, n1 = 2, d0 = 13.5332,
d2 = 10.0000, d4 = 1.059, d5 = 0.6
f2 = 2.385, NA2 = 0.63, λ2 = 655 nm, m2 = −0.02, n2 = 1, d0 = 12.8785,
d2 = 7.5500, d4 = 1.172, d5 = 0.6
f3 = 2.392, NA3 = 0.50, λ3 = 785 nm, m3 = −0.09, n3 = 1, d0 = 6.1285,
d2 = 14.3000, d4 = 0.936, d5 = 1.2

| Coefficient of optical path difference function | |
|---|---|
| | Second surface |
| λB | 390 nm |
| B2 | −8.0000E−03 |
| B4 | −7.3601E−06 |

On the optical surface (Second surface in Table 2 and Table 3) of the collimator lens COL on the objective lens OBJ side, there is formed a diffractive structure wherein a depth of the step closest to the optical axis is 1.48 μm. When a laser light flux emitted from violet semiconductor laser LD1 enters the diffractive structure, $2^{nd}$ order diffracted light is generated to have the maximum diffraction efficiency, when a laser light flux emitted from first light-emitting point EP1 of laser module LM enters the diffractive structure, $1^{st}$ order diffracted light is generated to have the maximum diffraction efficiency, and when a laser light flux emitted from second light-emitting point EP2 of laser module LM enters the diffractive structure, $1^{st}$ order diffracted light is generated to have the maximum diffraction efficiency.

With regard to the diffraction efficiency at each diffraction order for each wavelength, it is 97.7% at second diffracted light for 405 nm, it is 93.4% at first diffracted light for 655 nm, and it is 99.2% at first diffracted light for 785 nm, and high diffraction efficiency can be secured for any wavelength.

Figure 16:
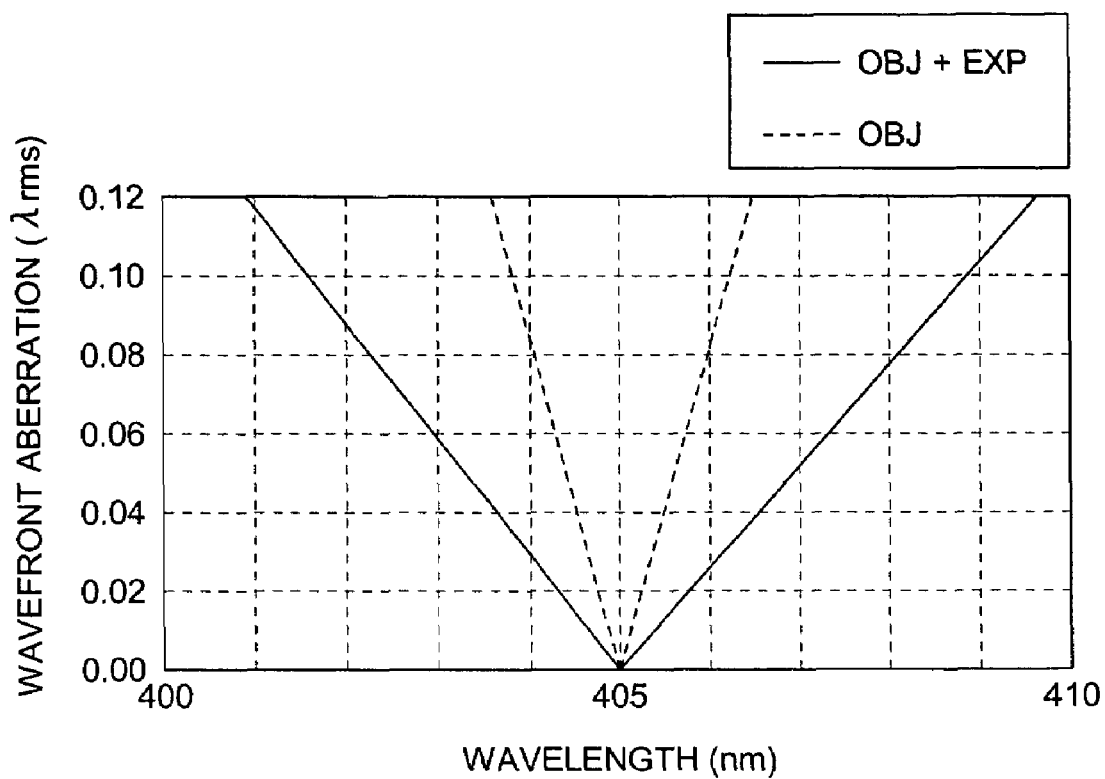
FIG. 16 is a graph showing chromatic aberration correcting effects of the first objective lens in a violet area.

Effects of chromatic aberration correction by this diffractive structure in the violet area for the first objective lens OBJ1 are shown in FIG. 16. In the figure, "OBJ+COL" shows characteristics of the optical system composed of the objective lens OBJ and collimator lens COL, and "OBJ" shows characteristics of the first objective lens OBJ1.

Figure 17:
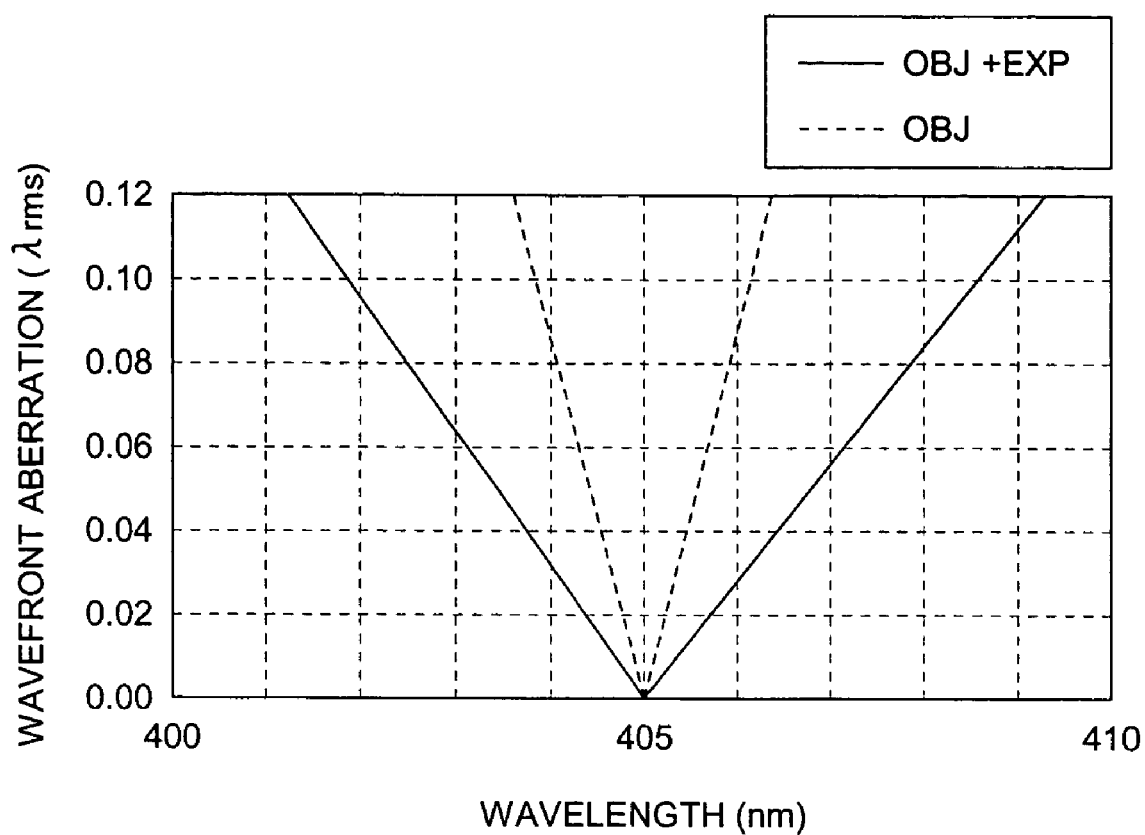
FIG. 17 is a graph showing chromatic aberration correcting effects of the second objective lens in a violet area.

Further, effects of chromatic aberration correction by this diffractive structure in the violet area for the second objective lens OBJ2 are shown in FIG. 17. In the figure, "OBJ+COL" shows characteristics of the optical system composed of the second objective lens OBJ2 and collimator lens COL, and "OBJ" shows characteristics of the second objective lens OBJ2.

When calculating wavefront aberration in FIG. 16 and FIG. 17, these objective lens OBJ1 and objective lens OBJ2 are fixed at the best image surface position at wavelength 405 nm. FIG. 16 and FIG. 17 imply that the optical system composed of an optical system having therein the first objective lens OBJ1 and collimator lens COL, the second objective lens OBJ2 and collimator lens COL has sufficient capacity for wavelength changes (approximately, +1 nm) caused by mode hopping of violet semiconductor laser LD1.

In this optical system, it is possible to correct spherical aberration caused by various factors, by changing and adjusting a distance between collimator lens COL and objective lenses OBJ1 and OBJ2 negative lens NL and positive lens PL in expander lens EXP, while conducting recording/reproducing of information for first high density optical disc HD1 and second high density optical disc HD2.

Figure 18:
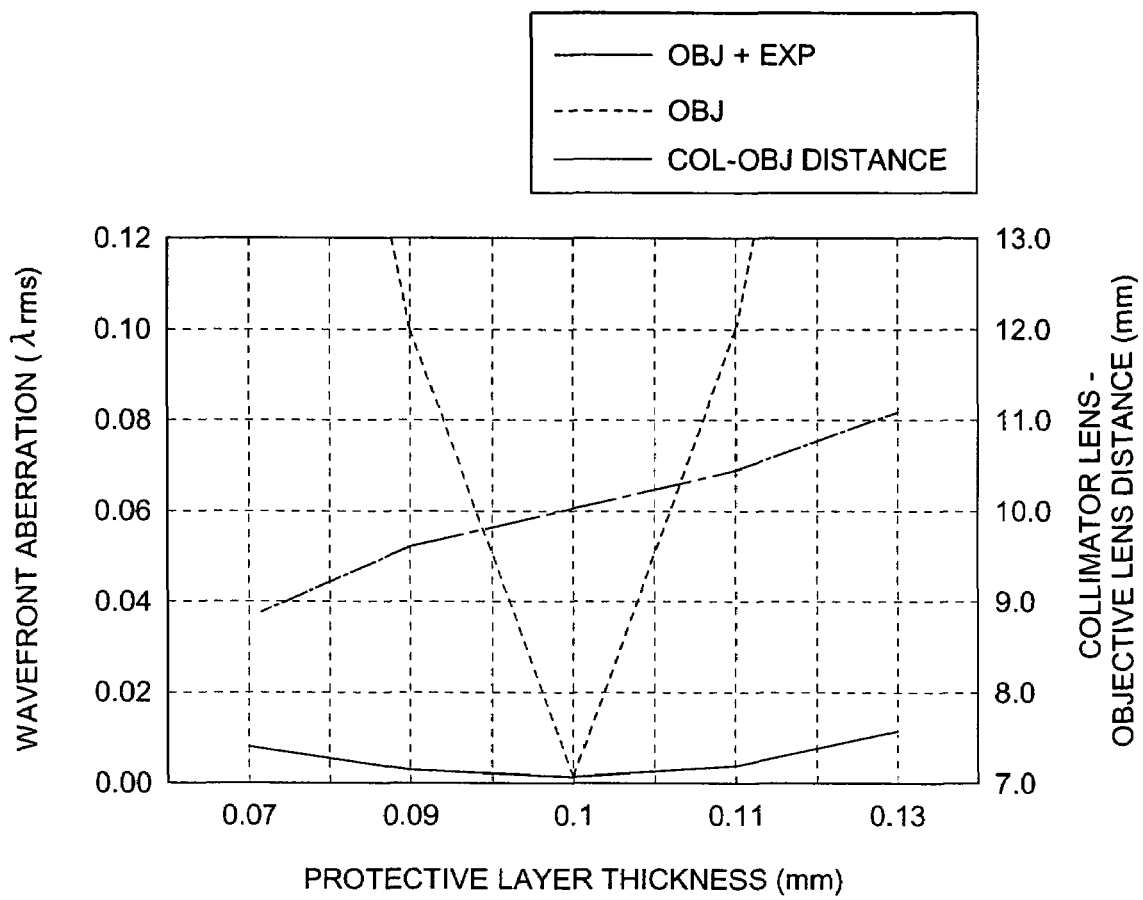
FIG. 18 is a graph showing results of correction of spherical aberration caused by changes in protective layer thickness of the first high density optical disc.

As an example, FIG. 18 shows results of correction for spherical aberration caused by thickness changes in a protective layer of the first high density optical disc HD1. In the figure, "OBJ+COL" shows characteristics of the optical system composed of the first objective lens OBJ1 and collimator lens CO, "OBJ" shows characteristics of the first objective lens OBJ1 and "COL−OBJ distance" shows the optimum distance between collimator lens COL and the first objective lens OBJ1. FIG. 18 implies that the optical system composed of the first objective lens OBJ1 and collimator lens COL can maintain excellent capacity even for the first high density optical disc HD1 having a plurality of information recording surfaces.

For DVD, recording/reproducing of information is conducted under the condition where a distance between collimator lens COL and second objective lens OBJ2 is made to be 7.55 mm (therefore, a distance between the first light-emitting point EP1 of laser module LM and collimator lens COL is made to be 12.8785 mm) so that a divergent light flux may enter the second objective lens OBJ2, and spherical aberration caused by wavelength dispersion of the second objective lens OBJ2 is corrected, in the optical system composed of the second objective lens OBJ2 and collimator lens COL.

Further, for CD, recording/reproducing of information is conducted under the condition where a distance between collimator lens COL and second objective lens OBJ2 is made to be 14.3 mm (therefore, a distance between the second light-emitting point EP2 of laser module LM and collimator lens COL is made to be 6.1285 mm) so that a divergent light flux may enter the second objective lens OBJ2, and spherical aberration caused by wavelength dispersion of the second objective lens OBJ2 and spherical aberration caused by a difference of protective layer thickness between the second high density optical disc HD2 and CD are corrected, in the optical system composed of the second objective lens OBJ2 and collimator lens COL.

Incidentally, the optical system composed of collimator lens COL and second objective lens OBJ2 in the Example 2 can also be used as collimator lens COL and objective lens OBJ in optical pickup device PU3.

Example 3

Example 3 is represented by an optical system suitable ad the first collimator lens COL1 and the first objective lens OBJ1, and it is composed of the first objective lens OBJ1 having interchangeablility for high density optical disc HD with standards of wavelength 405 nm, protective layer thickness 0.1 mm and numerical aperture 0.85 and for DVD with standards of wavelength 655 nm, protective layer thickness 0.6 mm and numerical aperature 0.65 and of the first collimator lens COL1 which is a plastic lens whose optical surface on the first objective lens OBJ1 side is made to be a differactive surface.

Figure 19:
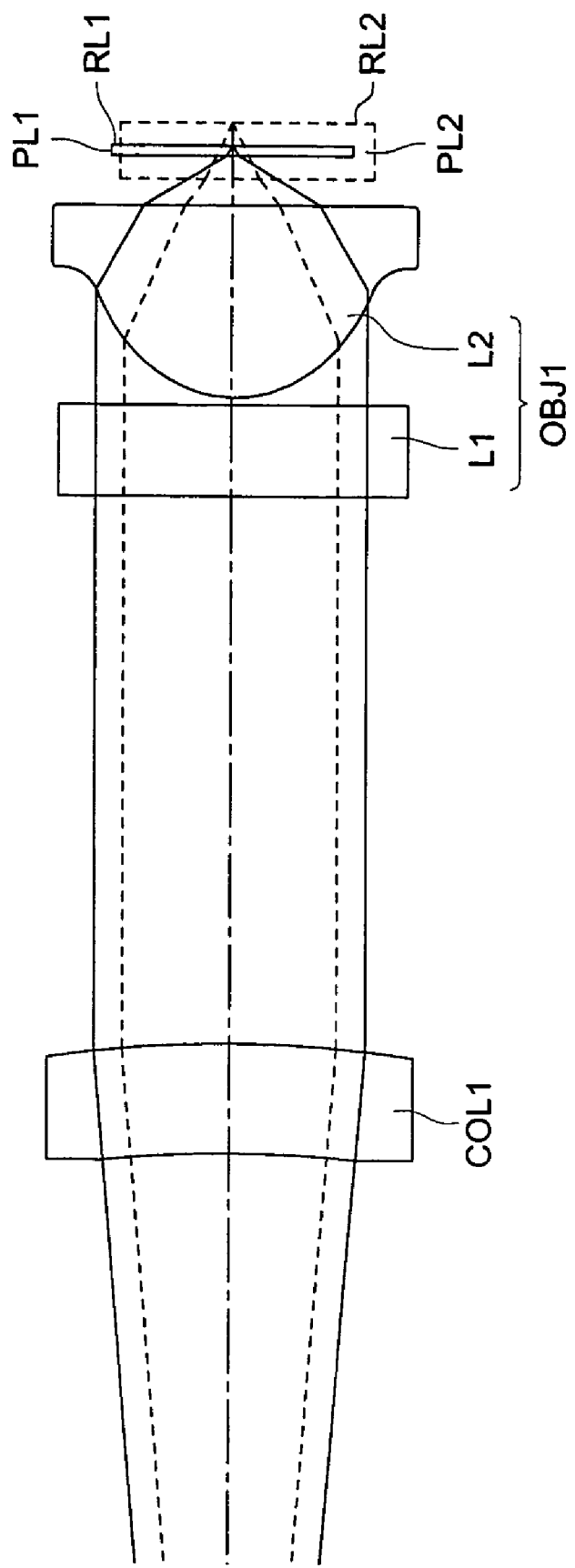
FIG. 19 is an optical path diagram for conducting recording/reproducing of information for a high density optical disc and DVD.

Table 4 shows specific lens data of this optical system, and FIG. 19 shows an optical path diagram.

TABLE 4 f1 = 1.765, NA1 = 0.85, λ1 = 405 nm, m1 = 0.00, n1 = 3, d0 = 19.034,
d6 = 0.531, d7 = 0.1
f2 = 1.830, NA2 = 0.65, λ2 = 655 nm, m2 = 0.00, n2 = 2, d0 = 24.445,
d6 = 0.300, d7 = 0.6

| Surface No. | r (mm) | d (mm) | Nλ1 | Nλ2 | vd |
|---|---|---|---|---|---|
| | | Paraxial value | | | |
| 0 | — | d0 | — | — | — |
| 1 | −43.9416 | 1.2000 | 1.5247 | 1.5065 | 56.5 |

TABLE 4-continued f1 = 1.765, NA1 = 0.85, λ1 = 405 nm, m1 = 0.00, n1 = 3, d0 = 19.034, d6 = 0.531, d7 = 0.1
f2 = 1.830, NA2 = 0.65, λ2 = 655 nm, m2 = 0.00, n2 = 2, d0 = 24.445, d6 = 0.300, d7 = 0.6

| 2 | −17.7938 | 15.0000 | — | — | — |
| 3 | ∞ | 1.0000 | 1.5247 | 1.5065 | 56.5 |
| 4 | ∞ | 0.1000 | — | — | — |
| 5 | 1.2369 | 2.1400 | 1.6032 | 1.6227 | 61.2 |
| 6 | −3.3104 | d6 | — | — | — |
| 7 | ∞ | d7 | 1.6195 | 1.5772 | 30.0 |
| 8 | ∞ | — | — | — | — |

Aspheric surface coefficient

| | First surface | Second surface | Fifth surface | Sixth surface |
|---|---|---|---|---|
| κ | 0 | −0.5556E+00 | −0.6547E+00 | −0.1110E+03 |
| A4 | 0.6263E−05 | 0 | 0.1559E−01 | 0.1720E+00 |
| A6 | 0 | 0 | −0.1050E−02 | −0.2917E+00 |
| A8 | 0 | 0 | 0.1087E−01 | 0.3735E+00 |
| A10 | 0 | 0 | −0.1015E−01 | −0.3574E+00 |
| A12 | 0 | 0 | 0.3038E−02 | 0.1940E+00 |
| A14 | 0 | 0 | 0.4027E−02 | 0 |
| A16 | 0 | 0 | −0.4404E−02 | 0 |
| A18 | 0 | 0 | 0.1731E−02 | 0 |
| A20 | 0 | 0 | −0.2543E−03 | 0 |

Coefficient of optical path difference function

| | Second surface | Third surface |
|---|---|---|
| λB | 423 nm | 655 nm |
| B2 | −5.5489E−03 | 7.0802E−03 |
| B4 | −4.2383E−06 | −2.2182E−03 |
| B6 | 0 | 2.8903E−04 |
| B8 | 0 | −6.0153E−04 |
| B10 | 0 | 8.3936E−05 |

In Table 4, f1 represents a focal length of first objective lens OBJ1, NA1 represents a numerical aperture of first objective lens OBJ1, λ1 represents a design wavelength of an optical system, m1 represents magnification of first objective lens OBJ1 and n1 represents a diffraction order of diffracted light having the maximum diffraction efficiency among diffracted light generated by the diffractive structure formed on first collimator lens COL1, in the case of using high density optical disc HD, and f2, NA2, λ2, m2 and n2 represent similar values in the case of using DVD. Incidentally, a diffraction order of diffracted light having the maximum diffraction efficiency among diffracted light generated by stepwise diffractive structure DOE that is formed on diffracting lens L1 (the third surface in the Table 4) is 0, when using high density optical disc HD (when using high density optical disc HD, a diffracted light becomes zero-order diffracted light that is not subjected to diffracting actions), and a diffraction order of diffracted light having the maximum diffraction efficiency among diffracted light generated by stepwise diffractive structure DOE that is formed on diffracting lens L1 (the third surface of Table 4) is 1, when using DVD.

Further, d0, d6 and d7 represent respectively a distance between a light-emitting point of the laser light source and first collimator lens COL1, a thickness of a protective layer and a working distance, in the case of using each optical disc. Further, r (mm) represents a radius of curvature, d (mm) represents a distance between surfaces, Nλ1 represents a refractive index in wavelength λ1, Nλ2 represents a refractive index in wavelength λ2, Nλ3 represents a refractive index in wavelength λ3, νd represents Abbe's number in d line and λB represents a manufacture wavelength of the diffractive structure. In FIG. 19, an optical path shown with solid lines is one for conducting recording/reproducing of information for high density optical disc HD, and an optical path shown with dotted lines is one for conducting recording/reproducing of information for DVD.

The first objective lens OBJ1 is composed of diffracting lens L1 representing a plastic lens on which stepwise diffractive structure DOE is formed and of light-converging lens L2 representing a glass lens with NA of 0.85 having aspheric surfaces on its both sides. In the first objective lens OBJ1, interchangeability for high density optical disc HD and for DVD is attained by correcting spherical aberration caused by a thickness difference between protective layer PL1 and protective layer PL2 with the stepwise diffractive structure DOE.

On the optical surface (Second surface in Table 4) of the first collimator lens COL1 on the first objective lens OBJ1 side, there is formed a diffractive structure, and a depth of the step thereof which is closest to the optical axis is 2.43 μm. When a laser light flux emitted from violet semiconductor laser LD1 enters this diffractive structure, third-order diffracted light is generated to have the maximum diffraction efficiency, while, when a laser light flux emitted from red semiconductor laser LD2 enters this diffractive structure, second-order diffracted light is generated to have the maximum diffraction efficiency.

Owing to this structure, diffraction efficiency at each diffraction order for each wavelength is 92.9% at $3^{rd}$ diffracted light for wavelength 405 nm, and it is 95.3% at $2^{nd}$ diffracted light for wavelength 655 nm, and high diffraction efficiency can be secured for any wavelength.

Figure 20:
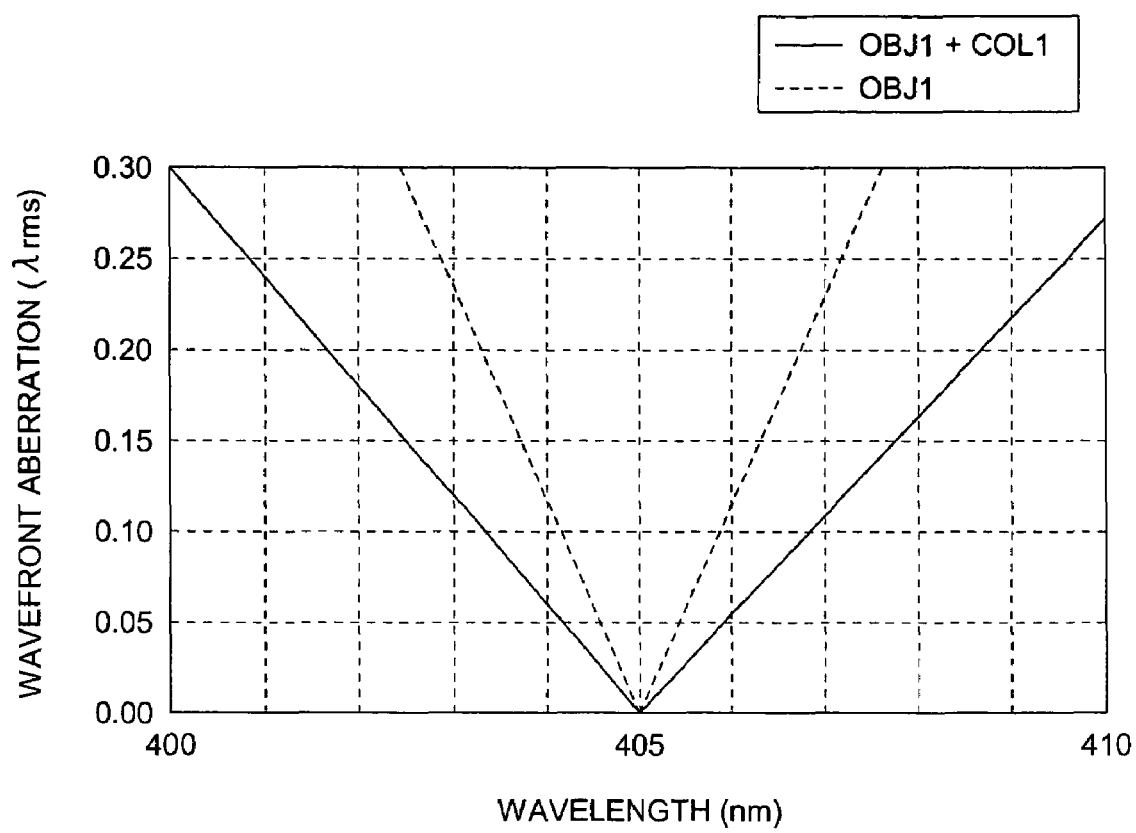
FIG. 20 is a graph showing chromatic aberration correcting effects of the first objective lens in a violet area.

FIG. 20 shows an effect of the diffractive structure for correction of chromatic aberration of the first objective lens OBJ1 in a violet area. In the figure, "OBJ1+COL1" shows characteristics of the optical system composed of the first objective lens OBJ1 and the first collimator lens COL1, and "OBJ1" shows characteristics of the first objective lens OBJ1. When calculating wavefront aberration, the first objective lens OBJ1 is fixed at the best image surface position at wavelength 405 nm. FIG. 20 implies that the optical system composed of the first objective lens OBJ1 and the first collimator lens COL1 has sufficient capacity for wavelength changes (approximately, +1 nm) caused by mode hopping of violet semiconductor laser LD1.

In this optical system, it is possible to correct spherical aberration caused by various factors, by changing and adjusting a distance between the first collimator lens COL1 and the first objective lens OBJ1, while conducting recording/reproducing of information for high density optical disc HD, in the same way as in Examples 1 and 2.

Figure 21:
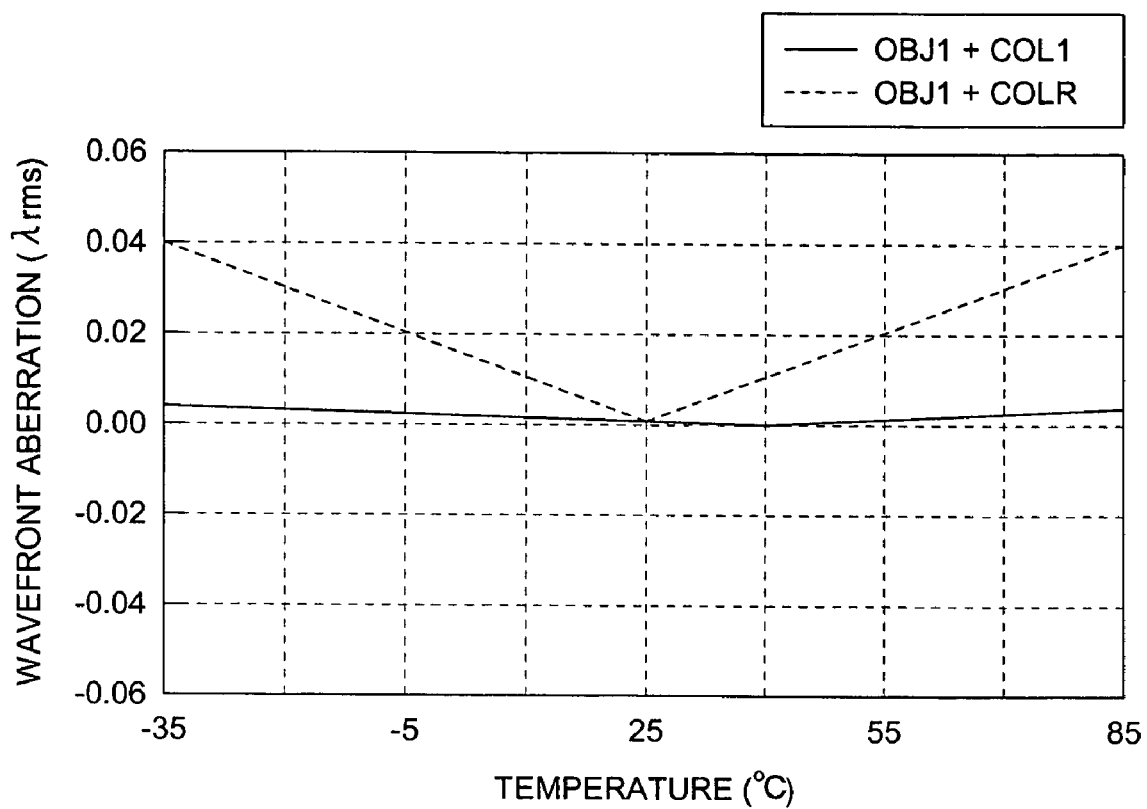
FIG. 21 is a graph showing temperature characteristics.

Further, in this optical system, a degree of divergence of a light flux coming from the first collimator lens COL1 caused by temperature changes is made to be zero substantially, by establishing paraxial power of the diffractive surface of the first collimator lens COL1 so that expressions (14) and (15) may be satisfied. FIG. 21 shows temperature characteristics of the optical system. In the figure, "OBJ1+COLR" shows temperature characteristics of the optical system composed of refracting lens COLR which is the same in terms of focal length as the first collimator lens COL1 and has no diffractive structure and of the first objective lens OBJ, and "OBJ1+COL1" shows temperature characteristics of the optical system composed of the first collimator lens COL1 wherein changes in the degree of divergence of the emitted light flux caused by temperature changes is compensated by the diffractive structure and the first objective lens OBJ1. Incidentally, when calculating the aforementioned temperature characteristics, a rate of change of refractive index caused by temperature changes of the refracting lens COLR, the first collimator lens COL1 and diffracting lens L1 is made to be $-11\times10^{-5}/°$ C., a coefficient of linear expansion is made to be $7.0\times10^{-5}$, and a rate of change of wavelength caused by temperature changes of violet semiconductor laser LD1 is made to be +0.05 nm/° C. FIG. 21 implies that excellent recording/reproducing characteristics for high density optical disc HD can be maintained because spherical aberration of the first objective lens OBJ1 is hardly changed in spite of temperature changes in the optical system composed of the first collimator lens COL1 and the first objective lens OBJ1.

Incidentally, values relating to the expressions (14) and (15) in this optical system are shown below.

NA1=0.85, m1=0, f1=1.765 (mm), $\lambda 1$=0.000405 mm, $f_C$=20 mm, $|\beta|$=0.018, n=1.524694, $\alpha$=7.0×10$^{-5}$, dn/dt=-11×10$^{-5}$/° C., dn/d$\lambda$=-153/mm, d$\lambda$/dt=0.000005 mm/° C., $P_D$=0.0333 mm$^{-1}$, $P_C$=0.05 mm$^{-1}$, c1=-2.94×10$^{-4}$, c2=-1.65×10$^{-5}$, expression (14)=0.0219·$\lambda 1$ ($\lambda 1$=0.000405 nm), expression (15)=0.0135·$\lambda 1$ ($\lambda 1$=0.000405 nm).

Example 4

Example 4 is represented by an optical system suitable as the optical element for correcting chromatic aberration HOE and as objective lens OBJ, and it is composed of objective lens OBJ having interchangeability for high density optical disc HD in the standard of wavelength 405 nm, a protective layer thickness 0.1 mm and numerical aperture 0.85 and for DVD in the standard of wavelength 655 nm, a protective layer thickness 0.6 mm and numerical aperture 0.65 and of the optical element for correcting chromatic aberration HOE.

Figure 22:
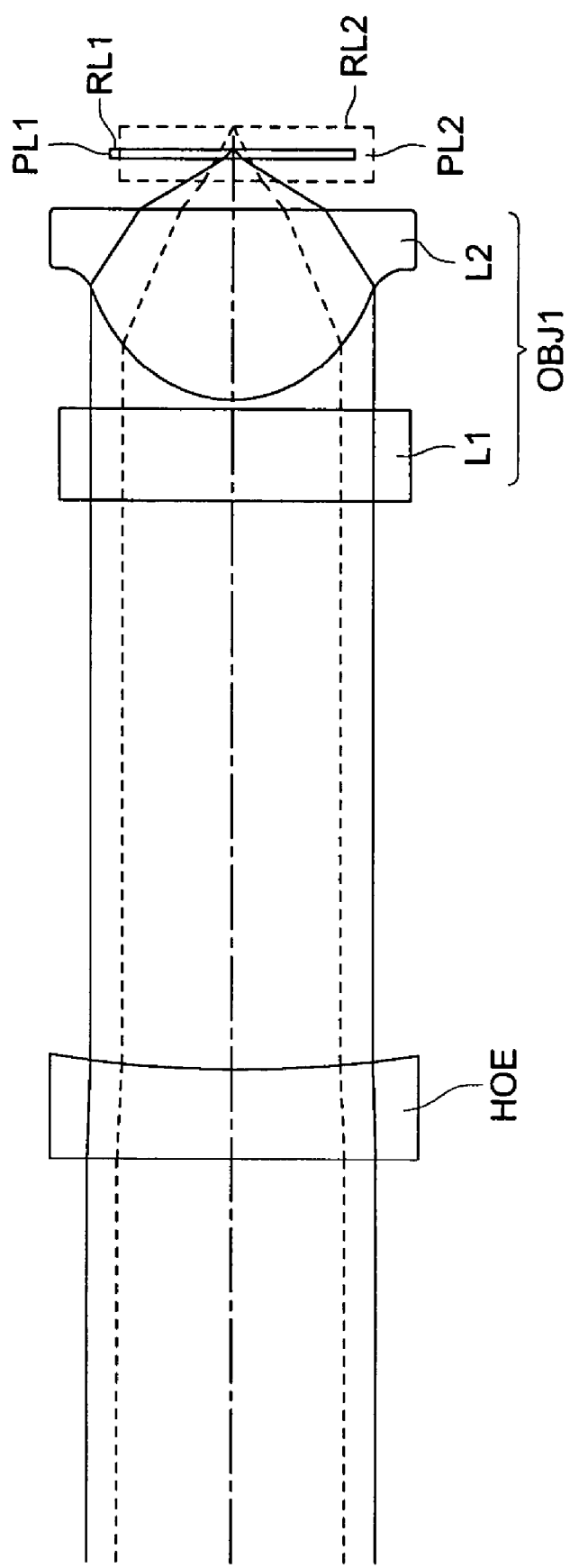
FIG. 22 is an optical path diagram for conducting recording/reproducing of information for a high density optical disc and DVD.

Table 5 shows specific lens data of this optical system, and FIG. 22 shows an optical path diagram.

TABLE 5 f1 = 1.765, NA1 = 0.85, $\lambda$1 = 405 nm, m1 = 0.00,
n1 = 5, d6 = 0.531, d7 = 0.1
f2 = 1.830, NA2 = 0.65, $\lambda$2 = 655 nm, m2 = 0.00, n2 = 3,
d6 = 0.300, d7 = 0.6

Paraxial value

| Surface No. | r (mm) | d (mm) | N$\lambda$1 | N$\lambda$2 | vd |
|---|---|---|---|---|---|
| 0 | — | ∞ | — | — | — |
| 1 | ∞ | 1.2000 | 1.5247 | 1.5065 | 56.5 |
| 2 | 16.5145 | 5.0000 | — | — | — |
| 3 | ∞ | 1.0000 | 1.5247 | 1.5065 | 56.5 |
| 4 | ∞ | 0.1000 | — | — | — |
| 5 | 1.2369 | 2.1400 | 1.6032 | 1.6227 | 61.2 |
| 6 | -3.3104 | d6 | — | — | — |
| 7 | ∞ | d7 | 1.6195 | 1.5772 | 30.0 |
| 8 | ∞ | — | — | — | — |

Aspheric surface coefficient

| | Second surface | Fifth surface | Sixth surface |
|---|---|---|---|
| κ | 0.2301E+02 | -0.6547E+00 | -0.1110E+03 |
| A4 | 0.1988E-02 | 0.1559E-01 | 0.1720E+00 |
| A6 | 0 | -0.1050E-02 | -0.2917E+00 |
| A8 | 0 | 0.1087E-01 | 0.3735E+00 |
| A10 | 0 | -0.1015E-01 | -0.3574E+00 |
| A12 | 0 | 0.3038E-02 | 0.1940E+00 |
| A14 | 0 | 0.4027E-02 | 0 |
| A16 | 0 | -0.4404E-02 | 0 |
| A18 | 0 | 0.1731E-02 | 0 |
| A20 | 0 | -0.2543E-03 | 0 |

TABLE 5-continued f1 = 1.765, NA1 = 0.85, $\lambda$1 = 405 nm, m1 = 0.00,
n1 = 5, d6 = 0.531, d7 = 0.1
f2 = 1.830, NA2 = 0.65, $\lambda$2 = 655 nm, m2 = 0.00, n2 = 3,
d6 = 0.300, d7 = 0.6

Coefficient of optical path difference function

| | First surface | Third surface |
|---|---|---|
| $\lambda$B | 405 nm | 655 nm |
| B2 | -3.1000E-03 | 7.0802E-03 |
| B4 | -2.5009E-04 | -2.2182E-03 |
| B6 | 0 | 2.8903E-04 |
| B8 | 0 | -6.0153E-04 |
| B10 | 0 | 8.3936E-05 |

In Table 5, f1, NA1, $\lambda$1, m1 and n1 represent respectively a focal length of second objective lens OBJ2, a numerical aperture of second objective lens OBJ2, a design wavelength of an optical system, magnification of second objective lens OBJ2 and a diffraction order of diffracted light having the maximum diffraction efficiency among diffracted light generated by the diffractive structure formed on collimator lens COL, in the case of using high density optical disc HD, and f2, NA2, $\lambda$2, m2 and n2 represent similar values in the case of using DVD. Incidentally, a diffraction order of diffracted light having the maximum diffraction efficiency among diffracted light generated by stepwise diffractive structure DOE that is formed on diffracting lens L1 (the third surface in Table 5) is 0, when using high density optical disc HD (when using high density optical disc HD, a diffracted light becomes zero-order diffracted light that is not subjected to diffracting actions), and a diffraction order of diffracted light having the maximum diffraction efficiency among diffracted light generated by stepwise diffractive structure DOE that is formed on diffracting lens L1 (the third surface in Table 5) is 1, when using DVD.

Further, d6 and d7 represent respectively a protective layer thickness and a working distance in the case of using each optical disc. Further, r (mm) represents a radius of curvature, d (mm) represents a distance between surfaces, N$\lambda$1 represents a refractive index in wavelength $\lambda$1, N$\lambda$2 represents a refractive index in wavelength $\lambda$2, N$\lambda$3 represents a refractive index in wavelength $\lambda$3, vd represents Abbe's number in d line and $\lambda$B represents a manufacture wavelength of the diffractive structure. In FIG. 22, an optical path shown with solid lines is one for conducting recording/reproducing of information for high density optical disc HD, and an optical path shown with dotted lines is one for conducting recording/reproducing of information for DVD.

The objective lens OBJ is composed of diffracting lens L1 representing a plastic lens on which stepwise diffractive structure DOE is formed and of light-converging lens L2 representing a glass lens with NA of 0.85 having aspheric surfaces on its both sides. In the objective lens OBJ, interchangeability for high density optical disc HD and for DVD is attained by correcting spherical aberration caused by a thickness difference between protective layer PL1 and protective layer PL2 with the stepwise diffractive structure DOE.

The optical surface (First surface in Table 5) of the optical element for correcting chromatic aberration HOE on the laser light source side is a diffractive surface where a diffractive structure is formed on an optical surface in a form of a plane, and a depth of the step thereof which is closest to the optical axis is 3.86 μm. When a laser light flux emitted from violet semiconductor laser LD1 enters this diffractive structure, fifth-order diffracted light is generated to have the maximum diffraction efficiency, while, when a laser light flux emitted from red semiconductor laser LD2 enters this diffractive structure, third-order diffracted light is generated to have the maximum diffraction efficiency.

Owing to this structure, diffraction efficiency at each diffraction order for each wavelength is 100% at $5^{th}$ diffracted light for wavelength 405 nm, and it is 99.9% at $3^{rd}$ diffracted light for wavelength 655 nm, and high diffraction efficiency can be secured for any wavelength.

Further, diffraction order n1 of beam for recording/reproducing for high density optical disc HD and diffraction order n2 of beam for recording/reproducing for DVD are selected so that ratio $\delta\phi_D$ of an optical path length added to $\lambda1$ by diffractive structure defined by $\delta\phi_D=(n1\cdot\lambda1/(N\lambda_1-1))/(n2\cdot\lambda2/(N\lambda_2-1))$ to an optical path length added to $\lambda2$ may be the value close to 1. Therefore, an angle of diffraction for $\lambda1$ and that for $\lambda2$ are substantially the same each other. Due to this, it is easy to arrange the optical element for correcting chromatic aberration HOE in the optical path wherein $\lambda1$ and $\lambda2$ represent a parallel light flux.

Incidentally, when using a material wherein the refractive index in the violet area is within a range of 1.5-1.6 and Abbe's number for d line (587.6 nm) is within a range of 50-60, (10, 5) may also be used in addition to (5, 3) used in the present example, as a combination (n1, n2) of diffraction orders n1 and n2 which make $\delta\phi_D$ to be the value close to 1 for $\lambda1$ and $\lambda2$.

Further, the optical surface (Second surface in Table 5) of the optical element for correcting chromatic aberration HOE on the objective lens OBJ side is an aspheric surface on which paraxial power is negative, and an absolute value of the paraxial power is the same as that of paraxial power of the diffractive surface. Therefore, the light flux with wavelength $\lambda1$ that enters in a form of a parallel light flux emerges in a form of a parallel light flux.

Figure 23:
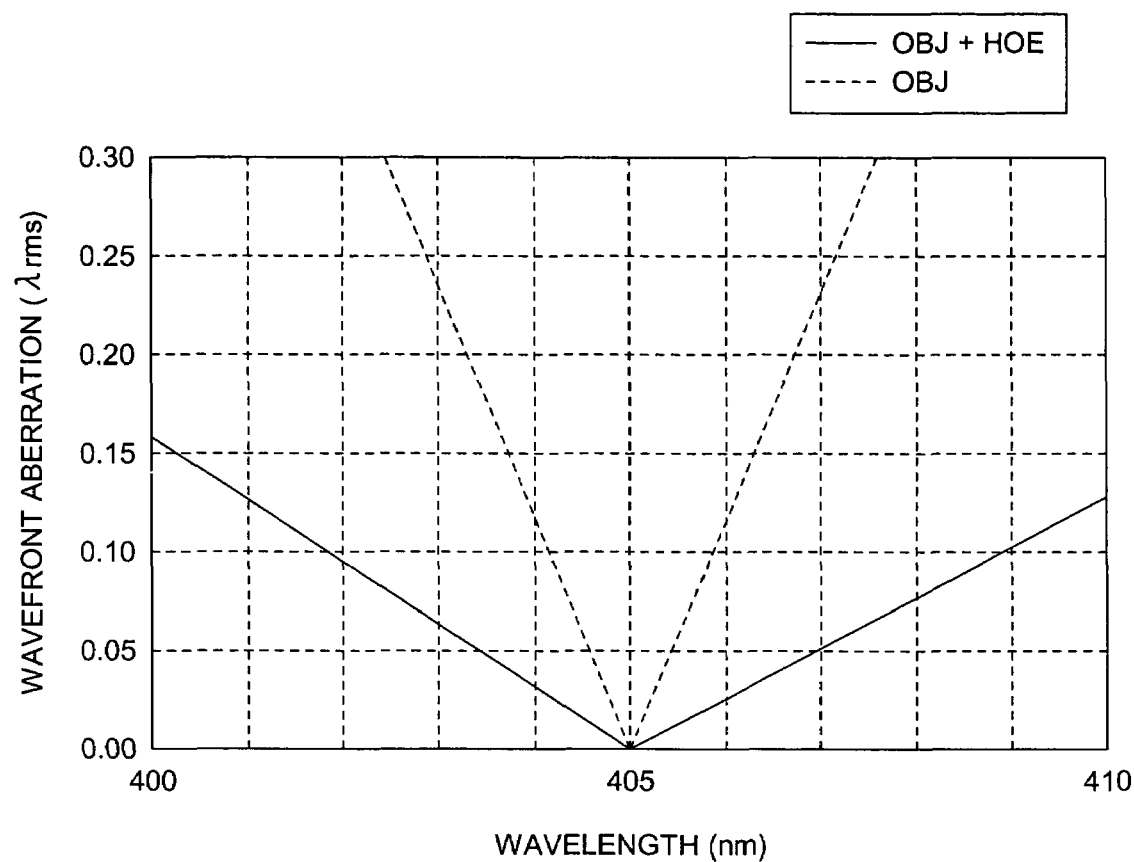
FIG. 23 is a graph showing chromatic aberration correcting effects of the objective lens in a violet area.

FIG. 23 shows an effect of the diffractive structure for correction of chromatic aberration of objective lens OBJ in a violet area. In the figure, "OBJ+COL" shows characteristics of the optical system composed of the objective lens OBJ and the optical element for correcting chromatic aberration HOE, and "OBJ" shows characteristics of the objective lens OBJ. When calculating wavefront aberration, the objective lens OBJ is fixed at the best image surface position at wavelength 405 nm. FIG. 23 implies that the optical system composed of the objective lens OBJ and the optical element for correcting chromatic aberration HOE has sufficient capacity for wavelength changes (approximately, +1 nm) caused by mode hopping of violet semiconductor laser LD1.

Example 5

Example 5 is represented by an optical system suitable as collimator lens COL and objective lens OBJ in optical pickup device PU6, and it is composed of objective lens OBJ having interchangeability for high density optical disc HD in the standard of wavelength 405 nm, a protective layer thickness 0.0875 mm and numerical aperture 0.85, for DVD in the standard of wavelength 658 nm, protective layer thickness 0.6 mm and numerical aperture 0.6 and for CD in the standard of wavelength 785 nm, protective layer thickness 1.2 mm and numerical aperture 0.45 and of collimator lens COL representing a plastic lens whose optical surface on the objective lens OBJ side is made to be a diffractive surface.

Table 6 shows specific lens data of this optical system, and each of FIGS. C and D shows an optical path diagram.

TABLE 6 f1 = 2.000, NA1 = 0.85, λ1 = 408 nm, m1 = 0.00, n1 = 5, d0 = 18.736, d2 = 20.000, d6 = 0.664, d7 = 0.1
f2 = 2.072, NA2 = 0.60, λ2 = 658 nm, m2 = 0.00, n2 = 3, d0 = 19.414, d2 = 19.322, d6 = 0.431, d7 = 0.6
f3 = 2.069, NA3 = 0.45, λ3 = 785 nm, m3 = −0.149, d6 = 0.333, d7 = 1.2

Paraxial value of HD and DVD

| Surface No. | r (mm) | d (mm) | nλ1 | nλ2 | νd | Remarks |
|---|---|---|---|---|---|---|
| 0 | — | d0 | — | — | — | Light-emitting point |
| 1 | −16.2867 | 1.2000 | 1.5247 | 1.5065 | 56.5 | Collimator lens |
| 2 | −20.8387 | d2 | — | — | — | |
| 3 | ∞ | 1.0000 | 1.5242 | 1.5064 | 56.5 | Objective lens |
| 4 | ∞ | 0.1000 | — | — | — | |
| 5 | 1.3156 | 2.3500 | 1.5596 | 1.5406 | 56.3 | |
| 6 | −2.6935 | d6 | — | — | — | |
| 7 | ∞ | d7 | 1.6211 | 1.5798 | 30.0 | Protective layer |
| 8 | ∞ | — | — | — | — | |

Paraxial value of CD

| Surface No. | r (mm) | d (mm) | nλ3 | νd | Remarks |
|---|---|---|---|---|---|
| 0 | — | 14.550 | — | — | Light-emitting point |
| 3 | ∞ | 1.0000 | 1.5050 | 56.5 | Objective lens |
| 4 | ∞ | 0.1000 | — | — | |
| 5 | 1.3156 | 2.3500 | 1.5378 | 56.3 | |
| 6 | −2.6935 | d6 | — | — | |
| 7 | ∞ | d7 | 1.5733 | 30.0 | Protective layer |
| 8 | ∞ | — | — | — | |

Aspheric surface coefficient

| | First surface | Second surface | Fifth surface | Sixth surface |
|---|---|---|---|---|
| κ | −0.1000E+02 | 0.1170E+02 | −0.6677E+00 | −0.4265E+02 |
| A4 | −0.2574E−03 | 0 | 0.10942E−01 | 0.1292E+00 |
| A6 | 0 | 0 | 0.1198E−02 | −0.1725E+00 |
| A8 | 0 | 0 | 0.3188E−02 | 0.1609E+00 |
| A10 | 0 | 0 | −0.2625E−02 | −0.9634E−01 |
| A12 | 0 | 0 | 0.8605E−03 | 0.3157E−01 |
| A14 | 0 | 0 | 0.6914E−03 | −0.4291E−02 |
| A16 | 0 | 0 | −0.7048E−03 | 0 |
| A18 | 0 | 0 | 0.2356E−03 | 0 |
| A20 | 0 | 0 | −0.2819E−04 | 0 |

Coefficient of optical path difference function

| | Second surface | Third surface |
|---|---|---|
| λ | 408 nm | 658 nm |
| B2 | 0.5500E−02 | 5.000E−03 |
| B4 | −0.1596E−04 | −1.4363E−03 |
| B6 | 0 | 3.5683E−05 |
| B8 | 0 | −1.9658E−04 |
| B10 | 0 | 2.3577E−05 |

In Table 6, f1, NA1, λ1, m1 and n1 represent respectively a focal length of objective lens OBJ, a numerical aperture of objective lens OBJ, a design wavelength of an optical system, magnification of objective lens OBJ and a diffraction order of diffracted light having the maximum diffraction efficiency among diffracted light generated by the diffractive structure formed on collimator lens COL, in the case of using high density optical disc HD, and f2, NA2, λ2, m2 and n2 represent similar values in the case of using DVD. Further, d0, d2, d6 and d7 represent respectively a distance between a light-emitting point of a laser light source and collimator lens COL, a distance between collimator lens COL and objective lens OBJ, a protective layer thickness and a working distance in the case of using an optical disc. Further, r (mm) represents a radius of curvature, d (mm) represents a distance between surfaces, $N\lambda 1$ represents a refractive index in wavelength $\lambda 1$, $N\lambda 2$ represents a refractive index in wavelength $\lambda 2$, $N\lambda 3$ represents a refractive index in wavelength $\lambda 3$, vd represents Abbe's number in d line and $\lambda B$ represents a manufacture wavelength of the diffractive structure.

Figure 26:
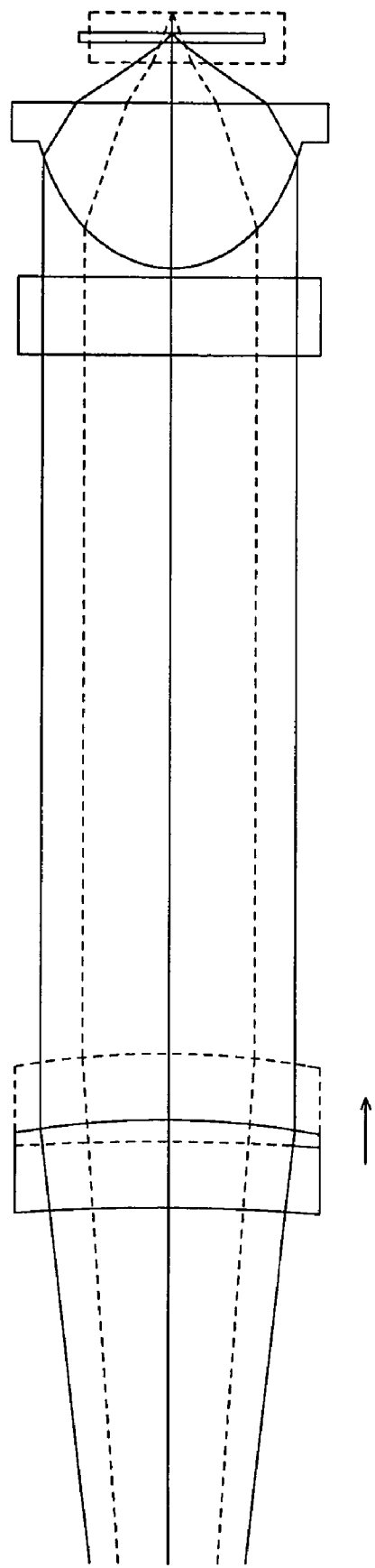
FIG. 26 is an optical path diagram for conducting recording/reproducing of information for a high density optical disc and DVD.
Figure 27:
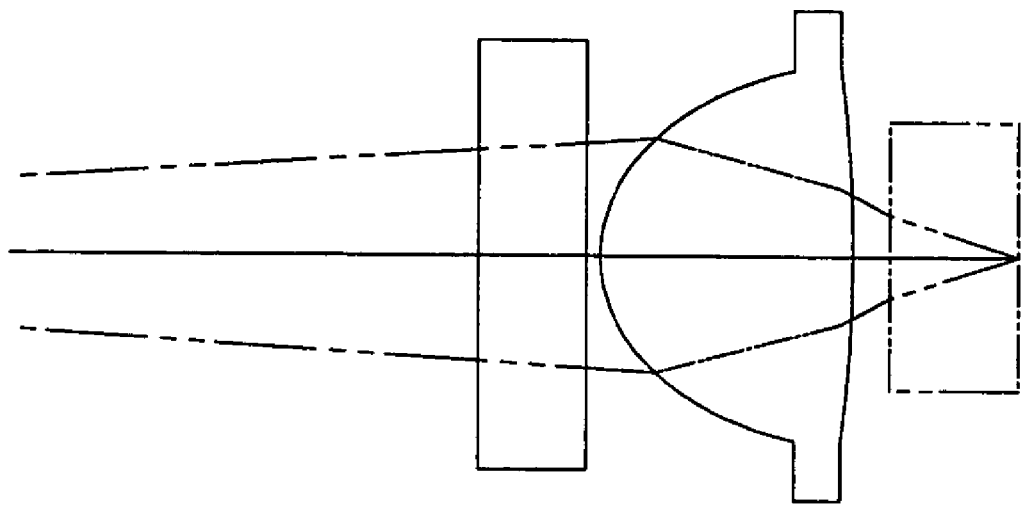
FIG. 27 is an optical path diagram for conducting recording/reproducing of information for CD.

Further, in FIG. 26, an optical path shown with solid lines is one for conducting recording/reproducing of information for high density optical disc HD and an optical path shown with dotted lines is one for conducting recording/reproducing of information for DVD, and in FIG. 27, an optical path shown with two-dot chain lines is one for conducting recording/reproducing of information for CD.

Objective lens OBJ is composed of diffracting lens L1 representing a plastic lens on which stepwise diffractive structure DOE is formed and of light-converging lens L2 representing a plastic lens having, on its both sides, aspheric surfaces and numerical aperture NA of 0.85, wherein interchangeability for high density optical disc HD and for DVD is attained by correcting spherical aberration caused by a thickness difference between protective layer PL1 and protective layer PL2 with actions of the stepwise diffractive structure DOE.

Furthermore, a diffraction order of diffracted light having the maximum diffraction efficiency among diffracted light generated by stepwise diffractive structure DOE (the third surface in the Table 6) that is formed on diffracting lens L1 is 0, when using high density optical disc HD (when using high density optical disc HD, a diffracted light becomes zero-order diffracted light that is not subjected to diffracting actions), a diffraction order of diffracted light having the maximum diffraction efficiency among diffracted light generated by stepwise diffractive structure DOE that is formed on diffracting lens L1 is 1, when using DVD and a diffraction order of diffracted light having the maximum diffraction efficiency among diffracted light generated by stepwise diffractive structure DOE that is formed on diffracting lens L1, is 0, when using CD (when using CD, a diffracted light becomes zero-order diffracted light that is not subjected to diffracting actions).

On the optical surface (Second surface in Table 6) of collimator lens COL on the objective lens OBJ side, there is formed a diffractive structure wherein a depth of the step closest to the optical axis is 3.89 μm. When the first laser light flux emitted from the first light-emitting point EP1 enters the diffractive structure, $5^{th}$ order diffracted light is generated to have the maximum diffraction efficiency, and when the second laser light flux emitted from the second light-emitting point EP2 enters the diffractive structure, $3^{rd}$ order diffracted light is generated to have the maximum diffraction efficiency. Owing to this structure, diffraction efficiency at each diffraction order for each wavelength is 100% at $3^{rd}$ diffracted light for wavelength 408 nm and it is 100% at secondary diffracted light for wavelength 658 nm, thus, high diffraction efficiency can be secured for any wavelength.

Figure 28:
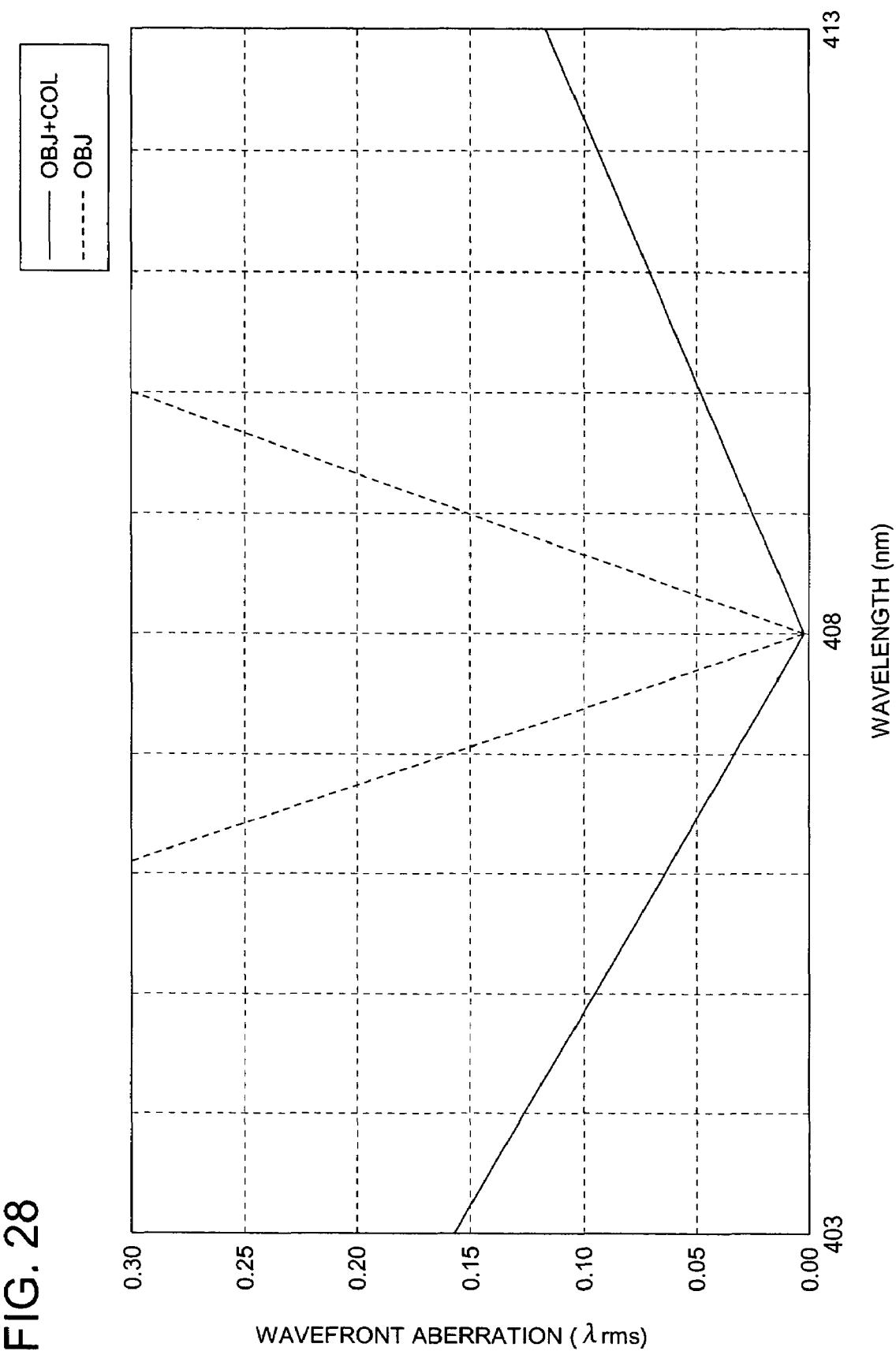
FIG. 28 is a graph showing chromatic aberration correcting effects of the objective lens in a violet area.

FIG. 28 shows an effect by the diffractive structure for correction of chromatic aberration of objective lens OBJ in a violet area. In the figure, "OBJ+COL" shows characteristics of the optical system composed of the objective lens OBJ and collimator lens COL, and "OBJ" shows characteristics of the objective lens OBJ. When calculating wavefront aberration, the objective lens OBJ is fixed at the best image surface position at wavelength 408 nm. FIG. 28 implies that the optical system composed of the objective lens OBJ and collimator lens COL has sufficient capacity for wavelength changes (approximately, +1 nm) caused by mode hopping of violet semiconductor laser LD1.

In this optical system, it is possible to correct spherical aberration caused by various factors, by changing and adjusting a distance between collimator lens COL and objective lens OBJ in the course of conducting recording/reproducing of information for high density optical disc HD, in the same way as optical systems in Example 1-Example 4.

Incidentally, in this optical system employing laser module LM wherein the first light-emitting point EP1 and the second light-emitting point EP2 are arranged to be close each other, when the second light flux enters collimator lens COL, the second light flux emitted from the collimator lens COL is prevented, by an influence of chromatic aberration, from becoming a perfect parallel light flux, thus, spherical aberration is caused on the objective lens OBJ. Therefore, in this optical system, when conducting recording/reproducing of information for DVD, collimator lens COL is moved by a distance of 0.687 mm that corresponds to chromatic aberration to be closer to objective lens OBJ so that the second light flux emitted from the collimator lens COL may become a parallel light flux, before conducting recording/reproducing of information for DVD.

Effects of the Invention

The invention makes it possible to obtain an optical pickup device, an optical information recording and reproducing apparatus, an expander lens, a coupling lens and a chromatic aberration correcting optical element which can conduct recording/reproducing of information properly while maintaining interchangeability for a plurality of optical discs such as high density optical disc, DVD and CD each requiring a different wavelength of laser light source, and are suitable for downsizing, weight reduction and cost reduction.

What is claimed is:

1. An optical pickup apparatus comprising:
a first light source for emitting a first light flux with a first wavelength $\lambda 1$ of 450 nm or less;
a second light source for emitting a second light flux with a second wavelength $\lambda 2$ which is in the range of 600 nm-700 nm;
a third light source for emitting a third wavelength $\lambda 3$ which is in the range of 730 nm-830 nm;
an objective lens unit to converge the first light flux emitted by the first light source onto a first information recording surface of a first optical disk, to converge the second light flux emitted by the second light source onto a second information recording surface of a second optical disk with a different recording density from that of the first optical disk, and to converge the third light flux emitted by the third light source onto a third information recording surface of a third optical disk with a different recording density from those of the first and the second optical disks;
a spherical aberration correcting optical unit which is arranged between both of the first light source and the second light source and the objective lens unit and is arranged in a common optical path of the first light flux and the second light flux; and
a chromatic aberration correcting optical element which is arranged in the common optical path of the first light flux, the second light flux and the third light flux and includes a diffractive surface on at least one optical surface of the chromatic aberration correcting optical element such that a diffractive structure which is constructed by a plurality of ring-shaped zones separated by fine steps is formed on the diffractive surface, wherein the depth of steps along an optical axis is designed so that n2, which is a diffraction order of a diffracted ray having a largest diffraction efficiency among diffracted rays caused when the second light flux enters into the diffractive structure, is a lower order than n1, which is a diffraction order of a diffracted ray having a largest diffraction efficiency among diffracted light rays caused when the first light flux enters into the diffractive structure, and wherein the chromatic aberration correcting optical element satisfies one of the following combinations:

(n1, n2, n3,)=(2, 1, 1), (4, 2, 2), (6, 4, 3), (8, 5, 4), (10, 6, 5)

where n1, n2, and n3 are diffraction orders of diffracted rays with the largest diffraction efficiencies in the diffracted rays when the first, second and third light fluxes enter into the chromatic aberration correcting optical element, respectively.

2. The optical pickup apparatus of claim 1, wherein the spherical aberration correcting optical unit changes a slope angle of a marginal ray in an incident light flux to the objective lens unit by variably adjusting an interval between at least one lens group among lens groups composing the spherical aberration correcting optical unit and the objective lens unit.

3. The optical pickup apparatus of claim 1, wherein the chromatic aberration correcting optical element is arranged between both of the first light source and the second light source and the objective lens unit.

4. The optical pickup apparatus of claim 3, wherein the spherical aberration correcting optical unit comprises the chromatic aberration correcting optical element.

5. The optical pickup apparatus of claim 1, wherein the objective lens unit comprises the chromatic aberration correcting optical element.

6. The optical pickup apparatus of claim 1, wherein the optical pickup apparatus further comprises at least a coupling lens for converting a divergence angle of a light flux emitted by the first light source and introducing the converted light flux into the objective lens unit, and the spherical aberration correcting optical unit comprises the coupling lens and an expander lens including a positive lens group and a negative lens group and arranged in an optical path between the coupling lens and the objective lens unit.

7. The optical pickup apparatus of claim 1, wherein the spherical aberration correcting optical unit is a coupling lens for converting a divergence angle of a light flux emitted by the first light source and the second light source and introducing the converted light flux into the objective lens unit.

8. The optical pickup apparatus of claim 1, wherein the spherical aberration correcting optical unit includes a structure in which electrodes and a liquid crystal molecule layer are laminated alternately so that a refractive index distribution of the liquid crystal molecule layer is changed by applying a pre-defined voltage to the electrodes.

9. The optical pickup apparatus of claim 8, wherein the objective lens unit is united with the spherical aberration correcting optical unit into one body that performs a tracking operation.

10. The optical pickup apparatus of claim 1, wherein the spherical aberration correcting optical unit corrects a spherical aberration caused in the objective lens unit due to a wavelength difference between the first wavelength $\lambda 1$ and the second wavelength $\lambda 2$.

11. The optical pickup apparatus of claim 1, wherein the spherical aberration correcting optical unit corrects a spherical aberration caused by a variation of the first wavelength $\lambda 1$ when the first wavelength $\lambda 1$ varies in the range of ±10 nm.

12. The optical pickup apparatus of claim 1, wherein a recording density of the first optical disk is larger than that of the second optical disk, the first optical disk includes a first protective layer on a first information recording surface thereof, and the spherical aberration correcting optical unit corrects a spherical aberration caused by a thickness error of the first protective layer.

13. The optical pickup apparatus of claim 1, wherein:

a recording density of the first optical disk is larger than that of the second optical disk, the first optical disk includes a multi-layer structure in which optically transparent layers and information recording surfaces are alternately laminated in this order from the light source side, and the spherical aberration correcting optical unit corrects a spherical aberration which is caused when the objective lens unit makes a focus jump from an i-th information recording surface to a j-th information recording surface, where i is an arbitrary integer satisfying $1 \leq i \leq n$, j is an arbitrary integer satisfying $1 \leq j \leq n$, j is different from i, and respective information recording surfaces in the multi-layer structure are arranged from a first information recording surface, to a second information recording surface, to an n-th information recording surface in this order from an information recording surface nearest to the light sources.

14. The optical pickup apparatus of claim 1, wherein a recording density of the first optical disk is larger than that of the second optical disk, the first optical disk includes a first protective layer with a thickness of t1 on a first information recording surface, the second optical disk includes a second protective layer with a thickness of t2 (t1>t2) on a second information recording surface, the spherical aberration correcting optical unit corrects a spherical aberration caused by a thickness difference between a thickness of the first layer and that of the second layer.

15. The optical pickup apparatus of claim 1, wherein the objective lens unit includes at least one plastic lens, the spherical aberration correcting optical unit corrects a refractive index variation resulting from an environmental temperature variation in the plastic lens included in the objective lens unit and/or a spherical aberration resulting from a refractive index distribution caused by a temperature distribution in the plastic lens.

16. The optical pickup apparatus of claim 1, wherein:

a recording density of the first optical disk is larger than that of the second optical disk, the first optical disk includes a first protective layer on a first information recording surface thereof, a first magnification and a second magnification are different from each other, and where the first magnification is a magnification of the objective lens unit when information recording and/or reproducing is conducted on the first optical disk, and the second magnification is a magnification of the objective lens unit when information recording and/or reproducing is conducted on the second optical disk, and the spherical aberration correcting optical unit changes an objective point position of the objective lens unit corresponding to a difference of the first magnification and the second magnification.

17. The optical pickup apparatus of claim 1, wherein the optical pickup apparatus includes a coupling lens for converting divergence angles of the first light flux emitted by the first light source and the second light flux emitted by the second light source and introducing the light fluxes into the objective lens unit, and the coupling lens includes the chromatic aberration correcting optical element.

18. The optical pickup apparatus of claim 17, wherein the coupling lens comprises at least one plastic lens or a diffractive surface of the chromatic aberration correcting optical element, and the coupling lens functions to suppress a divergence angle variation in response to a temperature variation, or a converging angle variation in response to a temperature variation, for the first light flux emitted from the coupling lens.

19. The optical pickup apparatus of claim 18, wherein:
a recording density of the first optical disk is larger than that of the second optical disk,
the coupling lens is a plastic lens, and
the optical pickup apparatus satisfies the following formula:

$$\{NA1\cdot(1-m1)\}^4\cdot(f1^2/f_C)\cdot|c1+(c2-c1)\cdot P_D/P_C|<0.13\cdot\lambda 1$$

where NA1 is a numerical aperture of the objective lens unit at the time of information recording and/or representing on the first optical disk, m1 is a magnification of the objective lens unit at the time of information recording and/or representing on the first optical disk, f1 (mm) is a focal length of the objective lens unit for the first wavelength λ1 at the time of information recording and/or representing on the first optical disk, λ1 (mm) is the first wavelength, $f_C$ is a focal length of the coupling lens for the first wavelength λ1, n is a refractive index of the coupling lens for the first wavelength λ1, α is a linear expansion coefficient of the coupling lens, $P_D$ (mm$^{-1}$) is a paraxial power of the diffractive surface for the first wavelength λ1, $P_C$ (mm$_{-1}$) is a paraxial power of the coupling lens for the first wavelength λ1, dn/dλ is a change rate in a refractive index resulting from a temperature variation in the coupling lens, dλ/dt is a wavelength change rate resulting from the temperature variation, and c1 and c2 are defined by the following formulas:

$$c1=1/(n-1)\cdot dn/dt+1/(n-1)\cdot dn/d\lambda\cdot d\lambda/dt-\alpha$$

$$c2=1/\lambda 1\cdot d\lambda/dt-2\alpha$$

and where an added optical path length caused by the diffractive structure is defined by an optical path difference function represented by the formula:

$$P_D=-2\cdot n1\cdot B_2\cdot(\lambda 1/\lambda B)$$

and n1 is a diffraction order of a diffracted ray with a largest diffraction efficiency among diffracted rays caused when the first light flux enters into the diffractive structure, and $P_D$ is defined by an added optical path length quantity caused by the following formula:

$$\phi_b = n\times(\lambda/\lambda B)\times\sum_{j=0} B_{2j}h^{2j}$$

where h (mm) is a height in a perpendicular direction to the optical path, $B2_j$ is an optical path difference function coefficient, n is a diffraction order of a diffracted ray with a largest diffraction efficiency among diffracted rays of an incident light flux, λ (nm) is a wavelength of an incident light flux to the diffractive structure and λB (nm) is a construction wavelength, or a blazed wavelength, of the diffractive structure.

20. The optical pickup apparatus of claim 19 which satisfies the following formula:

$$|c1+(c2-c1)\cdot P_D/P_C|/f_C<0.08\cdot\lambda 1 \text{ (mm)}$$

21. The optical pickup apparatus of claim 1, wherein the chromatic aberration correcting optical element comprises at least one optical surface with negative paraxial power and is an one-group optical element which conducts the first light flux almost parallel to the optical axis and emits an almost parallel light flux.

22. The optical pickup apparatus of claim 1, wherein the objective lens unit comprises at least two kinds of objective lenses:
a first objective lens for recording and/or reproducing information on a first optical disk with a first pre-defined recording density; and
a second objective lens for recording and/or reproducing information on a second optical disk with a second pre-defined recording density,
wherein the pickup apparatus further comprises a switching mechanism for selectively switching the first and second objective lenses.

23. The optical pickup apparatus of claim 1, wherein the recording density of the first optical disk is larger than that of the second optical disk, and wherein a numerical aperture of the objective lens unit, when information recording and/or reproducing is conducted on the first optical disk, is 0.8 or more.

24. The optical pickup apparatus of claim 1, wherein the recording density of the first optical disk is larger than that of the second optical disk, a first protective layer has a thickness in the range of 0.07 mm-0.13 mm on the first information surface on the first optical disk, the second protective layer has a thickness in the range of 0.55 mm-0.65 mm on the second information surface of the second optical disk, and the optical pickup apparatus conducts recording and/or reproducing of information on the first optical disk and the second optical disk by converging the first light flux on each of the information recording surfaces of the first optical disk and the second optical disk.

25. An optical information recording and reproducing apparatus which comprises the optical pickup apparatus of claim 1 and is adapted to conduct at least one of recording information on the first to third optical disks and reproducing information recorded on the first to third optical disks.

26. A coupling lens for an optical pickup apparatus comprising
a first light source for emitting a first light flux with a first wavelength λ1 of 450 nm or less;
a second light source for emitting a second light flux with a second wavelength λ2 which is in the range of 600 nm-700 nm;
a third light source for emitting a third wavelength λ3 which is in the range of 730 nm-830 nm;
an objective lens unit to converge the first light flux emitted by the first light source onto a first information recording surface of a first optical disk, to converge the second light flux emitted by the second light source onto a second information recording surface of a second optical disk, and to converge the third light flux emitted by the third light source onto a third information recording surface of a third obtical disk,
wherein the second optical disk has a different recording density from that of the first optical disk, wherein the third optical disk has a different recording density from those of the first and the second optical disks, wherein the coupling lens is arranged between all of the first light source, the second light source, the third light source, and the objective lens unit, and wherein the coupling lens is in a common optical path of the first to third light fluxes, the coupling lens comprises a chromatic aberration correcting optical element which includes a diffractive surface on at least one optical surface of the chromatic aberration correcting optical element such that a diffractive structure which is constructed by a plurality of ring-shaped zones separated by fine steps is formed on the diffractive surface;

the coupling lens is designed so that a diffraction order n2 for a diffracted ray having a largest diffraction efficiency among diffracted rays when the second light flux enters into the diffractive structure is a lower order than a diffraction order n1 for a diffracted ray having a largest diffraction efficiency among diffracted light rays when the first light flux enters into the diffractive structure;

the coupling lens comprises a plurality of lens groups, and changes a slope angle of a marginal ray in an incident light flux to the objective lens unit by variably adjusting an interval between at least one lens group of the coupling lens and the objective lens unit; and the coupling lens satisfies one of the following combinations:

(n1, n2, n3)=(2, 1, 1), (4, 2, 2), (6, 4, 3), (8, 5, 4), (10, 6, 5)

where n1, n2 and n3 are diffraction orders of diffracted rays, wherein the diffracted rays have their largest diffraction efficiencies when the first, second, and third light fluxes enter into the chromatic aberration correcting optical element, respectively.

27. The coupling lens of claim 26, wherein a refractive index for the first wavelength $\lambda 1$ of a lens constructing the chromatic aberration correcting optical element and including the diffractive surface is in the range of 1.5-1.6, the Abbe number for the d line of 587.6 nm is in the range of 50-60 and the depth (d0) of a step which is along an optical axis and closest to the optical axis satisfies one of the following:

$1.2 \, \mu m < d0 < 1.7 \, \mu m$ (9)

$2.6 \, \mu m < d0 < 3.2 \, \mu m$ (10)

$4.4 \, \mu m < d0 < 5.0 \, \mu m$ (11)

$5.6 \, \mu m < d0 < 6.5 \, \mu m$ (12)

$6.9 \, \mu m < d0 < 8.1 \, \mu m$ (13).

28. The coupling lens of claim 27, wherein the coupling lens comprises at least one plastic lens or a diffractive surface of the chromatic aberration correcting optical element, and the coupling lens has a function for suppressing a divergence angle variation in response to a temperature variation, or a converging angle variation in response to a temperature variation, for the first light flux emitted from the coupling lens.

29. The coupling lens of claim 28 which satisfies the following formula:

$\{NA1(1-m1)\}^4 \cdot (f1^2/f_C) \cdot |c1+(c2-c1) \cdot P_D/P_C| < 0.13 \cdot \lambda 1$ where NA1 is a numerical aperture of the objective lens unit at the time of information recording and/or representing on the first optical disk, m1 is a magnification of the objective lens unit at the time of information recording and/or representing on the first optical disk, f1 (mm) is a focal length of the objective lens unit for the first wavelength $\lambda 1$ at the time of information recording and/or representing on the first optical disk, the first $\lambda 1$ (mm) is the first wavelength, $f_C$ is a focal length for $\lambda 1$ of the coupling lens, n is a refractive index for the first wavelength $\lambda 1$ of the coupling lens, a is a linear expansion coefficient of the coupling lens, $P_D$ (mm$^{-1}$) is a paraxial power of the diffractive surface for the first wavelength $\lambda 1$, $P_C$ (mm$^{-1}$) is a paraxial power of the coupling lens for the first $\lambda 1$, $dn/d\lambda 0$ is a change rate in a refractive index resulting from a temperature variation in the coupling lens, $d\lambda/dt$ is a wavelength change rate resulting from the temperature variation, and c1, c2 and $P_D$ are defined by the following formulas:

$c1 = 1/(n-1) \cdot dn/dt + 1/(n-1) \cdot dn/d\lambda \cdot d\lambda/dt - \alpha$ $c2 = 1/\lambda 1 \cdot d\lambda/dt - 2\alpha$ $P_D = -2 \cdot n1 \cdot B_2 \cdot (\lambda 1/\lambda B)$ where n1 is a diffraction order of a diffracted ray with a largest diffraction efficiency among diffracted rays when the first light flux enters into the diffractive structure, wherein $P_D$ is defined by an added optical path length quantity caused by the diffractive structure which is represented by an optical path difference function satisfying the following formula:

$$\phi_b = n \times (\lambda/\lambda B) \times \sum_{j=0} B_{2j} h^{2j}$$

where h (mm) is a height in a perpendicular direction to the optical path, $B_{2j}$ is an optical path difference function coefficient, n is a diffraction order of a diffracted ray with a largest diffraction efficiency among diffracted rays of an incident light flux, $\lambda$ (nm) is a wavelength of an incident light flux to the diffractive structure and $\lambda B$ (nm) is a construction wavelength, or a blazed wavelength, of the diffractive structure.

30. The optical pickup apparatus of claim 29 which satisfies the following formula:

$|c1+(c2-c1) \cdot P_D/P_C|/f_C < 0.08 \cdot \lambda 1$ (mm).

* * * * *